US007644056B2

(12) United States Patent
Khalsa

(10) Patent No.: US 7,644,056 B2
(45) Date of Patent: Jan. 5, 2010

(54) SYSTEM AND METHOD FOR PROVIDING TERRORISM INTELLIGENCE INDICATIONS AND WARNINGS

(76) Inventor: Sundri Kaur Khalsa, 1724 Desert Vista Dr., Espanola, NM (US) 87532

( * ) Notice: Subject to any disclaimer, the term of this patent is extended or adjusted under 35 U.S.C. 154(b) by 117 days.

(21) Appl. No.: 11/650,914

(22) Filed: Jan. 5, 2007

(65) Prior Publication Data
US 2007/0198450 A1 Aug. 23, 2007

Related U.S. Application Data

(60) Provisional application No. 60/756,887, filed on Jan. 5, 2006.

(51) Int. Cl.
*G06F 17/00* (2006.01)
*G06F 15/18* (2006.01)
*G06N 5/02* (2006.01)
(52) U.S. Cl. .............................. 706/47; 706/46; 706/14
(58) Field of Classification Search .................. 706/47, 706/46, 14; 707/100
See application file for complete search history.

(56) References Cited

U.S. PATENT DOCUMENTS

| 7,355,508 B2* | 4/2008 | Mian et al. ............... 340/426.1 |
|---|---|---|
| 2003/0172294 A1* | 9/2003 | Judge ......................... 713/200 |
| 2004/0004155 A1* | 1/2004 | DeFlumere et al. ........ 244/3.11 |
| 2005/0182722 A1* | 8/2005 | Meyer et al. ................ 705/40 |
| 2005/0203931 A1* | 9/2005 | Pingree et al. .............. 707/100 |
| 2005/0258943 A1* | 11/2005 | Mian et al. ............... 340/426.1 |
| 2006/0004866 A1* | 1/2006 | Lawrence et al. ........ 707/104.1 |
| 2006/0004878 A1* | 1/2006 | Lawrence et al. .......... 707/200 |
| 2006/0036619 A1* | 2/2006 | Fuerst et al. ............... 707/100 |
| 2006/0112048 A1* | 5/2006 | Talbot et al. ................ 706/46 |
| 2006/0248096 A1* | 11/2006 | Adam ........................ 707/100 |

OTHER PUBLICATIONS

Sundri Khalsa, Forecasting Terrorism, 2004, Scarecrow Press, Inc.*
Khalsa, Sundri et al., "Forecasting Terrorism - Indicators and Proven Analytic Techniques", *The Scarecrow Press, Inc.* 2004, 1-103.

* cited by examiner

*Primary Examiner*—Joseph P Hirl
(74) *Attorney, Agent, or Firm*—Deborah A. Peacock; Justin R. Jackson; Peacock Myers, P.C.

(57) ABSTRACT

The present invention provides a system and method for providing terrorism intelligence indications and warning consisting of multiple tasks that create warning products on a Website and in which the associated computer program maintains a Webpage that tracks and displays each analyst's pending tasks based on their assigned responsibilities in the system.

18 Claims, 12 Drawing Sheets

SYSTEM AND METHOD FOR PROVIDING TERRORISM INTELLIGENCE INDICATIONS AND WARNINGS

CROSS-REFERENCE TO RELATED APPLICATIONS

This application claims the benefit of the filing of U.S. Provisional Patent Application Ser. No. 60/756,887, titled "Methods in Forecasting Terrorism", filed Jan. 5, 2006, and the specification of that application is incorporated herein by reference.

COPYRIGHTED MATERIAL

2005 Sundri Khalsa. A portion of the disclosure of this patent document contains material that is subject to copyright protection. The owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

1. Field of the Invention (Technical Field)

The present invention relates to the field of intelligence warning and provides a system and method for providing intelligence indications and warning of terrorism. The present invention is applicable to any intelligence topic.

2. Description of Related Art

Note that the following discussion may refer to a number of publications by author(s) and year of publication, and that due to recent publication dates certain publications are not to be considered as prior art vis-à-vis the present invention. Discussion of such publications herein is given for more complete background and is not to be construed as an admission that such publications are prior art for patentability determination purposes.

The focus to improve intelligence warning normally turns to intelligence collection, rather than analysis. Although improvements in collection are needed, these improvements do not address the predominant problems in intelligence warning. Warning failures are rarely due to inadequate intelligence collection, are more frequently due to weak analysis, and are most often due to decision makers ignoring intelligence. Ronald D. Garst, "Fundamentals of Intelligence Analysis," in Intelligence Analysis ANA 630, no. 1, ed. Joint Military Intelligence College (Washington, D.C.:Joint Military Intelligence College, 2000): 7 (cited hereafter as Garst). Decision makers, however, ignore intelligence largely because analytic product is weak. Hans Heymann Jr., "The Intelligence—Policy Relationship," in Intelligence Analysis ANA 630, no. 1 ed. Joint Military Intelligence College (Washington, D.C.: Joint Military Intelligence College, 2000): 55 (cited hereafter as Heymann). Thus, the problem points mainly to analysis.

Yet, the trend to focus on collection continues after Sep. 11, 2001, with the Intelligence Community's consensus that terrorism warning improvement can best be achieved by improving collection, rather than analysis.

Empirical research, however, shows that more information does not improve the accuracy of analysts' assessments; it merely improves analysts' certainty in their assessments. Garst, 23; Kam, 55. Additional research even finds, "an intensified collection effort does not necessarily lead to better analysis and more accurate estimates; when the additional information contains a large portion of noise, the risks of another intelligence failure leading to surprise may even increase." Kam, 55. Furthermore, "it is sometimes assumed that counterterrorism analysis suffers from a dearth of intelligence. Actually the opposite is the problem—there is too much intelligence . . . . As with all intelligence analysts, value-added analysis requires an ability to separate out . . . the signals from the noise." Mark V. Kauppi, "Counterterrorism Analysis," Defense Intelligence Journal 11, no. 1, (Winter 2002): 39-53. The evidence suggests there is more value in the available information than current analytical technique reveals.

Hiring smart people does not necessarily lead to good analysis. Many argue that "the best way to ensure high-quality analysis is to bring high quality analysts into the process." "Making Intelligence Smarter: The Future of U.S. Intelligence," Report of an Independent Task Force 1996, www-.copi.com/articles/intelrpt/cfr.html (23 Jul. 1999). Their reasoning is that many intelligent minds working together are bound to produce a good assessment. They're wrong, according to researchers. J. Edward Russo and Paul J. H. Schoemaker, Decision Traps: The Ten Barriers to Brilliant Decision-Making and How to Overcome Them (New York: Rockefeller Center, 1989), 145 (cited hereafter as Russo). Studies show that, "frequently groups of smart, well-motivated people . . . agree . . . on the wrong solution . . . . They didn't fail because they were stupid. They failed because they followed a poor process in arriving at their decisions." Russo, 146.

A systematic process is the most effective way to facilitate good analysis. There is a long-standing debate within the Intelligence Community over whether structured techniques work on complex problems, such as terrorism analysis. Robert D. Folker, Jr., Intelligence Analysis in Theater Joint Intelligence Centers: An Experiment in Applying Structured Methods, Occasional Paper, no. 7 (Washington, D.C.: Joint Military Intelligence College, 2000), 7 (cited hereafter as Folker). The non-structured approach has become the norm in the Intelligence Community. Folker, 1. Many analysts argue that structured techniques cannot account for the infinite number of variables involved in complex problems and that intuition can do better. However, research shows that intuitive judgments "seldom take proper account of all the information available." Russo, 120. People selectively remember information based on the vividness and time since their exposure to it. "People have difficulty keeping more than seven or so 'chunks' of information in mind at once." Russo, 14. Psychological studies show that people tend to ignore evidence that does not support their biases and interpret ambiguous information as confirming their biases. When the mind is overwhelmed with information, that tendency is magnified as part of a simplification technique to reduce the information down to a manageable size. Kam, 102, 106. Furthermore, "intuitive judgments suffer from serious random inconsistencies due to fatigue, boredom, and all the factors that make us human." Russo, 135. Many people argue that they can avoid these pitfalls by simply being aware of them, but empirical research shows that "tactics can improve your success beyond what you can achieve simply by being aware of the dangers." Russo, 115.

Many analysts think structured methods take too long. Folker, 7. If, however, an analyst makes data entry to the structured framework part of his daily routine, and even automates certain parts of the process for which he has made predetermined (intuitive) choices, then methodology can in fact save time rather than consume it.

Intuition cannot be eliminated from intelligence analysis because a great deal of intelligence information is qualitative—"information that can be captured that is not numerical in nature." William M. K. Trochim, "Qualitative Data," Cornell University: Research Methods Knowledge Base 2002, http://trochim.human.cornell.edu/kb/qualdata.htm (31 May 2002). Because non-numerical information cannot be counted, an analyst must assess its value subjectively using intuition.

A key misunderstanding in the debate over intuition versus structured technique is that an analyst must choose either intuition or structured technique. Folker, 1. In fact, both intuition and structured technique can be used together in a systematic process. "Anything that is qualitative can be assigned meaningful numerical values. These values can then be manipulated to help us achieve greater insight into the meaning of the data and to help us examine specific hypotheses." William M. K. Trochim, "The Qualitative Debate," Cornell University: Research Methods Knowledge Base 2002, trochim.human.cornell.edu/kb/qualdeb.htm (31 May 2002). It is not only possible to combine intuition and structure in a system; research shows the combination is more effective than intuition alone. "Considerable research suggests that you will maximize your chances of making the best choice if you find a systematic way to evaluate all the evidence favorable or unfavorable to each possible choice, compare the strength of evidence on each side rigorously, then pick the choice that your system indicates the evidence favors." Russo, 130. Thus, intelligence analysis must not only apply the art of intuition, but also the science of structured technique.

Finally, regardless of an analyst's individual opinion, decision makers have called on the Intelligence Community to use methodology.

The Rumsfeld Commission noted that " . . . an expansion of the methodology used by the IC [Intelligence Community] is needed." . . . [Methodology] helps overcome mindset, keeps analysts who are immersed in a mountain of new information from raising the bar on what they would consider an alarming threat situation, and allows their minds to expand to other possibilities. Keeping chronologies, maintaining databases and arraying data are not fun or glamorous. These techniques are the heavy lifting of analysis, but this is what analysts are supposed to do. If decision makers only needed talking heads, those are readily available elsewhere. Donald Rumsfeld, press conference, quoted in Mary O. McCarthy, "The Mission to Warn: Disaster Looms," Defense Intelligence Journal 7 no. 2 (Fall 1998): 21.

Because intuition cannot be eliminated from intelligence analysis, analysts must find a way to limit their vulnerability to the pitfalls of intuition. What would be useful is a methodology that combines intuitive judgments with structured techniques in a way that guards against the pitfalls of intuition and the pitfalls of intelligence warning.

The best known prior art that is related to this invention is an Intelligence Community member organization's method of determining terrorism warning levels for given countries. In the method, analysts give an intuitive rating to four factors on a four-level warning scale and then combine them in an intuitive judgment of an overall country terrorism warning level (on the U.S. four-level scale; the four factors are not identified here for security reasons.

BRIEF SUMMARY OF THE INVENTION

The present invention provides for a system and method for providing terrorism intelligence indications and warning consisting of multiple tasks that create warning products on a website and in which the associated computer program maintains a Webpage that tracks and displays each analyst's pending tasks based on their assigned responsibilities in the system.

Thus, an embodiment of the present invention provides a system for providing terrorism indications and warning comprising a plurality of analysts, a computer program for maintaining a Webpage that tracks and displays a task of each analyst, a list of prioritized terrorism indicators and indicator question sets to aid analysts in identifying information for forecasting a topic, a list of prioritized collection requirements to aid help said analysts publish an intelligence collection plan, a terrorism forecasting master database to aid analysts in consolidating collected information, a Webpage hypothesis matrix that is automatically populated by said master database to aid analysts in sorting collected information, a partly automated systematic process that combines intuitive and structured techniques to aid analysts in drawing conclusions, a plurality of re-prioritized collection requirements in said intelligence collection plan to aid analysts in focusing on an intelligence gap to refine said conclusions, and a plurality of Website templates to aid analysts in communicating conclusions and in providing warning.

Another embodiment provides a method for providing terrorism indications and warning, the method comprising identifying information required to forecast a topic, publishing an intelligence collection plan using a computer program, consolidating information using a master database, sorting the information, drawing conclusions based on the information, focusing on an intelligence gap to refine conclusions, communicating the conclusions, and giving warning of a threat.

Preferably, the indicator question sets are published as intelligence collection requirements. Preferably, intelligence collectors profile raw intelligence reports according to data profile elements including terrorist individuals, terrorist groups, countries, targets, indicators and indicator questions. Preferably, the method further comprises using the computer program to create potential terrorist hypotheses matrices with hyperlinks to raw intelligence reports.

Preferably, the computer program assesses a terrorist group threat warning level, an affiliation between a terrorist group and a terrorist network; a terrorist network threat warning level, and a terrorist individual threat warning level. Preferably, the computer program and an analyst write and update a terrorist group threat warning narrative. Preferably, the computer program and an analyst update a trend analysis of warning levels for terrorist group and network threat and terrorist individual. Preferably, the computer program and an analyst update a trend analysis of warning levels for terrorist group and network threat and terrorist individual. Preferably, the computer program and an analyst update a warning failure and a warning success comparison case study data.

Preferably, the computer program reprioritizes indicator questions. Preferably, the analyst adds indicator questions. Preferably, the computer program creates potential terrorist individual hypothesis matrix Webpages.

Preferably, indicator warning level numbers are combined using mathematical probability rules and theories to determine overarching warning level numbers. Preferably, a terrorist group threat warning level is determined by combining the terrorist group's intention warning level and the terrorist group's capability warning level. Preferably, terrorist individuals are assigned warning levels based on terrorist position indicator warning levels and by combining the terrorist's position priority and threatening activity level.

Preferably, a terrorist group threat warning narrative is created by combining all indicator narratives related to a given terrorist group, by combining all indicator narratives related to a given terrorist network, and by combining all the indicator narratives related to a given terrorist individual.

Preferably, terrorism intelligence indications and warning methodology is applied to warning failure data and to warning success data to create indicator-based warning failure profiles.

It is an object of the present invention to provide a reliable system and method for forecasting terrorism.

Objects, advantages and novel features, and further scope of applicability of the present invention are set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into, and form a part of, the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

FIG. 4 shows a utility matrix that shows how Source Credibility and Information Feasibility can be combined to determine Information Validity;

FIG. 11 shows a utility matrix that illustrates how a Collection Requirement Priority and a rating of an answer to an Indicator Question can be combined to determine a Reduced-Collection Requirement Priority (which causes questions answered unknown to become the higher priority Collection Requirements)

DETAILED DESCRIPTION OF THE INVENTION

The present invention provides a system and method for providing terrorism intelligence indications and warning consisting of multiple tasks that create warning products on a Website and in which the associated computer program maintains a Webpage, referred to herein as "My Tasks", that tracks and displays each analyst's pending tasks based on their assigned responsibilities in the system. More particularly, the invention employs a computer assisted systematic process and rule set to enable intelligence analysts to build indicator-based terrorism indications and warning assessments out of the thousands of raw intelligence reports they receive daily. The forecasting assessments of this methodology are maintained on a Website display. As used herein the terms "a" and "an" mean one or more.

Although the description herein refers to non-limiting examples using the United States agencies and departments, as well as the focus on terrorism, it should be understood that the present invention is applicable to other subject matter and other governmental and non-governmental entities outside the U.S. Further, the figures are provided as illustrative examples regarding content and format (e.g., Webpage format); therefore, they are non-limiting.

Figure 1:
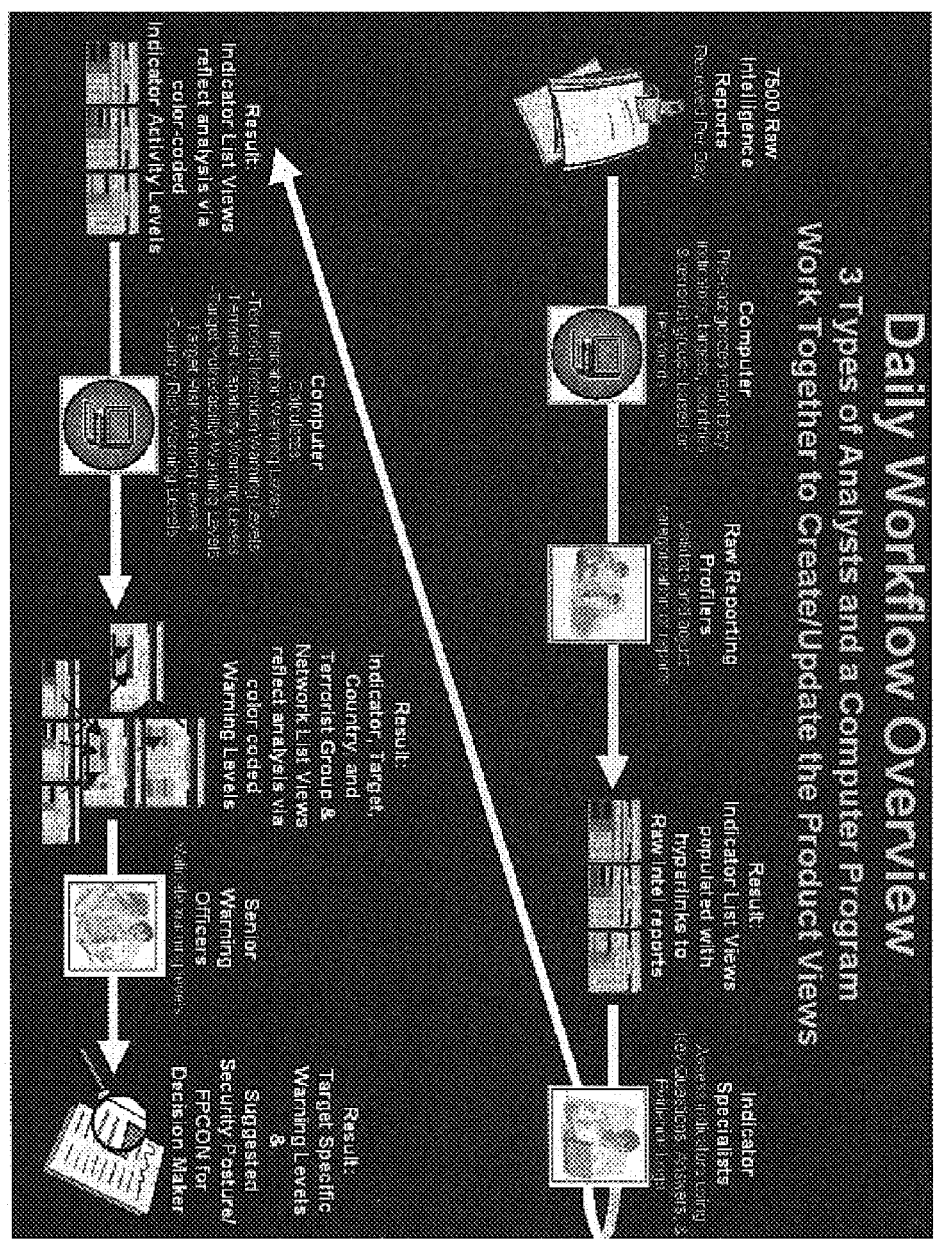
FIG. 1 shows a workflow overview of an embodiment of the present invention for providing terrorism intelligence indications and warning.

Thus, a non-limiting embodiment of the present invention preferably comprises three types of analysts (identified herein as Raw Reporting Profilers, Indicator Specialists, and Senior Warning Officers) and a computer program that work together to create and update product views. FIG. 1 shows an overview of their workflow which is preferably accomplished each day. In the various embodiments, there are some additional, annual, monthly, and daily tasks.

The method of the present invention comprises seven phases having the following elements:

(1) a list of prioritized terrorism Indicators and Indicator Question Sets help analysts identify the key elements of information required to forecast the selected topic, (2) a list of prioritized Collection Requirements (derived from the Indicators and Indicator Question Sets) help analysts publish an Intelligence Collection Plan, (3) a Terrorism Forecasting Master Database helps analysts consolidate the information that was collected, (4) Webpage hypothesis matrices that are automatically populated by the master database help analysts sort information, (5) a partly automated systematic process that combines intuitive and structured techniques (hypothesis testing, matrix logic, chronological sorting, and question set guidance) helps analysts draw conclusions, (6) Re-Prioritized Collection Requirements in the Intelligence Collection Plan help analysts focus collectors on Intelligence Gaps to refine/update conclusions, and (7) Website templates help analysts communicate conclusions/provide warning.

The value of the seven elements can be appreciated in the context of an analogy to constructing a building, as shown in Table 1.

TABLE 1

Seven Phases of Methodology with Corresponding Essential Elements

| 7 Phases of Methodology | 7 Essential Elements with Analogy to Constructing a Building |
|---|---|
| I. Identify the Key Elements of Information Required to Forecast a Topic | 1. Indicators and Indicator Question Sets - The Building Blocks of a Warning Assessment |
| II. Publish an Intelligence Collection Plan | 2. Collection Requirements - The Purchase Order for the Building Blocks |
| III. Consolidate Information | 3. Master Database - The Foundation to Lay All the Building Blocks |
| IV. Sort Information | 4. Hypothesis Matrices - The Blueprint of a Warning Assessment |
| V. Draw Conclusions | 5. Systematic Process that Combines Intuitive and Structured Techniques - The Tools to Build the Blocks |
| VI. Focus Collectors on Intelligence Gaps to Refine/Update Conclusions | 6. Re-Prioritized Collection Requirements Repair and Maintenance Requirements . . . |
| VII. Communicate Conclusions/Give Warning | 7. The Website Display - The Building |

Ultimately, just as a building should guard against common hazards (such as earthquakes), a warning methodology should guard against common warning pitfalls. The present methodology guards against 32 of the 42 common warning pitfalls, provides a partial guard against 4 pitfalls, and provides no guard against 6 pitfalls (which averages to a nearly 81 percent guard against the pitfalls), as shown in Table 2.

TABLE 2

Seven Phases of Methodology with Corresponding Essential Elements and Common Warning Pitfalls

| 7 Phases of Methodology | 7 Essential Elements with Analogy to Constructing a Building | 42 Common Warning Problems/Pitfalls |
|---|---|---|
| I. Identify the Key Elements of Information Required to Forecast a Topic | 1. Indicators and Indicator Question Sets - The Building Blocks of a Warning Assessment | 2 Pitfalls: Guard against 1 Partial Guard against 1 |
| II. Publish an Intelligence Collection Plan | 2. Collection Requirements - The Purchase Order for the Building Blocks | 1 Pitfall: Guard Against 1 |
| III. Consolidate Information | 3. Master Database - The Foundation to Lay All the Building Blocks | 2 Pitfalls: Guard against 1 No Guard against 1 |
| IV. Sort Information | 4. Hypothesis Matrices - The Blueprint of a Warning Assessment | 9 Pitfalls: Guard against 9 |
| V. Draw Conclusions | 5. Systematic Process that Combines Intuitive and Structured Techniques - The Tools to Build the Blocks | 15 Pitfalls: Guard against 12 Partial Guard against 1 No Guard against 2 |
| VI. Focus Collectors on Intelligence Gaps to Refine/Update Conclusions | 6. Re-Prioritized Collection Requirements Repair and Maintenance Requirements | 1 Pitfall: Guard Against 1 |
| VII. Communicate Conclusions/Give Warning | 7. The Website Templates/Display - The Building | 12 Pitfalls: Guard against 7 Partial Guard against 2 No Guard against 3 |

There are 46 tasks in the 7 phases, as shown in Table 3 (Overview of Tasks in Methodology). The 46 Tasks include 22 daily tasks, 5 monthly tasks, 5 annual tasks, and 14 as-required tasks. The 22 daily tasks can be completed in one day because tasks are automated wherever possible.

Each task explanation indicates whether it is executed by the computer program, Raw Reporting Profiler(s), Indicator Specialist(s), Senior Warning Officer(s) or some combination of them working together. This methodology is applicable to any intelligence topic (not just terrorism) by simply changing the list of indicators.

TABLE 3

Overview of Tasks in Methodology
46 Tasks within 7 Phases of Methodology

| Task Set | |
|---|---|
| | Phase I: Identify the Key Elements of Information Required to Forecast a Topic (Using Indicators and Indicator Question Sets) |
| 1 | Analysts Identify/Validate Indicators (Annually) |
| 2 | Analysts Determine/Validate Priorities of Indicators (Annually) |
| 3 | Analysts Develop/Validate Indicator Question Sets on Each Indicator (Annually) |
| 4 | Analysts Determine/Validate Priorities of Questions in Indicator Question Sets (Annually) |
| | Phase II: Publish an Intelligence Collection Plan (Using Collection Requirements) |
| 5 | Computer Program Publishes the Indicator Question Sets as Collection Requirements in an Intelligence Collection Plan (Annually and As Required) |
| | Phase III: Consolidate Information (Using Master Database) |
| 6 | Intelligence Community Member Organizations Publish All Raw Intelligence Reports from Intelligence Collectors on an Intelligence Community Master Raw Reports Log Webpage (Daily) |
| 7 | Computer Program and Analysts Enter and Profile All Terrorism Related Raw Intelligence Reports into a Terrorism Forecasting Master Database Under Appropriate Indicators, Indicator Questions, Targets, Countries, Terrorist Groups, and Other Data Profile Elements (Daily) |
| 8 | Computer Program Displays All Terrorism Related Raw Intelligence Reports in a Daily Readfile (Daily) |
| | Phase IV: Sort Information (Using Hypothesis Matrices) |
| 9 | Computer Program Creates Potential Target Hypothesis Matrices with Hyperlinks to Raw Intelligence Reports Filed by Terrorism Indicators (Daily) |
| 10 | Computer Program Creates Potential Terrorist Hypothesis Matrices with Hyperlinks to Raw Intelligence Reports Filed by Terrorist Position Indicators (Daily) |
| 11 | Computer Program Feeds Raw Intelligence Reports into Appropriate Indicator Questions, Answers, & Evidence Logs within the Hypothesis Matrices and Terrorist Profile (Daily) |
| | Phase V: Draw Conclusions (Using Intuitive and Structured Techniques) |
| 12 | Analysts and Computer Program Assess Raw Intelligence Reports' Information Validity (Daily) |
| 13 | Analysts and Computer Program Assess Indicator Warning Levels (Daily) |
| 14 | Computer Program Assesses Terrorist Intention Warning Level (Daily) |
| 15 | Computer Program Assesses Terrorist Capability Warning Level (Daily) |
| 16 | Computer Program Assesses Target Vulnerability Warning Level (Daily) |
| 17 | Computer Program Assesses Target Risk Warning Level (Daily) |
| 18 | Computer Program Assesses Country Risk Warning Level (Daily) |
| 19 | Computer Program Assesses Terrorist Group Threat Warning Level (Daily) |
| 20 | Analysts and Computer Program Assess Which Terrorist Groups Form Which Terrorist Networks (Daily) |
| 21 | Computer Program Assesses Terrorist Network Threat Warning Level (Daily) |
| 22 | Computer Program Assesses Terrorist Individual Threat Warning Level (Daily) |
| 23 | Analysts Write/Update Indicator Warning Narrative: What We Know, Think, & Need to Know (Daily) |
| 24 | Computer Program and Analysts Write/Update Target Risk Warning Narrative: What We Know, Think, & Need to Know (Daily) |
| 25 | Computer Program and Analysts Write/Update Country Risk Warning Narrative: What We Know, Think, & Need to Know (Daily) |
| 26 | Computer Program and Analysts Write/Update Terrorist Group Threat Warning Narrative: What We Know, Think, & Need to Know (Daily) |
| 27 | Computer Program and Analysts Write/Update Terrorist Network Threat Warning Narrative: What We Know, Think, & Need to Know (Daily) |

TABLE 3-continued

Overview of Tasks in Methodology
46 Tasks within 7 Phases of Methodology

| Task Set | |
|---|---|
| 28 | Computer Program and Analysts Write/Update Terrorist Individual Threat Warning Narrative: What We Know, Think, & Need to Know (Daily) |
| 29 | Computer Program and Analysts Update/Study Trend Analysis of Indicator Warning Levels (Monthly) |
| 30 | Computer Program and Analysts Update/Study Trend Analysis of Target Risk Warning Levels (Monthly) |
| 31 | Computer Program and Analysts Update/Study Trend Analysis of Country Risk Warning Levels (Monthly) |
| 32 | Computer Program and Analysts Update/Study Trend Analysis of Terrorist Group & Network Threat Warning Levels (Monthly) |
| 33 | Computer Program and Analysts Update/Study Trend Analysis of Terrorist Individual Threat Warning Levels (Monthly) |
| 34 | Analysts and Computer Program Update/Study Warning Failure (Past Attack) Comparison Case-Study Data on Indicators (As Required) |
| 35 | Analysts and Computer Program Update/Study Warning Failure (Past Attack) Comparison Case-Study Data on Targets (As Required) |
| 36 | Analysts and Computer Program Update/Study Warning Failure (Past Attack) Comparison Case-Study Data on Terrorist Groups & Networks (As Required) |
| 37 | Analysts and Computer Program Update/Study Warning Failure (Past Attack) Comparison Case-Study Data on Terrorist Individuals (As Required) |
| 38 | Analysts and Computer Program Update/Study Warning Success (Thwarted Attack) Comparison Case-Study Data on Indicators (As Required) |
| 39 | Analysts and Computer Program Update/Study Warning Success (Thwarted Attack) Comparison Case-Study Data on Targets (As Required) |
| 40 | Analysts and Computer Program Update/Study Warning Success (Thwarted Attack) Comparison Case-Study Data on Terrorist Groups & Networks (As Required) |
| 41 | Analysts and Computer Program Update/Study Warning Success (Thwarted Attack) Comparison Case-Study Data on Terrorist Individuals (As Required) Phase VI: Focus Collectors On Intelligence Gaps to Refine/Update Conclusions (By Reprioritizing Collection Requirements) |
| 42 | Computer Program Reprioritizes the Indicator Questions so that Questions Answered Unknown Become the Higher Priority Collection Requirements in the Intelligence Collection Plan (As Required) |
| 43 | Analysts Add Indicator Questions that Are Terrorist Group/Network-Specific, Country-Specific, or Target-Specific to the Intelligence Collection Plan (As Required) Phase VII: Communicate Conclusions/Give Warning (Using Website Templates) |
| 44 | Analysts Provide Verbal Briefings and/or Written Reports to Decision Makers Using the Website Templates (As Required) |
| 45 | It Warning Is Rejected, Analysts Elicit and Document the Reason(s) Provided by Decision Makers (As Required) |
| 46 | Analysts Re-brief Decision Makers with Responses to Questions/Objections and Show New Evidence Using Website Templates (As Required) |

Phase I

In Phase I, the Key Elements of Information Required to Forecast a Topic (Using Indicators and Indicator Question Sets) are identified.

Task 1:

In Task I, analysts identify/validate Indicators (preferably annually). The system of the present invention based on indicators because indicators are those collectable things that would have to happen and those that would likely happen as a scenario unfolded. In the context of a terrorist attack, examples of indicators include, but are not limited to, terrorist travel, weapons movement, terrorist training, target surveillance, and tests of security.

Indicators are preferably the joint focus of intelligence analysts and intelligence collectors. Intelligence analysts preferably base their warning assessments on the activity level in indicators and ask intelligence collectors to find missing information that is necessary to assess the status of indicators. Intelligence collectors constantly look for evidence of activity in the indicators, so that analysts can update their warning assessments. That constant exchange of collection feeding analysis and analysis feeding collection is how the intelligence cycle should work, and the best way to ensure that both sides are giving each other what they need is to ensure that they are both constantly operating off the same list of intelligence collection requirements, which should be based on indicators. In fact, indicators should be the outline of an intelligence collection plan and an intelligence analysis plan. Indicator question sets (described in Task 3) should form the details of an intelligence collection plan and an intelligence analysis plan.

Table 4 identifies 86 indicators of terrorism. Indicators should be kept confidential "For Official Use Only." Revealing a list of Terrorism Indicators would essentially be revealing an intelligence collection plan against terrorism.

TABLE 4

Indicators of Terrorism

Indicators of Terrorism

Indicators are collectable things that would have to happen and . . . would likely happen as a scenario unfolded.
Indicators must be identified for the three factors that comprise risk to assess the risk of terrorist attacks.
Risk: Adversary Capability, Adversary Intention and Target Vulnerability

| | Priority | Data Type | Primary Collector(s) | Indicator Analyst |
|---|---|---|---|---|
| Indicators of Terrorist Intention | | | | |
| Tactical (Target-Specific) Indicators | | | | |
| 1. Surveillance, Physical (Target Specific or Target-Type Specific) | 1 | Quantitative | CI, Law Enforcement | Terrorists' Targets |
| 2. Intentionally Left Blank | 1 | Qualitative | CI, HUMINT | Indicator |
| 3. Intentionally Left Blank | 2 | Qualitative | CI, HUMINT | Specialist |
| 4. Intentionally Left Blank | 1 | Qualitative | CI, Law Enforcement | |
| 5. Intentionally Left Blank | 1 | Qualitative | CI, HUMINT, SIGINT | |
| 6. Anti-Indicators | 1 or Trump | Qualitative | All Source | |
| 7. Test of Security | 2 | Quantitative | CI, Law Enforcement | |
| 8. Intentionally Left Blank | 2 | Quantitative | CI, Law Enforcement | |
| 9. Intentionally Left Blank | 2 | Qualitative | CI, Law Enforcement | |
| 10. Intentionally Left Blank | 2 | Qualitative | CI | |
| 11. Intentionally Left Blank | 1 | Qualitative | Law Enforcement, CI | |
| 12. Intentionally Left Blank | 2 | Quantitative | CI, Law Enforcement | |
| 13. Intentionally Left Blank | 2 | Qualitative | CI, Law Enforcement | |
| 14. Intentionally Left Blank | 2 | Qualitative | CI | |
| 15. Intentionally Left Blank | 3 | Quantitative | CI, SIGINT | |
| 16. Intentionally Left Blank | 3 | Qualitative | Law Enforcement, CI, Open Source | |
| 17. Intentionally Left Blank | 3 | Qualitative | CI | |
| 18. Intentionally Left Blank | 3 | Qualitative | CI | |
| 19. Intentionally Left Blank | 3 | Quantitative | CI, Law Enforcement | |
| 20. Significant Event in Next 30 Days | 3 | Qualitative | Open Source | |
| 21. Miscellaneous* | NA | Qualitative | All Source | |
| Strategic (Countrywide) Indicators | | | | |
| 22. Weapon/Material Movement | 1 | Qualitative | CI, HUMINT | Terrorist |
| 23. Travel | 2 | Qualitative | CI, HUMINT | Group |
| 24. Intentionally Left Blank | 1 | Qualitative | HUMINT, SIGINT | Indicator Specialist |
| 25. Intentionally Left Blank | 1 | Qualitative | HUMINT, SIGINT | |
| 26. Intentionally Left Blank | | | | |
| 27. Intentionally Left Blank | 2 | Qualitative | CI, HUMINT | |
| 28. Training | 1 | Qualitative | All Source | |
| 29. Anti-Indicators | 1 or Trump | Qualitative | All Source | |
| 30. Intentionally Left Blank | 2 | Qualitative | CI, Law Enforcement | |
| 31. Intentionally Left Blank | 2 | Qualitative | CI, Law Enforcement | |
| 32. Intentionally Left Blank | 2 | Qualitative | CI | |
| 33. Intentionally Left Blank | | | | |
| 34. Intentionally Left Blank | 2 | Qualitative | CI, HUMINT, SIGINT. | |
| 35. Intentionally Left Blank | 2 | Qualitative | SIGINT | |
| 36. Intentionally Left Blank | 2 | Qualitative | CI, HUMINT, SIGINT | |
| 37. Intentionally Left Blank | | | Law Enforcement, CI | |

TABLE 4-continued

| Indicators of Terrorism | | | | |
|---|---|---|---|---|
| 38. Intentionally Left Blank | 2 | Qualitative | CI, Law Enforcement | |
| 39. Intentionally Left Blank | 2 | Quantitative | CI, Law Enforcement | |
| 40. Intentionally Left Blank | 2 | Qualitative | All Source | |
| 41. Intentionally Left Blank | 3 | Qualitative | HUMINT, Open Source | Terrorist Network Indicator Specialist |
| 42. Intentionally Left Blank | 3 | Qualitative | Law Enforcement, CI, Open Source | Terrorist Group Indicator Specialist |
| 43. Intentionally Left Blank | 3 | Qualitative | All Source | (continued) |
| 44. Intentionally Left Blank | 3 | Qualitative | All Source | |
| 45. Significant Date in Next 30 Days | 3 | Qualitative | Open Source, CI | |
| 46. Propaganda | 3 | Qualitative | Open Source | |
| 47. Miscellaneous* | NA | Qualitative | All Source | |
| Indicators of Terrorist Capability | | | | |
| Strategic (Countrywide) Indicators Lethal Agent/Technique | | | | |
| 48. Biological | 1 | Qualitative | All Source | Biological Specialist |
| 49. Nuclear | 1 | Qualitative | All Source | Nuclear & Radiological Specialist |
| 50. Radiological | 2 | Qualitative | All Source | |
| 51. Chemical | 2 | Qualitative | All Source | Chemical Specialist |
| 52. Conventional Bombing/Explosion | 2 | Qualitative | All Source | Terrorist Group Indicator Specialist (continued) |
| 53. Hijacking | 2 | Qualitative | All Source | |
| 54. Hostage Taking/Kidnapping | 2 | Qualitative | All Source | |
| 55. Assassination | 3 | Qualitative | All Source | |
| 56. Firearm | 3 | Qualitative | All Source | |
| 57. Knife/Blade | 3 | Qualitative | All Source | |
| 58. Hand-to-Hand Combat | 3 | Qualitative | All Source | |
| 59. Computer Network Attack (CNA) | 3 | Qualitative | All Source | |
| 60. Poison | 3 | Qualitative | All Source | |
| 61. Miscellaneous* | NA | Qualitative | All Source | |
| Delivery Method | | | | |
| 62. Ground-Based Vehicle | NA | Qualitative | All Source | Terrorist Group Indicator Specialist (continued) |
| 63. Water Vessel/Scuba | NA | Qualitative | All Source | |
| 64. Aircraft | NA | Qualitative | All Source | |
| 65. Missile, Surface-to-Surface | NA | Qualitative | All Source | |
| 66. Missile, Surface-to-Air | NA | Qualitative | All Source | |
| 67. Missile, Air-to-Surface | NA | Qualitative | All Source | |
| 68. Missile, Air-to-Air | NA | Qualitative | All Source | |
| 69. Missile, Unknown Type | NA | Qualitative | All Source | |
| 70. Suicide Terrorist/Human Host | NA | Qualitative | All Source | |
| 71. Mail/Post | NA | Qualitative | All Source | |
| 72. Food/Beverage/Water Supply | NA | Qualitative | All Source | |
| 73. Gaseous | NA | Qualitative | All Source | |
| 74. Personnel Strength and/or Identifying-Data on Terrorist Personnel | N/A | Qualitative | All Source | Terrorist Network Indicator Specialist (continued) |
| 75. Miscellaneous* | NA | Qualitative | All Source | Terrorist Group Indicator Specialist (continued) |
| Indicators of Target Vulnerability | | | | |
| Tactical (Target-Specific) Indicators | | | | |
| 76. Current Security Posture/FPCON | 1 | Qualitative | CI | Terrorists' Targets Indicator Specialist (continued) |
| 77. Number of People in Target Area (Damage Level Capacity) | 1 | Qualitative | CI | |
| 78. Facility Vulnerability Assessment (VA) | 2 | Qualitative | CI | |
| 79. Significance of Target | 3 | Qualitative | CI | |
| 80. Significant Event in Next 30 Days | 3 | Qualitative | Open Source | |
| 81. Miscellaneous* | NA | Qualitative | All Source | |

TABLE 4-continued

Indicators of Terrorism

Strategic (Countrywide) Indicators

| | | | | |
|---|---|---|---|---|
| 82. Country's Ability to Deter and Disrupt Terrorist Activity | 1 | Qualitative | CI | Terrorists' Targets |
| 83. Country's Intent To Deter and Disrupt Terrorist Activity | 1 | Qualitative | CI | Indicator Specialist |
| 84. Country's Cooperation with the U.S. | 2 | Qualitative | CI | (continued) |
| 85. Significant Date in Next 30 Days | 2 | Qualitative | Open Source, CI | |
| 86. Miscellaneous* | NA | Qualitative | All Source | |

*The Miscellaneous Indicators guard against the warning pitfall that indicators cause analysts to discard pertinent kinds of information they did not foresee. Analysts file raw reports that do not fit into any of the existing indicators in the Miscellaneous Indicators. Terrorism experts review reports in the miscellaneous categories annually to determine if any new indicators should be established.

The indicators described herein were derived primarily from case studies of terrorist operations, raw intelligence reporting, the Al Qaeda Manual, and interviews and surveys of terrorism analysts. In Task 1 of this methodology, the leading counterterrorism experts preferably meet on at least an annual basis to determine if indicators should be added to, or removed from, the list.

An indicator must be collectable. If an intelligence agency does not have the capability to collect on an indicator, then there is no point for analysts to watch for activity on that indicator. Therefore, the experts must ensure that the indicators are collectable. Table 4 identifies which type of intelligence asset is necessary to collect on each indicator. To cover all the indicators, not only are collection assets necessary from all 4 intelligence disciplines—Human Intelligence (HUMINT), Signals Intelligence (SIGINT), Imagery Intelligence (IMINT), and Measurement and Signatures Intelligence (MASINT); but also from counterintelligence (CI), law enforcement, and open sources (unclassified sources outside the Intelligence Community, such as the Internet). All the types of collection assets can cover some indicators, which are marked as "All Source" in the table.

The indicators are divided into 3 primary groups that reflect the three essential factors of risk. Risk consists of adversary intention, adversary capability, and target vulnerability. Threat consists only of adversary intention and adversary capability. Some people in the Intelligence Community may argue that analysts should only assess threat, not risk, because intelligence is traditionally restricted to assessing only enemy force information and risk involves assessing friendly force information (target vulnerability). But the reality is that decision makers need, and want, to know if a target is vulnerable to a threat. And intelligence analysts are the best people to synthesize enemy threat information and target vulnerability information into a comprehensive risk assessment. All 3 factors—adversary intention, adversary capability, and target vulnerability—must be present in order for risk to exist. The goal of terrorism warning is to identify the risk of a terrorist attack occurring, so analysts must identify indicators for the 3 components of risk.

Within each of those 3 groupings, the indicators are further identified as either Tactical/Target-Specific or Strategic/Countrywide. For example, among the Terrorist Intention Indicators, surveillance reveals terrorists' intentions against a specific target, whereas an indicator such as weapons movement just indicates a terrorist attack is brewing somewhere within a country. All the Terrorist Capability Indicators are strategic because terrorists' capabilities tend to be consistent throughout a country due to a relatively common security environment throughout the country (and distinct among countries due to the different security environments among countries). The capability indicators, nonetheless, are divided for greater analytic focus into lethal agent/technique and delivery method.

The Indicators are also identified as either quantitative or qualitative for analysis purposes in later steps of the methodology. Quantitative indicators relate to information that can be counted. For example, analysts can count the number of unresolved cases of surveillance at a facility over a given period of time. Qualitative indicators relate to information that cannot be counted, such as terrorist training or propaganda. Still, quantitative indicators have qualitative aspects too. For example, the manner of surveillance (covert or overt) is an important qualitative aspect of the quantitative indictor surveillance because surveillance that was done covertly probably has greater significance than surveillance that was done overtly. A great deal of intelligence information is qualitative and must be assessed using intuition since it cannot be counted. However, since intuition is a less accurate method of assessment than numerical calculation, analysts should identify quantitative intelligence information whenever possible, so that it can be assessed more accurately via numerical calculations. Seven of the Terrorism Indicators identified in Table 4 are quantitative. Because quantitative indicators have qualitative aspects too, a methodology for assessing indictors must be able to account for both aspects in one indicator.

There are Miscellaneous Indicators within each of the groupings. This is because a list of indicators should never be considered final and comprehensive. Changes in terrorists' modus operandi can lead them to conduct new activities that can be collected against. Furthermore, changes in collection capabilities can enable an entity to collect on terrorist activities that it previously could not. Since terrorists will continue to adjust their methods to overcome improvements in security, and since the U.S., for example, will continue to improve (and in some cases lose) collection capabilities with new technology, analysts must periodically review and revise their list of indicators. A method for analysts to keep up with the changes is to use Miscellaneous Indicators to file reports/indications that do not fit into any of the existing indicators (Indications are activities that have happened that fall into one of the indicator categories).

Thus, to determine if the list of Indicators should be altered, analysts (1) review the raw intelligence reports filed under the Miscellaneous Indicators to determine if any kinds of significant terrorist activity have been overlooked, (2) review collection capabilities to determine if the collecting entity has gained or lost the capability to collect on any terrorist activities, and (3) review case studies of terrorist operations to identify changes in terrorist modus operandi and determine if terrorists are conducting any new activities against which intelligence can collect. As analysts create the list of indicators according to that process, they record their rationale and supporting sources for each indicator on an Indicators Rationale Log webpage. The indicators required to assess the risk of an attack at a given target are different than the indicators necessary to assess the threat of a terrorist individual. It is individuals who intelligence and law enforcement must deal with to prevent terrorist attacks, so this methodology also identifies indicators (and warning levels) for terrorist individuals (as shown in Table 5). The indicators differ depending on the terrorist's position in his network (as shown in Table 5).

Again, some indicators are intentionally left blank for security reasons. Again analysts record their record their rationale and supporting sources for each indicator on an Indicators Rationale Log Webpage.

TABLE 5

Terrorist Position Indicators

Terrorist Position Indicators

Indicators are "those [collectable] things that would have to happen and . . . would likely happen as [a] scenario unfolded."
Indicators must be identified for the three factors that comprise threat to assess the threat of a given individual terrorist.
Threat: Adversary Capability and Adversary Intention
The following terrorist positions are a starting point for analysts, more positions may need to be identified.
Terrorist Position Priority is defined as: the level of influence a terrorist position could have on preventing fellow terrorists from executing a given attack. The positions are prioritized on a three level scale of:
Priority 1: Those terrorist positions that probably could prevent fellow terrorists from executing a given attack (~80% probability).
Priority 2: Those terrorist positions that possibly could prevent fellow terrorists from executing a given attack (~50% probability).
Priority 3: Those terrorist positions that probably could not prevent fellow terrorists from executing a given attack (~20% probability).

| | Priority | Data Type | Primary Collector(s) | Indicator Analyst |
|---|---|---|---|---|
| Terrorist Position: Leader, High/Strategic Level Priority 3 Position | | | | |
| Indicators of Intention | | | | |
| 1. Intentionally Left Blank | 1 | Quantitative | CI, Law Enforcement | Terrorist Network |
| 2. Intentionally Left Blank | 1 | Qualitative | CI, HUMINT | Indicator |
| 3. Intentionally Left Blank | 2 | Qualitative | CI, HUMINT | Specialist |
| 4. Intentionally Left Blank | 1 | Qualitative | CI, Law Enforcement | |
| 5. Intentionally Left Blank | 1 | Qualitative | CI, HUMINT, SIGINT | |
| 6. Miscellaneous* | NA | Qualitative | All Source | |
| Indicators of Capability | | | | |
| 7. Training | 1 | Qualitative | CI, HUMINT | |
| 8. Past Experience | 2 | Qualitative | CI, HUMINT | |
| 9. Weapons/Equipment Access | 1 | Qualitative | CI, HUMINT, SIGINT | |
| 10. Miscellaneous* | NA | Qualitative | All Source | |
| Terrorist Position: Leader, Mid/Operational Level Priority 2 Position | | | | |
| Indicators of Intention | | | | |
| 11. Intentionally Left Blank | 1 | Quantitative | CI, Law Enforcement | Terrorist Network |
| 12. Intentionally Left Blank | 1 | Qualitative | CI, HUMINT | Indicator |
| 13. Intentionally Left Blank | 2 | Qualitative | CI, HUMINT | Specialist |
| 14. Intentionally Left Blank | 1 | Qualitative | CI, Law Enforcement | |
| 15. Intentionally Left Blank | 1 | Qualitative | CI, HUMINT, SIGINT | |
| 16. Miscellaneous* | NA | Qualitative | All Source | |
| Indicators of Capability | | | | |
| 17. Training | 1 | Qualitative | CI, HUMINT | |
| 18. Past Experience | 2 | Qualitative | CI, HUMINT | |
| 19. Weapons/Equipment Access | 1 | Qualitative | HUMINT, SIGINT | |
| 20. Miscellaneous* | NA | Qualitative | All Source | |

TABLE 5-continued

Terrorist Position Indicators

Terrorist Position: Leader, Low/Tactical Level
Priority 1 Position

Indicators of Intention

| | | | | |
|---|---|---|---|---|
| 21. Intentionally Left Blank | 1 | Quantitative | CI, Law Enforcement | Terrorist Network |
| 22. Intentionally Left Blank | 1 | Qualitative | CI, HUMINT | Indicator |
| 23. Intentionally Left Blank | 2 | Qualitative | CI, HUMINT | Specialist |
| 24. Intentionally Left Blank | 3 | Qualitative | CI, Law Enforcement | |
| 25. Intentionally Left Blank | 3 | Qualitative | CI, HUMINT | |
| 26. Miscellaneous* | NA | Qualitative | All Source | |

Indicators of Capability

| | | | |
|---|---|---|---|
| 27. Training | 1 | Qualitative | CI, HUMINT |
| 28. Past Experience | 1 | Qualitative | CI, HUMINT |
| 29. Weapons/Equipment Access | 1 | Qualitative | CI, HUMINT, SIGINT |
| 30. Miscellaneous* | NA | Qualitative | All Source |

Terrorist Position: Propaganda Pusher
Priority 3 Position

Indicators of Intention

| | | | | |
|---|---|---|---|---|
| 31. Intentionally Left Blank | 1 | Qualitative | CI, Law Enforcement | Terrorist Network |
| 32. Intentionally Left Blank | 1 | Qualitative | CI, HUMINT | Indicator |
| 33. Intentionally Left Blank | 2 | Qualitative | CI, HUMINT | Specialist |
| 34. Intentionally Left Blank | 3 | Qualitative | CI, Law Enforcement | |
| 35. Intentionally Left Blank | 3 | Qualitative | CI, HUMINT | |
| 36. Miscellaneous* | NA | Qualitative | All Source | |

Indicators of Capability

| | | | |
|---|---|---|---|
| 37. Training | 1 | Qualitative | CI, HUMINT |
| 38. Past Experience | 1 | Qualitative | CI, HUMINT |
| 39. Weapons/Equipment Access | 1 | Qualitative | CI, HUMINT, SIGINT |
| 40. Miscellaneous* | NA | Qualitative | All Source |

Terrorist Position: Recruiter
Priority 2 Position

Indicators of Intention

| | | | | |
|---|---|---|---|---|
| 41. Intentionally Left Blank | 1 | Quantitative | CI, Law Enforcement | Terrorist Network |
| 42. Intentionally Left Blank | 1 | Qualitative | CI, HUMINT | Indicator |
| 43. Intentionally Left Blank | 2 | Qualitative | CI, HUMINT | Specialist |
| 44. Intentionally Left Blank | 3 | Qualitative | CI, Law Enforcement | |
| 45. Intentionally Left Blank | 3 | Qualitative | CI, HUMINT | |
| 46. Miscellaneous* | NA | Qualitative | All Source | |

Indicators of Capability

| | | | |
|---|---|---|---|
| 47. Training | 1 | Qualitative | CI, HUMINT |
| 48. Past Experience | 1 | Qualitative | CI, HUMINT |
| 49. Weapons/Equipment Access | 1 | Qualitative | CI, HUMINT, SIGINT |
| 50. Miscellaneous* | NA | Qualitative | All Source |

Terrorist Position: Trainer
Priority 2 Position

Indicators of Intention

| | | | | |
|---|---|---|---|---|
| 51. Intentionally Left Blank | 1 | Quantitative | CI, Law Enforcement | Terrorist Network |
| 52. Intentionally Left Blank | 1 | Qualitative | CI, HUMINT | Indicator |
| 53. Intentionally Left Blank | 2 | Qualitative | CI, HUMINT | Specialist |
| 54. Intentionally Left Blank | 3 | Qualitative | CI, Law Enforcement | |
| 55. Intentionally Left Blank | 3 | Qualitative | CI, HUMINT | |
| 56. Miscellaneous* | NA | Qualitative | All Source | |

TABLE 5-continued

Terrorist Position Indicators

Indicators of Capability

| | | | | |
|---|---|---|---|---|
| 57. Training | 1 | Qualitative | CI, HUMINT | |
| 58. Past Experience | 1 | Qualitative | CI, HUMINT | |
| 59. Weapons/Equipment Access | 1 | Qualitative | CI, HUMINT, SIGINT | |
| 60. Miscellaneous* | NA | Qualitative | All Source | |

Terrorist Position: Money Facilitator
Priority 2 Position

Indicators of Intention

| | | | | |
|---|---|---|---|---|
| 61. Intentionally Left Blank | 1 | Quantitative | CI, Law Enforcement | Terrorist Network |
| 62. Intentionally Left Blank | 1 | Qualitative | CI, HUMINT | Indicator |
| 63. Intentionally Left Blank | 2 | Qualitative | CI, HUMINT | Specialist |
| 64. Intentionally Left Blank | 3 | Qualitative | CI, Law Enforcement | |
| 65. Intentionally Left Blank | 3 | Qualitative | CI, HUMINT | |
| 66. Miscellaneous* | NA | Qualitative | All Source | |

Indicators of Capability

| | | | | |
|---|---|---|---|---|
| 67. Training | 1 | Qualitative | CI, HUMINT | |
| 68. Past Experience | 1 | Qualitative | CI, HUMINT | |
| 69. Weapons/Equipment Access | 1 | Qualitative | CI, HUMINT, SIGINT | |
| 70. Miscellaneous* | NA | Qualitative | All Source | |

Terrorist Position: Weapons Facilitator
Priority 1 Position

Indicators of Intention

| | | | | |
|---|---|---|---|---|
| 71. Intentionally Left Blank | 1 | Quantitative | CI, Law Enforcement | Terrorist Network |
| 72. Intentionally Left Blank | 1 | Qualitative | CI, HUMINT | Indicator |
| 73. Intentionally Left Blank | 2 | Qualitative | CI, HUMINT | Specialist |
| 74. Intentionally Left Blank | 3 | Qualitative | CI, Law Enforcement | |
| 75. Intentionally Left Blank | 3 | Qualitative | CI, HUMINT | |
| 76. Miscellaneous* | NA | Qualitative | All Source | |

Indicators of Capability

| | | | | |
|---|---|---|---|---|
| 77. Training | 1 | Qualitative | CI, HUMINT | |
| 78. Past Experience | 1 | Qualitative | CI, HUMINT | |
| 79. Weapons/Equipment Access | 1 | Qualitative | CI, HUMINT, SIGINT | |
| 80. Miscellaneous* | NA | Qualitative | All Source | |

Terrorist Position: Attacker
Priority 1 Position

Indicators of Intention

| | | | | |
|---|---|---|---|---|
| 81. Intentionally Left Blank | 1 | Quantitative | CI, Law Enforcement | Terrorist Network |
| 82. Intentionally Left Blank | 1 | Qualitative | CI, HUMINT | Indicator |
| 83. Intentionally Left Blank | 2 | Qualitative | CI, HUMINT | Specialist |
| 84. Intentionally Left Blank | 3 | Qualitative | CI, Law Enforcement | |
| 85. Intentionally Left Blank | 3 | Qualitative | CI, HUMINT | |
| 86. Miscellaneous* | NA | Qualitative | All Source | |

Indicators of Capability

| | | | | |
|---|---|---|---|---|
| 87. Training | 1 | Qualitative | CI, HUMINT | |
| 88. Past Experience | 1 | Qualitative | CI, HUMINT | |
| 89. Weapons/Equipment Access | 1 | Qualitative | CI, HUMINT, SIGINT | |
| 90. Miscellaneous* | NA | Qualitative | All Source | |

TABLE 5-continued

Terrorist Position Indicators

Terrorist Position: Unknown
Priority 2 Position

Indicators of Intention

| | | | | |
|---|---|---|---|---|
| 91. Intentionally Left Blank (All indicators from all positions) | 1 | Quantitative | CI, Law Enforcement | Terrorist Network |
| 92. Intentionally Left Blank | 1 | Qualitative | CI, HUMINT | Indicator |
| 93. Intentionally Left Blank | 2 | Qualitative | CI, HUMINT | Specialist |
| 94. Intentionally Left Blank | 3 | Qualitative | CI, Law Enforcement | |
| 95. Intentionally Left Blank | 3 | Qualitative | CI, HUMINT, | |
| 96. Miscellaneous* | NA | Qualitative | All Source | |

Indicators of Capability

| | | | |
|---|---|---|---|
| 97. Training | 1 | Qualitative | CI, HUMINT |
| 98. Past Experience | 1 | Qualitative | CI, HUMINT |
| 99. Weapons/Equipment Access | 1 | Qualitative | CI, HUMINT, SIGINT |
| 100. Miscellaneous* | NA | Qualitative | All Source |

*The Miscellaneous Indicators guard against the warning pitfall that indicators cause analysts to discard pertinent kinds of information they did not foresee. Analysts file raw reports that do not fit into any of the existing indicators in the Miscellaneous Indicators. Terrorism experts review reports in the miscellaneous categories annually to determine if any new indicators should be established.

Task 2:

In Task 2, analysts determine/validate priorities of Indicators (preferably annually). Some indicators are more significant than others. For instance, among the-indicators of terrorist intentions, weapons movement to the target area must take place before an attack; whereas an increase in terrorist propaganda is not a prerequisite. Therefore, weapons movement would carry a higher significance/priority than increased propaganda. Likewise, some capability indicators reflect a greater damage potential than others. For instance, a nuclear attack will kill more people than a conventional bombing. Therefore, nuclear attack would carry a higher priority. Similarly, some vulnerability indicators can have a greater effect on a target's vulnerability than others. For instance, a location's Force Protection Condition (FPCON/security posture) has a higher effect on a facility's vulnerability than the level of the country's cooperation with, for example, the U.S.

Indicator Priority is an intuitive rating on the significance of an indicator. On at least an annual basis, the leading counterterrorism experts determine if the priority of any of the indicators needs to be adjusted. The Indicators of Terrorism are prioritized in this methodology on a scale of 1 through 3 according to the following definitions for (1) Terrorist Intention Indicator Priorities, (2) Terrorist Capability Indicator Priorities, and (3) Target Vulnerability Indicator Priorities, as follow:

(1) Terrorist Intention Indicator Priorities

Intention Indicator Priority 1: Those things that must occur (about 99 percent probability) before an attack (such as surveillance).

Intention Indicator Priority 2: Those things that are highly likely to occur (about 80 percent probability) before an attack (such as terrorist travel).

Intention Indicator Priority 3: Those things that are likely to occur (at least 60 percent probability) before an attack (such as propaganda). This priority is based on the analyst's assessment of the likelihood that the activity will occur before an attack. Priority does not reflect the likelihood that intelligence will detect and collect on the activity.

(2) Terrorist Capability Indicator Priorities

Capability Indicator Priority 1: Capabilities that are most likely to have high damage on a population (more than 10,000 casualties) (such as nuclear explosion).

Capability Indicator Priority 2: Capabilities that are most likely to have moderate damage on a population (more than 100 and less than 10,000 casualties) (such as conventional explosion).

Capability Indicator Priority 3: Capabilities that are most likely to have low damage on a population (less than 100 casualties).

(The concept of "most likely" is a key point. Computer Network Attack capability is rated as a Priority 3 Indicator. Of course it is possible for a computer network attack to have a high damage on a population, but the current reality is that computer network attacks occur daily and are most likely to have low damage on a population. The priority of an indicator can be changed at any time.)

(3) Target Vulnerability Indicator Priorities

Vulnerability Indicator Priority 1: Those things that have a high effect (about 90 percent) on the vulnerability of a target (such as the current Security Posture/FPCON).

Vulnerability Indicator Priority 2: Those things that have a moderate effect (about 50 percent) on the vulnerability of a target (such as a country's cooperation with the U.S. on counterterrorism efforts).

Vulnerability Indicator Priority 3: Those things that have a low effect (about 10 percent) on the vulnerability of a target.

Analysts also rate/validate the priority for each Terrorist Position Indicator. When analysts rate the priority of each terrorist position indicator, they also rate/validate the priority of each terrorist position. The priority assigned to each position is also shown in Table 5. Terrorist Position Priority is defined as: the level of influence a terrorist position could have on preventing fellow terrorists from executing a given attack. The positions are prioritized on a three level scale of:

Priority 1: Those terrorist positions that probably could prevent fellow terrorists from executing a given attack (~80% probability).

Priority 2: Those terrorist positions that possibly could prevent fellow terrorists from executing a given attack (~50% probability).

Priority 3: Those terrorist positions that probably could not prevent fellow terrorists from executing a given attack (~20% probability).

As analysts determine the priorities according to these guidelines, they also record their rationale and supporting sources for each indicator priority in the Indicators Rationale Log.

Task 3:

In Task 3, analysts develop/validate Indicator Question Sets on each Indicator (preferably annually). Because indicators are the foundation and building blocks of this methodology, the type of information required to assess the status of an indicator should be clearly defined and recorded. Thus, on at least an annual basis, the leading counterterrorism experts validate a list of key questions for each indicator. The question sets identify the key factors that experts have determined are necessary to assess the status of a given indicator. For instance, U.S. court case records show that Muslim extremist terrorist operatives who conduct the long-term planning for an attack tend to travel into the target country with valid passports and detailed cover stories; whereas the operatives who carry out the attack tend to travel into the country just several days before the attack without valid passports or detailed cover stories. Therefore, a Priority 1 question for the Terrorist Travel Indicator might be, "Have any terrorist operatives attempted to travel into the country without valid passports or detailed cover stories?"

Not only do these question sets function to assist an analyst in assessing the status of an indicator, but they also function as the list of prioritized intelligence Collection Requirements for intelligence collectors. The entire list of indicators and corresponding Indicator Question Sets form an Intelligence Collection Plan against terrorism. These questions define what the Counterterrorism Community needs to know in order to recognize when a terrorist attack operation is unfolding and how to stop it. As collectors provide analysts the answers to these questions, analysts will be able to assess the indicators of a terrorist attack. The questions must be stated in a particular format so they meet the needs of both intelligence collectors and analysts, and so that they are compatible with the automated functions later in the methodology that will save analysts time. A question on a key factor must first be stated in a yes/no format, such as "Have any terrorist operatives attempted to travel into the country without valid passports or detailed cover stories?" Then the question should be broken into sub-questions that require collectors to provide details, such as "Who were the suspected terrorists? When did they arrive? What was their cover story? How did they obtain the false passports? Who were they supposed to meet? Do they know of any other terrorists who will also try to enter the country?" As analysts create the list of questions according to those guidelines, they record their rationale and supporting sources for each question on an Indicator Questions Rationale Log Webpage.

Task 4:

In Task 4, analysts determine/validate priorities of questions in Indicator Question Sets (preferably annually). The leading counterterrorism experts also prioritize the key questions on a scale of 1 through 3 with 1 being the most significant. Only the yes/no format questions need to be prioritized. Indicator Question Priority is an intuitive rating on the significance of an indicator question in determining the status, or activity level, of an indicator (which is discussed in Task 13). These priorities affect both intelligence collection priorities and analysts' assessments. As analysts determine the priorities of the questions, they also record their rationale and supporting sources for each question priority on the Indicator Questions Rationale Log.

Phase II

In Phase II, the Key Elements of Information required to forecast a topic (using Indicators and Indicator Question Sets) are identified. An Intelligence Collection Plan (using Collection Requirements) is published.

Task 5:

In Task 5, a computer program publishes the Indicator Question Sets as Collection Requirements in an Intelligence Collection Plan (preferably annually and as required). Now that analysts have determined what kind of information is necessary to forecast their topic (indicators and Indicator Question Sets), they must ensure that intelligence collectors seek out that information by turning the Indicator Question Sets into Intelligence Collection Requirements in an Intelligence Collection Plan.

An intelligence collector cannot publish a report on a topic that does not meet an Intelligence Collection Requirement, so analysts must ensure their information requirements are turned into official collection requirements. The indicator list and corresponding indicator question sets are the primary, generic Intelligence Collection Requirements (that apply to any terrorist group, country, or target) of the Intelligence Collection Plan. The U.S. Defense Indications and Warning System (DIWS) holds that indicators should be turned into collection plans in order to focus collection in a way that will support warning.

Therefore, on at least an annual basis, after the indicator list and indictor question sets have been validated, the leading counterterrorism experts publish a corresponding Intelligence Collection Plan and make it easily accessible to intelligence collectors by posting it on a Webpage, password protected if necessary.

Figure 2:
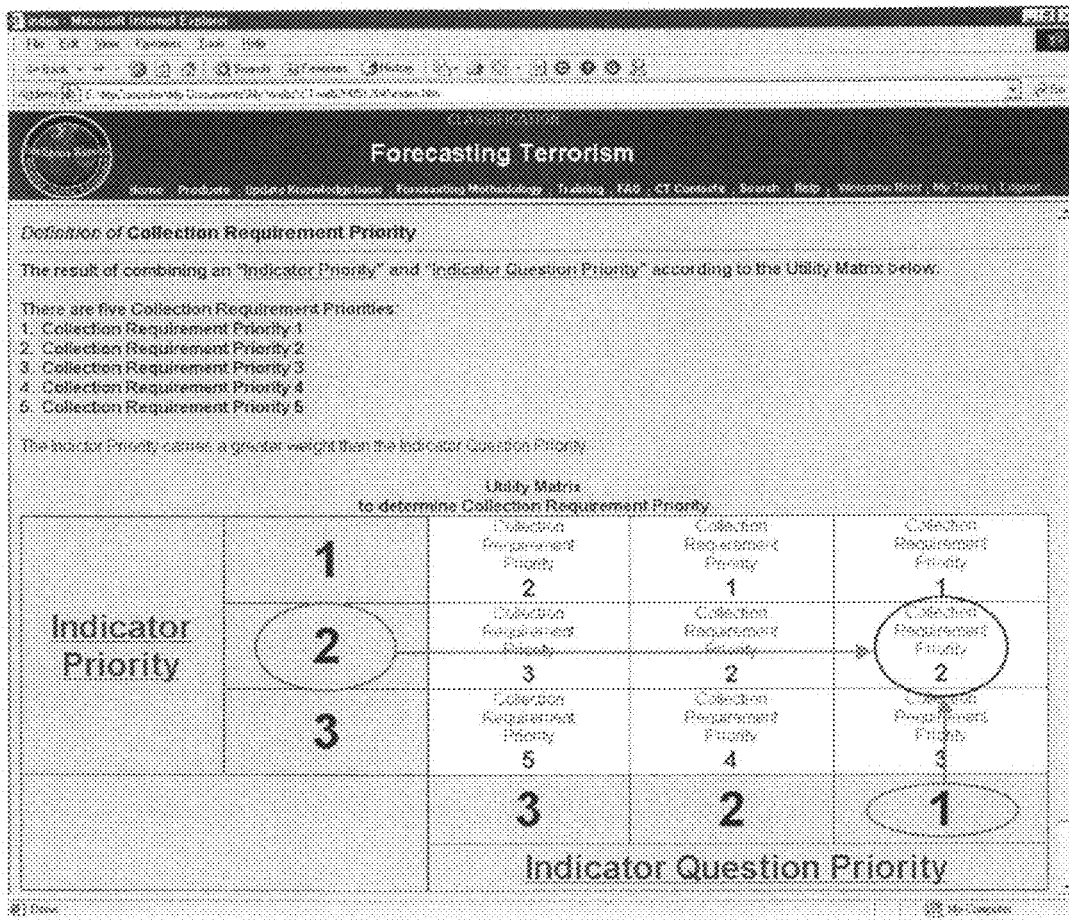
FIG. 2 shows a utility matrix illustrating how Indicator Priority and Indicator Question Priority can be combined to determine Collection Requirement Priority.

The "Primary Collectors" identified for each indicator in the indicator list (which were identified to justify that the indicator is collectable) are the primary collection assets that will be tasked. Prioritizing Collection Requirements is necessary to avoid draining the limited intelligence collection assets. The priorities of the indicators and indicator questions are the basis of the priorities of the Collection Requirements in the Intelligence Collection Plan. The computer program combines an Indictor Priory and an Indicator Question Priority according to Utility Matrix 1 (shown in FIG. 2) to determine the Collection Requirement Priority value on a 5-level scale of:

(1) Collection Requirement Priority 1 (the most significant).
(2) Collection Requirement Priority 2.
(3) Collection Requirement Priority 3.
(4) Collection Requirement Priority 4.
(5) Collection Requirement Priority 5.

The Utility Matrix 1 works as follows. The computer program combines an Indictor Priory (shown in one of the boxes on the y-axis of FIG. 2.) and an Indicator Question Priority (shown in one of the boxes on the x-axis of FIG. 2.) according to Utility Matrix 1 to determine a Collection Requirement Priority shown in one of the inside boxes of the utility matrix. For example, if the Indicator Priority was "Priority 2" and the Indicator Question Priority was "Priority 1" then the Collection Requirement Priority would be "Priority 2." The Indictor Priority carries a great weight than the Indicator Question Priority.

Analysts can add generic questions (which apply to any terrorist group/network, country, or target) to the generic Indicator Question Sets at any time if they think another factor should be considered to assess the status of the indicator. The new questions, once approved by Senior Warning Officers, are automatically added as Collection Requirements to the Intelligence Collection Plan Webpage.

In Task 43, analysts can also add terrorist group/network-specific, country-specific, and target-specific requirements for any indicator (after analysts have assessed and developed an understanding of specific terrorist groups/networks, countries, and targets), and these requirements are listed beneath the primary generic requirement set for each indicator. Of course, analysts can re-sort the list of requirements according to country or terrorist group by making selections on the Website in the Intelligence Collection Plan.

There is no single place that intelligence collectors with a need to know can access all the Intelligence Community's latest intelligence Collection Requirements on a given topic, so consequently an intelligence collector must spend valuable time researching requirements that could be better spent researching sources. The Director of National Intelligence (DNI) should mandate that all 15 Member Organizations of the Intelligence Community make all their intelligence collection requirements available to intelligence collectors on a single website interface. This would improve the timeliness of communication between intelligence analysts and intelligence collectors and therefore improve the timeliness of intelligence warning products.

Phase III

In Phase III, information (using the Master Database) is consolidated.

Task 6:

In Task 6, Intelligence Community Member Organizations publish all Raw Intelligence Reports from Intelligence Collectors on an Intelligence Community Master Raw Reports Log Webpage (preferably daily).

Now that analysts have prompted collection of the information they need, analysts must be able to obtain all the information that was collected to make the best possible warning assessment. This methodology will make the very most of whatever information it receives, but it will be most powerful if it has all the available Intelligence Community information. There are two reasons for this. First, it is an analysis of competing hypotheses. Therefore, the system should allow all worldwide hypotheses to compete. Second, all the pieces of the puzzle are needed to get the best possible picture. Fractionalized distribution of information was cited as a key cause of warning failure in two of the U.S.'s most devastating homeland surprise attacks—Pearl Harbor and the September 11th terrorist attacks.

There is no single place that analysts with a need to know can access all the Intelligence Community's raw reporting on a given topic. The Director of National Intelligence (DNI), should mandate that all 15 Member Organizations of the Intelligence Community make all their raw intelligence reports available to analysts through a single website interface, an Intelligence Community Raw Reports Master Website. The reports could remain in their current databases (as moving them into a new database could be unnecessarily costly and time consuming), and analysts could access the reports via hyperlinks on a single website interface. Access to highly sensitive reports could be controlled based on a user's identification. That would enable any analyst or organization monitoring a given topic, such as terrorism, to draw all the necessary reporting from one place. Today one would have to gain access to more than a dozen different databases to get all terrorism related raw intelligence reporting.

Understandably, there is a need to compartment information in order to protect sensitive sources and methods. Today's Information Technology is capable of restricting access within a database based on both a reports' classification and a user's identification. The major benefit of hindsight after intelligence warning failures is that it is the first time all the information has been consolidated.

Thus, the daily process begins with the requirement that all members of an intelligence community (such as the fifteen Member Organizations of the U.S. Intelligence Community (Air Force Intelligence, Army Intelligence, Central Intelligence Agency (CIA), Coast Guard Intelligence, Defense Intelligence Agency (DIA), Department of Energy, Department of Homeland Security (DHS), Department of State, Department of Treasury, Federal Bureau of Investigation (FBI), Marine Corps Intelligence, National Geospatial-Intelligence Agency (NGA), National Reconnaissance Office (NRO), National Security Agency (NSA), and Navy Intelligence) and other U.S. federal organizations that may have terrorism-related information (such as the National Infrastructure Protection Center (NIPC), the Center For Disease Control (CDC), and the Drug Enforcement Administration (DEA)) make all their raw intelligence reports (on all intelligence topics, not just terrorism) available on an Intelligence Community Raw Reports Master Website. Based on the field headings that intelligence collectors put on the reports, the reports are automatically identified according to identification number, classification, and broad intelligence topics such as terrorism or economics (a report can relate to more than one topic). Additionally, the FBI would consolidate suspicious incident reports from local law enforcement agencies, private security companies, commercial firms, and private citizens. Each agency can sanitize their reports (remove information that may compromise sensitive sources and methods or reveal the identity of U.S. citizens) before making the report available on the website. If sanitizing a report will remove the threat information, then the report is classified at a level that causes the website to restrict access to only a limited number of analysts and system administrators. Thus the website restricts a user's access to individual reports based on both the user's identification and the report's classification.

Task 7:

In Task 7, the Computer Program and Analysts enter all Terrorism Related Raw Intelligence Reports into a Terrorism Forecasting Master Database under Appropriate Indicators, Indicator Questions, Targets, Countries, Terrorist Groups, and Other Data Profile Elements (preferably daily).

All the terrorism related Raw Intelligence Reports (an estimated 7500 per day) are consolidated and matched to the terrorism forecasting information requirements (indicators and indictor question sets) in a Terrorism Forecasting Master Database. The computer program and analysts cooperate daily in this task to enter and profile incoming reports into the database according to all the indicators, indicator questions, targets, countries, terrorist groups, and other data profile elements provided on the database's "Raw Intelligence Report Input Form." One can access this Webpage from the homepage under the hyperlink "Update Knowledgebase" and then the hyperlink "Raw Intelligence Report Input Form". The Webpage excludes some data profile elements for security reasons.

First, the computer program automatically enters and pre-categorizes the reports in the database according to all the indicators, targets, countries, terrorist groups, and individuals that apply, based on key words, and also inputs some additional data profile elements, such as topic and classification. A report's classification profile from the original publishing agency automatically carries over to the Terrorism Forecasting Master Database, so access to the report within the forecasting database is again restricted based on both the report's classification and a user's identification. The data profile fields that the computer automatically enters are marked "Automated Entry" on the input form. Then, a large group of junior analysts, called "Raw Reporting Profilers", validates and adjusts the categorization of the reports, and also fills in some additional categorizations that the computer cannot, such as source credibility factors and information feasibility (discussed further in Task 12). The data profile fields that analysts must enter or validate are bolded on the input form.

These computer programs (taxonomies) that presort reports based on key words are about 80 percent accurate. Humans are also about 80 percent accurate. By combining both, analysts can increase accuracy and save time and manpower.

Alternatively, the requirement for the Raw Reporting Profilers could be eliminated entirely by: (1) Relying on the artificial intelligence computer program (taxonomies) to presort the reports based on key words (after a period of observation evaluation); (2) Tasking the Indicator Specialists to validate and complete the profiles of reports when they read the reports to update their Indicator Questions, Answers, and Evidence Logs; and/or (3) Increasing the number of Indicator Specialists by 19%; and (4) requiring that intelligence collectors profile their reports according to the terrorist groups, countries, targets, indicators and indicator questions that apply as part of the required process for publishing a raw intelligence report.

This task is time efficient, time saving, and reasonable because analysts are already taking the time to read the reports and make judgments about them, so the extra time lies only in documenting those judgments, which takes the least time of the three actions (reading, judging, and documenting) when using this system of mostly checking and un-checking boxes. Furthermore, if analysts are already documenting their judgments, then this method will probably save them time because (1) this method of documenting is highly efficient since it uses a swift computer assisted method of simply checking and un-checking boxes, and (2) this method makes the documentation available to all other analyst so duplicate documentation is not necessary among analysts who work with the same information (for example, a report that relates to multiple indicators, targets, or countries). Moreover, there are more analysts in the Intelligence Community than intelligence collectors, and collectors typically take days to research, collect, and write reports; where as it only takes an analyst an average of 10 minutes to read and profile a report in this system, so this time requirement is completely reasonable. Also, this task enables the computer to take over other tasks for the analysts, which saves analysts time.

This task is valuable because decision makers frequently want to know about the specific raw reports and sources on which warning assessments hinge, so the logic chain that these profiles create are valuable because they enable analysts to easily find answers to decision maker's questions. Furthermore, reading with a specific purpose is more effective than reading without a specific purpose according to reading and study instructors. In this system, reading with the purpose of profiling a report according to key information requirements (in order to enable a comprehensive, computer assisted forecasting methodology) is probably more effective and efficient than reading without a specific purpose or reading with a purpose that doesn't enable a comprehensive, computer assisted forecasting methodology.

A single raw report may relate to multiple terrorist groups, countries, specific targets, indicators, and key questions. If a report does not fit into any of the existing indicators, then the analyst files the report in the appropriate "Other/Miscellaneous" indicator of terrorist intention, terrorist capability, or target vulnerability so that the report may be found and reviewed later when analysts meet annually to determine if any new indicators need to be established. If a report pertains to a target or terrorist group that is not listed in the database, then the analyst adds the target or terrorist group to the list, which causes the computer program to create a new hypothesis matrix with the new associated evidence, which is discussed in Task 9.

Task 8:

In Task 8, the Computer Program displays all Terrorism Related Raw Intelligence Reports in a Daily Readfile (preferably daily). A Daily Readfile with an Archive consolidates the raw intelligence reports in a user-friendly product. The computer program automatically displays hyperlinks to all the previous day's new raw intelligence reports in the Readfield and creates hyperlinks to past Readfiles in the Archives each day. The reports are color-coded to indicate Information Validity on a five-level scale, for which the rational is discussed in detail in Task 13.

Red indicates reports that are judged "Almost Certainly Valid" (about 90% probability). Orange indicates reports that are judged "Probably Valid" (about 70% probability). Black indicates reports that are judged "Unknown Validity" (or about 50% probability). The 50% option is marked "unknown". This is because a 50% probability does not assert something one way or the other. A decision maker may as well not even have an assessment. If the analyst asserts a 50% probability, then he is actually asserting that he does not know. This type of information will automatically become higher priority Intelligence Collection Requirements for intelligence collectors in the Intelligence Collection Plan (in Task 42). Yellow indicates reports that are judged "Probably Not Valid" (about 30% probability). Gray indicates reports that are judged "Almost Certainly Not Valid" (about 10% probability). The reports are also font-coded. Bold-face of any color indicates reports that pertain to threats within the next 30 days. Italics of any color indicate reports that analysts intend to discount from assessments. There are only 5 acceptable reasons for discounting reports, which are discussed in Task 12. The Webpage "What Raw Reports' Colors and Fonts Mean" explains the color and font coding.

The Readfile defaults to listing the reports in order of Information Validity and then alphabetizes the reports by county within each of those validity groupings, however, users can re-sort the reports according to terrorist group, country, target, indicator, threat/incident status, topic, or identification number by clicking on any of those column headings.

Every terrorist target that is reported in the Daily Readfile has a potential target hypothesis matrix webpage that displays all the associated evidence, which brings us to the next task.

Phase IV

In Phase IV, information is sorted (using Hypothesis Matrices).

Task 9:

In Task 9, the Computer Program creates Potential Target Hypothesis Matrices with hyperlinks to raw intelligence reports filed by Indicators (preferably daily). After analysts validate the profile of raw intelligence reports in the Terrorism Forecasting Master Database, the computer program automatically creates Potential Target Hypothesis Matrix Webpages for every reported target that is entered in the database and displays hyperlinks to the reports under the appropriate indicator(s) within the hypothesis matrices.

The hypothesis matrix shows the indicators and indications (activities that have happened as identified in the raw intelligence reports) of a terrorist network's intentions to attack a target in a given country. This hypothesis matrix lists just the Terrorism Intention Indicators from top to bottom, with those that are of a tactical (or target-specific) nature grouped on the top and those of a strategic (or countrywide) nature grouped off the screen on the bottom.

Notably, a terrorist network includes multiple groups that cooperate or use each other's resources, so a hypothesis matrix can include reporting on multiple terrorist groups within the same terrorist network. By clicking on the "Terrorist Network" hyperlink, users can see which terrorist groups are included in this terrorist network and hypothesis matrix. If analysts don't consolidate reporting pertaining to all the groups in a terrorist network, then analysts might not be able to recognize when the combination of the terrorist groups' efforts has enabled the terrorists to accomplish all the necessary preparations for an attack.

Each potential target hypothesis matrix in this system lays out hyperlinks to all the evidence, or raw intelligence reports, relating to that hypothesis. The hypothesis matrices create a "ground truth" warning picture of all the associated evidence. Hypothesis testing is easier to apply to terrorism analysis than other traditional subjects such as political or economic analysis. This is because all the different hypotheses are grounded in the same set of expected evidence-indicators of terrorism. Thus, analysts do not need to create completely different lists of expected evidence (indicators) for each potential hypothesis.

The reports/evidence are listed behind the hyperlink "Relevant Raw Reports" in the hypothesis matrix webpage. Again, the reports are color-coded to indicate Information Validity (on a five-level scale of Almost Certainly Valid (~90%), Probably Valid (~70%), Unknown Validity (or ~50%), Probably Not Valid (~30%), and 5) Almost Certainly Not Valid (~10%)), which is discussed in Task 12. The report list defaults to most valid on top, and then most current on top within each of those groupings, but users can re-sort the reports according to date/identification number, threat/incident status, or topic. Some report hyperlinks do not lead to the text of the report in to order protect especially sensitive intelligence sources and methods; instead, the hyperlinks lead to the contact information of the database security manager, who can provide the reports to people with a need to know.

It is twice as effective to disprove a hypothesis than to prove one. Therefore, typical hypothesis testing seeks evidence to disprove hypotheses. For that reason, Anti-Indicators are also maintained in each hypothesis matrix to file reports that are inconsistent with the hypothesis. To identify Anti-Indicators analysts should ask themselves questions such as: What would make me change my mind? What is missing that is essential? What would prevent this scenario from unfolding? What has happened that would not happen before a terrorist attack?

Still, unlike typical hypothesis testing that discards a hypothesis with one piece of refuting evidence, this methodology does not because intelligence information is not necessarily credible, and that understanding must be factored into assessments accordingly. The refuting information is either weighed as a Priority 1 Indicator, or the analyst can summarily dismiss the hypothesis if the information is deemed highly credible. The analyst decides on a case-by-case basis in Task 14, and the corresponding indicator is marked on the webpage as either Priority 1 or Trump. Judging the validity of evidence, whether it is consistent or inconsistent with a hypothesis, is an acceptable approach to intelligence information because it is not as reliable as scientific information obtained in controlled experiments.

If a report of about 50 percent validity or greater arrives that pertains to a target, country, or terrorist network that has not been previously reported, then the computer program automatically creates a new hypothesis matrix to represent that target, country, or terrorist network when the analyst enters the report into the database. Thus, the reporting drives development of new threat scenarios/hypotheses. This guards against the indicator-based warning pitfall that "scenarios create mindsets," which can cause analysts to discard reporting that points to an unimagined threat scenario/hypothesis.

Task 10:

In Task 10, the Computer Program creates Potential Terrorist Individual Hypothesis Matrices with hyperlinks to raw intelligence reports filed by Indicators (preferably daily). The computer program also automatically creates Potential Terrorist Individual Hypothesis Matrix Webpages (discussed further in Task 28) for every reported possible terrorist that is entered in the database and displays hyperlinks to the reports under the appropriate terrorist position indicator(s) (identified in Table 5) within the hypothesis matrices. A separate hypothesis matrix is created for individuals because the indicator list is different-for individuals than for targets.

Task 11:

In Task 11, the Computer Program feeds raw intelligence reports into appropriate Indicator Questions, Answers, & Evidence Logs within the Hypothesis Matrices (preferably daily). The master database also feeds the raw reports into the appropriate Indicator Questions, Answers, & Evidence Logs within the Hypothesis Matrices for analysis purposes in Task 12. Thus, a hyperlink to a given raw report exists in a hypothesis matrix under both the "Relevant Raw Reports" listing and the "Indicator Questions, Answers, & Evidence Log," which contains the Indicator Question Sets identified in Task 3.

Phase V

In Phase V, conclusions are drawn using Intuitive and Structured Techniques.

Task 12:

In Task 12, Analysts and the Computer Program assess Raw Intelligence Reports' Information Validity (preferably daily). The reports are color coded on the Webpages to indicate Information Validity, which the computer program calculates from analysts' rating of Source Credibility and Information Feasibility.

When the analysts profile a report in the database, they check a list of boxes to rate Source Credibility and Information Feasibility, from which the computer program calculates Information Validity and color-code the list of reports in the Webpages hypothesis matrices according to the following color-coding system. Red indicates reports that are judged "Almost Certainly Valid" (about 90% probability).

Orange indicates reports that are judged "Probably Valid" (about 70% probability). Black indicates reports that are judged "Unknown Validity" (or about 50% probability). Again, the 50% option is marked "unknown". This is because a 50% probability does not assert something one way or the other. A decision maker may as well not even have an assessment. If the analyst asserts a 50% probability, then he is actually asserting that he does not know. This type of information will automatically become higher priority Intelligence Collection Requirements for intelligence collectors in the Intelligence Collection Plan (in Task 42). Yellow indicates reports that are judged "Probably Not Valid" (about 30% probability). Gray indicates reports that are judged "Almost Certainly Not Valid" (about 10% probability).

To rate Source Credibility, analysts rate two factors, which the computer program uses to suggest a source credibility rating, but an analyst can override the suggestion if he chooses. The analyst should base these ratings on information that the intelligence collector provides in the raw intelligence report. If the report doesn't include the information, then the analysts should check the box for "Unknown" in the Raw Intelligence Report Input Form.

Factor 1, the Source Motivation for Providing Information, is rated on the following three-level scale: (1) ~75% Probability: "Motivations Most of Often Associated with Credible Sources" (A hyperlink to a list of these motivations would be provided on the website, but the list is intentionally excluded for security reasons and because it still requires research; (2) ~50% Probability: "Unknown Motivations (which includes motivations given that are suspected to be lies)" or "Motivations Associated with both Credible and Non-Credible Sources About Equally Often" (A hyperlink to a list of these motivations would be provided on the website, but the list is intentionally excluded for security reasons and because it still requires research; and (3) ~25% Probability: "Motivations Least Often Associated with Credible Sources" (a hyperlink to a list of these motivations would be provided on the Website).

Figure 3:
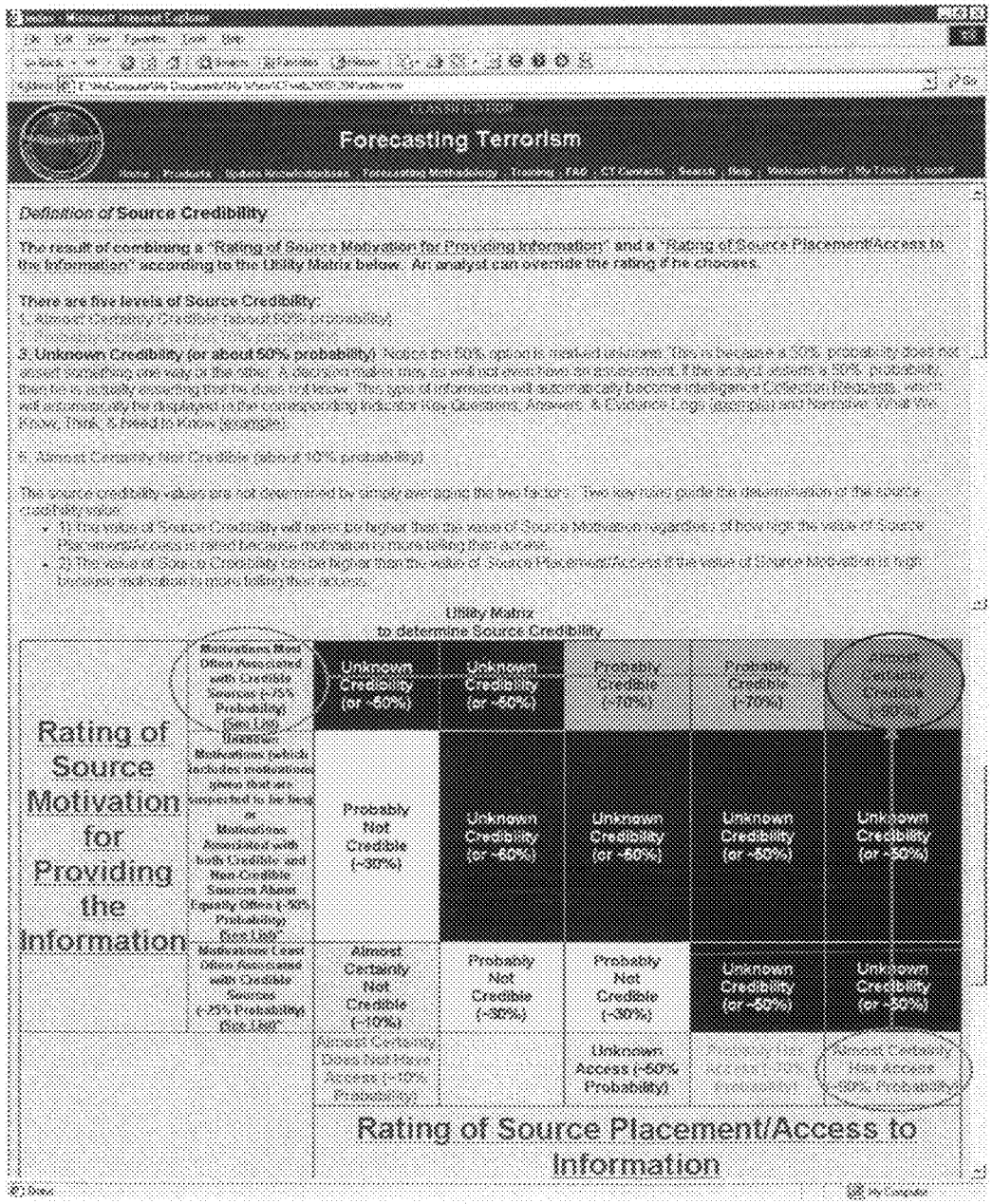
FIG. 3 shows a utility matrix that illustrates how a Rating of Source Motivation for Providing Information and a rating of Source Placement/Access to Information can be combined to determine Source Credibility.

Factor 2, the Source Placement/Access to Information, is rated on the following five level scale: (1) "Almost Certainly Has Access (~90% Probability)"; (2) "Probably Has Access (~70% Probability)"; (3) "Unknown Access (~50% Probability)"; (4) "Probably Does Not Have Access (~30% Probability)"; and (5) "Almost Certainly Does Not Have Access (~10% Probability)". Then, the computer program combines the Source Motivation value and the Source Placement/Access value according to Utility Matrix 2 (shown in FIG. 3) to determine the Source Credibility value on a 5-level scale of: 1) "Almost Certainly Credible (~90%)"; (2) "Probably Credible (~70%)"; (3) "Unknown Credibility (or ~50%)"; (4) "Probably Not Credible (~30%)"; and (5) "Almost Certainly Not Credible (~10%)".

The Utility Matrix 2 works in the following manner. The computer program combines a Source Motivation value (shown in one of the boxes on the y-axis of FIG. 3. Utility Matrix 2 and a Source Placement/Access value (shown in one of the boxes on the x-axis of FIG. 3) according to Utility Matrix 2 to determine a Source Credibility value shown in one of the inside boxes of the utility matrix. For example, if the intelligence collector had judged the Factor 1 value as "Motivations Most of Often Associated with Credible Sources (~75% Probability)" and the Factor 2 value as "Almost Certainly Has Access (~90% Probability)," then the Source Credibility value would be "Almost Certainly Credible (~90%)."

The source credibility values are not determined by simply averaging the two factors. Two key rules guide the determination of the source credibility value: (1) the value of Source Credibility will never be higher than the value of Source Motivation regardless of how high the value of Source Placement/Access is rated because motivation is more telling than access; and (2) the value of Source Credibility can be higher than the value of Source Placement/Access if the value of Source Motivation is high because motivation is more telling than access.

To rate Information Feasibility, analysts apply their own rational judgment of what is logically possible (not their opinion of what is likely) and simply check a list of boxes on a 5-level scale of:
(1) "Almost Certainly Feasible (~90%)," about 90 percent probability;
(2) "Probably Feasible (~70%)";
(3) "Unknown Feasibility (or ~50%)";
(4) "Probably Not Feasible (~30%)"; and
(5) "Almost Certainly Not Feasible (~10%)".

Figure 4:
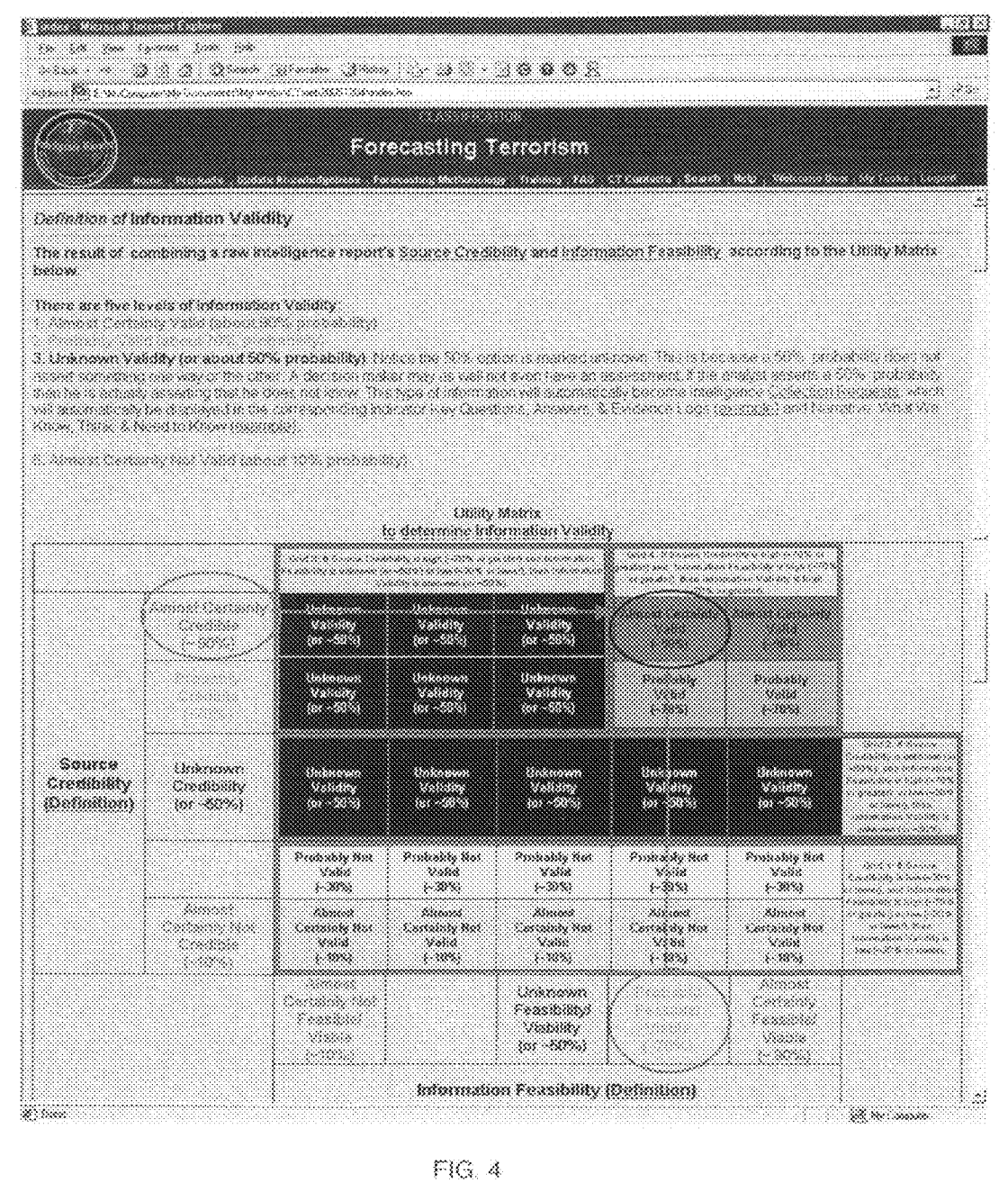

To rate Information Validity, the computer program combines the Source Credibility value and Information Feasibility value according to Utility Matrix 3 (shown in FIG. 4) to determine the Information Validity value on a 5-level scale of:
(1) "Almost Certainly Valid (~90%)," about 90 percent probability;
(2) "Probably Valid (~70%)";
(3) "Unknown Validity (or ~50%)";
(4) "Probably Not Valid (~30%)"; and
(5) "Almost Certainly Not Valid (~10%)".

The Utility Matrix 3 works as follows. The computer program combines a Source Credibility value (shown in one of the boxes on the y-axis of FIG. 4) and an Information Feasibility value (shown in one of the boxes on the x-axis of FIG. 4) according to Utility Matrix 3 to determine an Information Validity value shown in one of the inside boxes of the utility matrix.

For example, if the intelligence collector had judged the source as "Almost Certainly Credible (~90%)," and the analyst had judged the information as "Probably Feasible (~70%)," then the Information Validity would be "Almost Certainly Valid (~90%)."

The information validity values are not determined by simply averaging the two factors. The rationales to determine Information Validity from Source Credibility and Information Feasibility fall into four primary categories, which are identified by four grids marked on the utility matrix: Grid 1, Grid 2, Grid 3, and Grid 4. Each grid also corresponds to the action an analyst should take on the information. The calculations to determine Information Validity from Source Credibility and Information Feasibility are automated, but the actions the analyst should take are not. The actions are geared toward determining whether the information should be briefed to a decision maker.

In Grid 1, if Source Credibility is low (about 30 percent or lower) and Information Feasibility is high (about 70 percent or greater) or low (about 30 percent or lower), then Information Validity is low (about 30 percent or lower). The rationale is that there are infinite threat possibilities/feasibilities, so an analyst must narrow them down by using Source Credibility. When a threat report originates from a source that is only about 30 percent credible or less, the threat should not stand out from among the infinite threat possibilities. Ultimately, Information Validity should not be higher than Source Credibility, regardless of how feasible the information is.

The information in this grid is not of briefing quality. Neither is the information of the quality to take time to question and apply valuable intelligence resources to search for answers. The analyst should discount the information that falls into this grid/category. The reader may be surprised to learn that analysts receive many reports in this category. These reports are known as "chaff," irrelevant information that can cause an analyst to be come overwhelmed if he does not discount it. However, some of the reports of about 30 percent validity should be given consideration if they relate to a significant threat, such as nuclear attack. Task 13 of the methodology "bumps up" these threats to Intelligence Gaps, which are turned into Collection Requirements.

In Grid 2, if Source Credibility is unknown (about 50 percent) and Information Feasibility is high (about 70 percent or greater) or low (about 30 percent or lower), then Information Validity is unknown (about 50 percent). The rationale is that in matters of security, it is best to err on the side of caution, so a threat report that originates from a source of about 50 percent (unknown) credibility should not be discounted since there is a reasonable chance the threat is valid. Sources of unknown (and high) credibility deserve consideration, but sources of low credibility do not because researching them would drain the limited intelligence resources available. In this methodology, a 50 percent probability is the threshold that makes a threat worth intelligence resources.

Here, the analyst is not ready to brief the threat if the source credibility is in question, regardless of how feasible the information is. The analyst needs to request more information on the topic to find out if there are additional corroborating sources. Additionally, if the information is not feasible, the analyst needs to brainstorm and research the Information Feasibility; even if the analyst discovers that there are corroborating sources, he still will not be ready to brief if he cannot assert whether the threat is possible.

In Grid 3, if Source Credibility is high (about 70 percent or greater) and Information Feasibility is unknown (about 50 percent) or low (about 30 percent or lower), then Information Validity is unknown (about 50 percent). The rationale is that a highly (about 70 percent or greater) credible source is worth giving consideration regardless of how unfeasible the information seems. An attacker's goal is to surprise its victim because that significantly increases the chance of success. Therefore, an analyst must open his mind to unexpected possibilities that highly credible sources report.

Here, the analyst is not ready to brief the threat if he cannot even assert whether the threat is possible. The analyst needs to get answers on Information Feasibility by brainstorming (to opening his mind) and researching to determine if the threat is of briefing quality.

In Grid 4, if Source Credibility is high (about 70 percent or greater) and Information Feasibility is high (about 70 percent or greater), then Information Validity is high (about 70 percent or greater). The rationale is that obviously information of both high (about 70 percent or greater) Source Credibility and high Feasibility has a high probability of being valid.

This information is of briefing quality and evidence quality (about 70 percent or higher). The analyst should apply the information as supporting evidence in a hypothesis matrix to determine if the combination of multiple pieces of information amount to at least 70 percent of those things that must happen and are likely to happen for a scenario to unfold (indicators). If the pieces of information (raw intelligence reports) amount to 70 percent of the indicators, then the analyst is ready to brief the decision maker on the threat.

Based on those rationales, the computer program determines a report's Information Validity and color codes the reports on the Webpages as already described according to the following color-coding system. Red indicates reports that are judged "Almost Certainly Valid" (about 90% probability).

Orange indicates reports that are judged "Probably Valid" (about 70% probability). Black indicates reports that are judged "Unknown Validity" (or about 50% probability). Again, the 50% option is marked "unknown". This is because a 50% probability does not assert something one way or the other. A decision maker may as well not even have an assessment. If the analyst asserts a 50% probability, then he is actually asserting that he does not know. An analyst can turn this type of information into Intelligence Collection Requirements (in Task 43). Yellow indicates reports that are judged "Probably Not Valid" (about 30% probability). Gray indicates reports that are judged "Almost Certainly Not Valid" (about 10% probability). All gray reports will also be italicized because they all meet at least one of the criteria described below for italicizing and discounting a report from an assessment (either non-credible source or non-feasible information). The reports are also font-coded. Bold-face of any color indicates reports that pertain to threats within the next 30 days. Italics of any color indicate reports that analysts intend to discount from assessments. There are only 5 acceptable reasons to discount a raw intelligence report, and an analyst must identify at least 1 reason in the Terrorism Forecasting Master Database by checking the appropriate box, or the database will not accept the analyst's input (and italicize the report hyperlink on the website display). The analysts must also write additional commentary in the analytical comment section for the raw intelligence report in the Terrorism Forecasting Master Database.

The five acceptable reasons to discount a raw intelligence report are:

(1) The threat expires. For instance, if a report states that terrorists intend to attack before the end of the New Year, and then the date passes for several months without incident. Choosing to expire a threat can be a difficult decision because terrorists may back off an operation if the conditions become unfavorable, and then return to the operation once conditions become favorable. In this forecasting system, the computer program automatically expires threats after 90 days and automatically checks the box "Expired Threat" under the data field Threat/Incident Status in the Terrorism Forecasting Master Database.

(2) Officials eliminate the threat. For instance, if FBI officials apprehend a suspected terrorist who had reportedly traveled into the country, then the threat from that terrorist is eliminated. In this forecasting system, an analyst can indicate that a threat has been eliminated by checking the box "Eliminated Threat" under the data field Threat/Incident Status in the Terrorism Forecasting Master Database.

(3) Officials determine through investigation that the threat/incident was benign. The threat never existed. For instance, if while investigating a reported surveillance of nuclear facility, officials discover that person who took the photograph was part of a government chartered risk assessment team, then the threat is benign. In this forecasting system, an analyst can indicate that a threat is benign by checking the box "Confirmed Benign Threat/incident" under the data field Threat/incident Status in the Terrorism Forecasting Master Database.

(4) The intelligence collector determines that the source is not credible. In some cases, analysts can make a judgment on source credibility, but analysts must remember that in most (not all) cases, the collector knows the source (and his reporting history) better than the analyst. In this forecasting system, an analyst must indicate a source's credibility by checking a box for one of the following options in the Forecasting Database under Source Credibility: 1) Almost Certainly Credible (~90%), about 90 percent probability, 2) Probably Credible (~70%), 3) Probably Not Credible (~30%), 4) Almost Certainly Not Credible (~10%), and 5) Unknown Credibility (or ~50%). If the collector did not describe the source according to those words, then the analyst judges which option best fits the collector's description of the source. The analyst must be 70 percent confident of his answer.

(5) Analysts judged that the information is not Feasible, meaning that the information is not logically possible. A judgment that an indication is not logically possible is different from an opinion that an indication is unlikely, which is not an appropriate reason to dismiss an indication. For instance, on a report of a possible case of photographic surveillance, if the analyst thinks it is unlikely the incident was actually a surveillance incident because the suspect had his family posing on the picturesque hilltop over Camp Doha, Kuwait, then that opinion is not an appropriate reason to dismiss that indication of surveillance. However, if an investigation determines that the camera used did not have a strong enough lens to take a clear picture of Camp Doha from the distance it was taken, then that logic is an appropriate reason to dismiss the indication. This is the principle that Department of Defense (DoD) warning analysts apply to selecting potential threat scenarios. Since an indication is like a mini threat scenario, the same principle should apply. In this forecasting system, an analyst must indicate the information's Feasibility by checking a box for one of the following options in the Forecasting Database under Information Feasibility: (1) Almost Certainly Feasible (~90%), about 90 percent probability; (2) Probably Feasible (~70%); (3) Probably Not Feasible (~30%); (4) Almost Certainly Not Feasible (~10%); and (5) Unknown Feasibility (or ~50%). The analyst must be 70 percent confident of his answer. An analyst can always discount a report for this reason when the Source Credibility is lower than 50 percent. However, when the Source Credibility is 50 percent or higher, the analyst should put out Collection Requirements on the threat topic to confirm that the threat can really be discounted.

Some analysts may fear that the strict guidelines for discounting a report will cause many false alarms (because many reports will not meet the criteria to be discounted). However, as will become apparent in Task 14, a warning level does not increase unless multiple indications tied to multiple indicators for a hypothesis amount to enough significance to drive up a warning level. This single task (determining whether to discount a raw report) is subject to 9 common warning pitfalls, 8 of which involve analysts neglecting pertinent information for reasons they believe are justified, but actually are not justified. Thus, analysts must strictly adhere to the 5 guidelines for dismissing indications, and should be trained in their application so they do not mistakenly force the threat picture to meet their prejudice. The threat picture must represent the ground truth of all the legitimate indications that have been reported. The analyst will have a chance to apply his intuition to the information later, but in this step of building the threat picture, the analyst must simply lay out the facts. Indications are the fundamental building blocks of a warning picture, so this step must be done correctly.

The requirement for an analyst to write out the justification for dismissing an indication according to 1 of the 5 prescribed reasons helps the analyst ensure his reasoning is based on logic rather than bias. Furthermore, the fact that the justification is available on the report for all other analysts to review provides for a system of checks and balances which helps guard against the serious random intuitive inconsistencies that a person experiences due to personal bias, fatigue, boredom, and all the factors that make us human.

No report is ever removed from the list in a hypothesis matrix; rather, it is italicized. Common adversary modus operandi is to back off an operation if conditions become unfavorable and return to the operation once conditions become favorable again. As a result, an analyst may need previous indications to decipher details of a potential operation that has shown renewed activity. Furthermore, maintaining all reports (including non-credible, non-feasible/nonviable, expired, eliminated, and benign threat reports) on the website display enables everyone within the Counterterrorism Community to be aware of the reports and helps alleviate misunderstandings as to the reports' existence and/or status.

Some reports' hyperlinks do not lead to the text of the report in order protect especially sensitive intelligence sources and methods. Instead, the hyperlink leads to the contact information of the database security manager, who can provide the report to people with a need to know.

Task 13:

In Task 13, Analysts and the Computer Program assess Indicator Warning Levels (preferably daily). Now that all the incoming information has been consolidate, rated, and filed by indicators within the hypothesis matrices, the status of the indicators can be assessed. The second group of analysts, called "Indicator Specialists" (who are the Counterterrorism Community's designated experts on a given indicator or set of indicators), and the Computer Program work together to assess Indicator Warning Levels on a 5-level scale of:

(1) Critical (~90%), about 90 percent probability, color coded red on the website;

(2) Significant (~70%), color coded orange;

(3) Unknown (or ~50%), color coded black;

(4) Minor (~30%), color coded yellow; and (5) Slight (~10%), color coded gray.

The computer program calculates an Indicator Warning Level by combining Indicator Priority and Indicator Activity Level. The rational to rate Indicator Priority was explained in Task 2. Indicator Specialists and the computer program work together to determine an Indicator Activity Level (on a 5-level scale of: (1) Critical (~90%), about 90 percent probability, color coded red on the website; (2) Significant (~70%), color coded orange; (3) Unknown (or ~50%); color coded black; (4) Minor (~30%), color coded yellow; and (5) Slight (~10%), color coded gray) in one of two ways depending on whether the indictor is qualitative or quantitative. (Recall that the difference between qualitative and quantitative indicators was discussed in Task 1).

For the Qualitative Indicators, Analysts and the Computer Program Rate the Indicator activity levels Via Qualitative-indicator Questions, Answers, & Evidence Logs. Analysts Answer Questions in Qualitative-Indicator Questions, Answers, & Evidence Logs. To rate the Indicator Activity Level for the qualitative indicators (which relate to information that cannot be counted) an analyst uses a Qualitative-Indicator Questions, Answers, & Evidence Log containing qualitative questions to assist him with that intuitive judgment of rating Indictor Activity Level (on the Website, an Indicator Questions, Answers, & Evidence Log is qualitative unless it is marked quantitative). These logs contain the question sets developed in Task 3 that address the key factors that experts determined are necessary to assess the status of an indicator. For each question, the analyst must select 1 of the following 5 answers: (1) "Almost Certainly True (~90%)," about 90 percent probability, color coded red on the website; (2) "Probably True (~70%)," color coded orange; (3) "Unknown (or ~50%),"color coded black (the 50 percent option is marked unknown because a 50 percent probability does not assert something one way or the other; a decision maker may as well not even have an assessment; this type of information will automatically become higher priority Intelligence Collection Requirements for intelligence collectors in the Intelligence Collection Plan (in Task 42)); (4) "Probably Not True (~30%)," color coded yellow; and (5) "Almost Certainly Not True (~10%)," color coded gray.

The analyst need only be about 70 percent confident of his answers. Each analyst is trained to understand the difference between the probabilities he identifies in his answers and his level of confidence in selecting an answer. Analysts are instructed to answer every question with a 70 percent level of confidence. When a 70 percent level of confidence is applied to a 70 percent probability, the overall assessment remains at 70 percent probability. Seventy percent probability is the level at which a prominent decision maker requested to be warned and thus the level that analysts alert decision makers in this warning system.

The analyst must have supporting evidence for his answer to each question. Hyperlinks to the evidence/raw intelligence reports are listed under the evidence column in the Indicator Question, Answers, & Evidence Log. A large quantity of reports can add weight to an answer. For instance, if an analyst has ten reports that each state a different terrorist has traveled into a given target country, and the reports are each judged "Probably Valid (~70%)," then the analyst can answer a question on terrorist travel with the assertion that a terrorist "Almost Certainly (~90%)," traveled into the target country. Thus, multiple reports of 70 percent probability can amount to an assessment of 90 percent probability. The questions for which analysts lack evidence or have evidence of unknown Information Validity (about 50 percent probability that the information is valid) are answered "Unknown (or ~50%)," and are Intelligence Gaps (color coded black), which automatically become higher priority Collection Requirements in the Intelligence Collection Plan, as discussed in Task 42.

An overarching theme throughout this methodology is to "get rid of the black" or get answers to Intelligence Gaps. Most hypothesis matrices will open up with many indicators at black/unknown because it only takes one report of about 50 percent validity or more to cause the computer program to open up a new hypothesis matrix. The analyst's job is to get the questions that are answered, "Unknown (or ~50%)" to a high (about 70 percent or greater) or low (about 30 or less) answer, whichever is true. The analyst should submit Collection Requirements until he can answer an indicator question at a high or low probability.

There may be another tool or tools that can help the analyst assess the indicator. For example, a link chart might be helpful in assessing an indicator. A list of tools is available under the hyperlink "Helpful Analytic Tools List." For each indicator, analysts can maintain a continuously updated product of the tool that can be passed on to future analysts.

After an analyst has completed the question set for a given indicator, the computer program shows the analyst the average of his answers to the Priority 1 questions, the average to the Priority 2 questions, the average to the Priority 3 questions, and finally, a Proposed Indicator Activity Level. The questions to which the analyst answered "Unknown (or ~50%)" (due either to lack of information or to unknown/50 percent probability of Information Validity) are factored into the averages as 50 percent.

The analyst is given the option to accept or reject the Proposed Indicator Activity Level. If the analyst rejects the proposed level, he must provide justification by creating and prioritizing a new question or questions that address the factor(s) he thinks are missing in the question set to appropriately assess the indicator, and he must attach evidence to support his answer to the new question(s). Analysts can also determine if the question set is missing any key elements by determining if all the evidence (raw intelligence reports) shown under the indicator in the hypothesis matrix has been accounted for. The question sets help inexperienced analysts gain the understanding of experienced analysts more quickly and efficiently, which can be critical for military intelligence analysts, who frequently change assignments.

Once the analyst has settled on an official Indicator Activity Level with the question set, the computer automatically displays his color-coded answer in the corresponding hypothesis matrix under the column marked "Indicator Activity Level."

The fact that these intuitive assessments (on Indicator Activity Level) are limited to the information in just 1 key question at a time helps guard against the intuitive pitfall that people have difficulty keeping more than seven or so bits of information in mind at once. Furthermore, the fact that these intuitive Indicator Activity Level assessments are checked by a chain of evidence in a question set and a computer calculation helps guard against an analyst's bias.

When analysts assess the information in the Anti-indicators, they must also reassess its priority. Anti-Indicators are set to a default of Priority 1, but if analysts believe the information is highly credible and significant enough to refute the entire hypothesis, then the analyst changes the Priority to Trump. That triggers the computer program to deactivate the target hypothesis matrix. The target still appears on the target list, but the computer program identifies it as having been discounted due to highly credible information.

For the Quantitative Indicators, Analysts and the Computer Program Rate the Indicator Activity Levels via Quantitative-Indicator Questions, Answers, & Evidence Logs and Utility Matrix 4. Analysts Answer Questions in the Quantitative-indicator Questions, Answers, & Evidence Logs. To rate the Indicator Activity Level for the quantitative indicators (which relate to information that can be counted) an analyst uses a Quantitative-Indicator Questions, Answers, & Evidence Log containing both qualitative and quantitative questions to assist him with that intuitive judgment of rating Indictor Activity Level. (On the website, an Indicator Questions, Answers, & Evidence Log is qualitative unless it is marked quantitative.) Again, these logs contain the question sets developed in Task 3 that address the key factors that experts determined are necessary to assess the status of an indicator.

The Quantitative-Indicator Questions, Answers, & Evidence Logs include both quantitative and qualitative questions because quantitative indicators still have qualitative aspects, as well. For example, surveillance is a quantitative indicator because analysts can count the number of unresolved cases of surveillance at a facility over a given period of time. Yet, the manner of surveillance (covert or overt) is an important qualitative aspect of the indicator because surveillance that was done covertly probably has greater significance than surveillance that was done overtly. A great deal of intelligence information is qualitative and must be assessed using intuition since it cannot be counted. However, since intuition is a less accurate method of assessment than numerical calculation, analysts should identify quantitative intelligence information whenever possible, so it can be assessed more accurately via numerical calculations. Seven of the Terrorism Indicators identified in Table 4 are quantitative. Because quantitative indicators have qualitative aspects too, a methodology for assessing indictors must be able to account for both aspects in one indicator. The qualitative questions account for the qualitative aspect of the indicator. The quantitative questions account for the quantitative aspect of the indicator. The quantitative questions address four numerical values (represented by four letters).

"M" is the mode, the typical (not average) number of unresolved suspicious incidents within one month at this location. "M" is of interest because it enables analysts to recognize when a location's number of unresolved suspicious incident reports varies from its norm. "M" also enables analysts to make a fair comparison of the number of unresolved suspicious incidents involving potential targets that have different, respective capabilities and tendencies to recognize and collect on suspicious activity around them. For instance, in Saudi Arabia, a U.S. military facility has security forces at every corner of the perimeter calling counterintelligence every time someone looks at them suspiciously, particularly every three months, when there is a new rotation of troops, because they are extremely vigilant at the beginning of their tour. However, the U.S. Embassy was much more conservative in its suspicious incident reporting. Thus, a U.S. military facility had a different capability and tendency to collect on suspicious activity than the U.S. Embassy. Analysts can still make a fair comparison of both locations' suspicious activity reporting by tracking each location's normal monthly level ("M") and then comparing variations from the norms.

Small "t" is the total number of unresolved suspicious incidents within the last three months at this location. Small "t" is of interest because there is likely to be a surge of activity just before a terrorist attack.

"T" is the total number of unresolved suspicious incidents over all time in this indicator at this location. "T" is of interest because terrorists plan attacks over several years.

"Y" is the number of years that the suspicious incident reporting dates back at this location. This value is automatically calculated for the analyst from another question in the question set: What is the first date surveillance was observed at this location? (Select date on calendar)). "Y" is of interest because it identifies how many years big "T" spans.

The analyst answers the questions according to the same rules described for the qualitative indicators.

Figure 5:
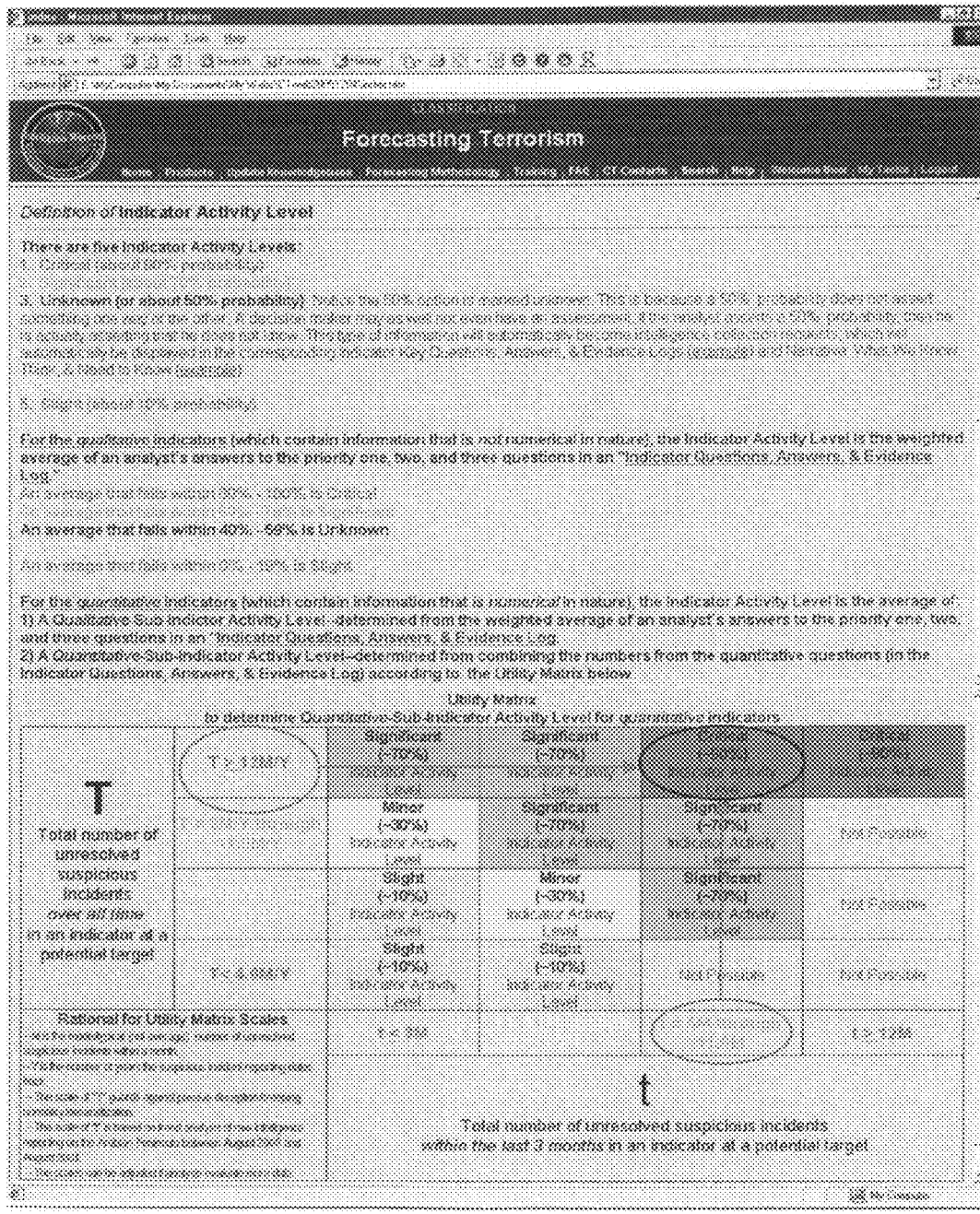
FIG. 5 shows a utility matrix that shows how the total number of unresolved suspicious incidents over all time and the total number of unresolved suspicious incidents with the last 3 months can be combined to determine Indicator Activity Level (for quantitative indicators)

The computer program averages answers to questions and uses Utility Matrix 4 to determine the Indicator Activity Level. After the analyst has answered the questions, the computer program calculates the Indicator Activity Level by:

(1) Calculating a weighted average of an analyst's answers to the qualitative Priority 1, 2, and 3 questions in an Indicator Questions, Answers, & Evidence Log (as described for the qualitative indicators) to determine a Qualitative-Sub-Indictor Activity Level;

(2) Combining the numbers from the quantitative questions (in the Indicator Questions, Answers, & Evidence Log) via Utility Matrix 4 (shown in FIG. 5) to determine a Quantitative-Sub-Indicator Activity Level; and then (3) Averaging the Qualitative-Sub-Indictor Activity Level and Quantitative-Sub-Indicator Activity Level to determine the Proposed Indictor Activity Level.

Again, the analyst is given the option to accept or reject the Proposed Indicator Activity Level. If the analyst rejects the proposed level, he must provide justification by creating and prioritizing a new question or questions that address the factor(s) he thinks are missing in the question set to appropriately assess the indicator, and he must attach evidence to support his answer to the new question(s). Once the analyst has settled on an official Indicator Activity Level with the question set, the computer automatically displays his color-coded answer in the corresponding hypothesis matrix under the column marked "Indicator Activity Level."

Utility Matrix 4 works as follows. The computer determines the following: Is the value of little "t" about what is expected over a 3-month timeframe, 3 times the norm (3M)? Has the value of little "t" increased by a factor of 4 (4 times 3M, or 12M)? Or has it increased by a factor somewhere in-between? The factor 4 was chosen for the high-end scale of little "t" based on case study analysis and trend analysis of suspicious incident reporting on the Arabian Peninsula from August 2000 to August 2001. That is a limited data sample, so the high-end scale of little "t" should be re-evaluated as analysts obtain more data.

Similarly the computer also determines: Is the value of big "T" at a small factor of the norm (such as 4M/Y) or a large factor of the norm (such as 12M/Y)? The range selected for the degree of variation in big "T" is designed to guard against passive deception/creeping normalcy/desensitization—when an adversary repeats a threatening activity so often that it no longer appears significant. Thus, big "T" would flag a consistent number of suspicious incidents over 12 months as at least "Significant (~70%)" Indicator Activity Level.

Finally, the computer determines, for example if little "t" is equal to a value between 6M and 11.9M, and if big "T" is equal to a value greater than or equal to 12M/Y, then the Quantitative-Sub-Indicator Activity Level is "Critical (~90%)."

Analysts deactivate non-collectable Indicators. In some cases, the Indicator Specialist is unlikely to obtain enough information to determine an Indicator Activity Level. Some indicators are blacked out and marked "Unknown/Not Collectable (Deactivated)." If an analyst determines that the U.S. cannot or is unlikely to collect on an indicator at a given location, the analyst "deactivates" the indicator. An indicator must be collectable. T he indicators listed in table 4 (Terrorism Indicators) are within U.S. collection capabilities; however, there are certain locations for which the U.S. cannot or is unlikely to collect on certain indicators. For instance, it would be difficult to detect surveillance of a building on an open public street in a metropolitan area, such as the World Trade Center, prior to the Feb. 26, 1993 terrorist bombing. Thus, a methodology for analyzing indicators must enable analysts to deactivate indicators, so that the absence of information in a non-collectable indicator does not unduly lower the overall warning level assessment of a location. An indicator can be reactivated at any time. The option to deactivate an indicator is not to be confused with prioritization of an indicator. Deactivation occurs when an analyst knows or assesses that it is highly unlikely that information can be collected at a given location, while prioritization reflects the likelihood that an activity will take place before an attack.

An indicator can be unknown for one of three reasons:
(1) information is not available because the indicator is not collectable;
(2) information is not available because it has not been collected but probably can be collected; or
(3) the available information is of unknown validity (or about 50 percent probability of Information Validity).

The first type of unknown information is treated differently than the other two types when developing assessments. Only the indicators that are unknown because they are not collectable (deactivated) are discounted from assessments. The indicators that are unknown for the other two reasons are factored into assessment averages as a 50 percent probability, and they automatically higher priority Collection Requirements in the Intelligence Collection Plan (in Task 42).

Analysts determine if Miscellaneous Indicators contain information that warrants a new Indicator. Analysts do not determine an Indicator Activity Level for the Miscellaneous Indicators. Instead, analysts review the information in the Miscellaneous Indicators to determine if any new indicators should be established. This guards against analysts accidentally neglecting pertinent information that does not fit into any of the existing indicators. If an analyst believes information in a Miscellaneous Indicator warrants a new indicator, he submits a proposal to create a new indicator. If other terrorism experts approve the new indicator, then the analyst assesses its Indicator Activity Level as described above. The questions shown in the "Indicator Questions, Answers, & Evidence Log for Miscellaneous Terrorist Intention Indicator" assist analysts in determining if a new indicator is warranted and also help them justify their opinion for the new indicator proposal. Analysts do not determine an Indicator Activity Level for the Miscellaneous Indicators. The Miscellaneous Indicators are color-coded dark gray or "grayed out" on the indicator list view of the website display.

There is a rational to rate the Indicator Warning Level in which the Computer Program determines the Indicator Warning Level via Utility Matrix 5. So now the analysts have an Indicator Activity Level for each of the Terrorism Indicators (except the deactivated and miscellaneous indicators) via the Indicator Questions, Answers, & Evidence Log and Utility Matrix 5, but that is not the final answer on an indicator because some indicators are more significant than others (as explained in Task 2). The computer program automatically factors the Indicator Priority into the next assessment level.

In fact, from here on, all the warning level calculations are preferably automated. The third group of analysts, Senior Warning Officers, is responsible for monitoring and approving all the warning levels that the computer program automatically produces and updates on the Webpages. Whenever a Senior Warning Officer rejects a warning level that the system produces, he is required to write a justification in the appropriate Indicator, Target, Country, Terrorist Group, Terrorist Network or Terrorist Individual Warning Narrative: What We Know, Think, & Need to Know, which is described later in Tasks 23, 24, 25, 26, 27, and 28. Automating these warning level calculations ensures accuracy in calculations, immediate updates, consistency in the necessary, recurring judgments, and saves time and manpower.

Figure 6:
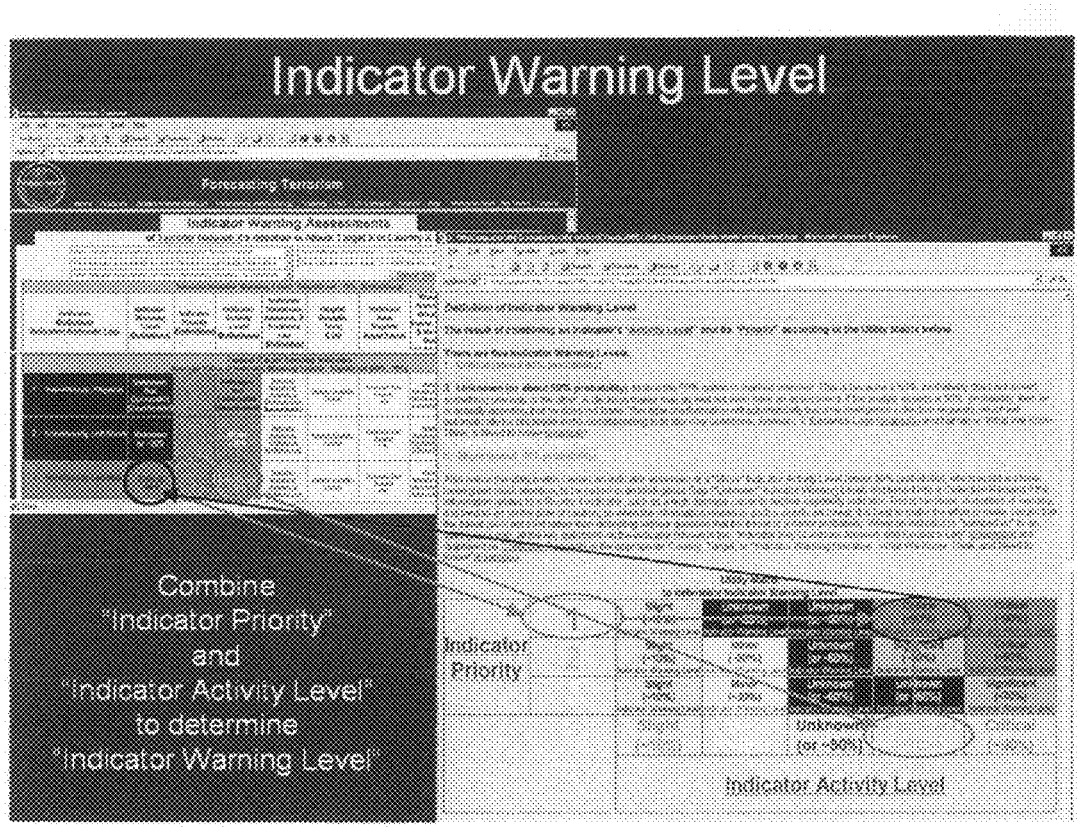
FIG. 6 shows a utility matrix that shows how Indicator Priority and Indicator Activity Level can be combined to determine Indicator Warning Level.
Figure 7:
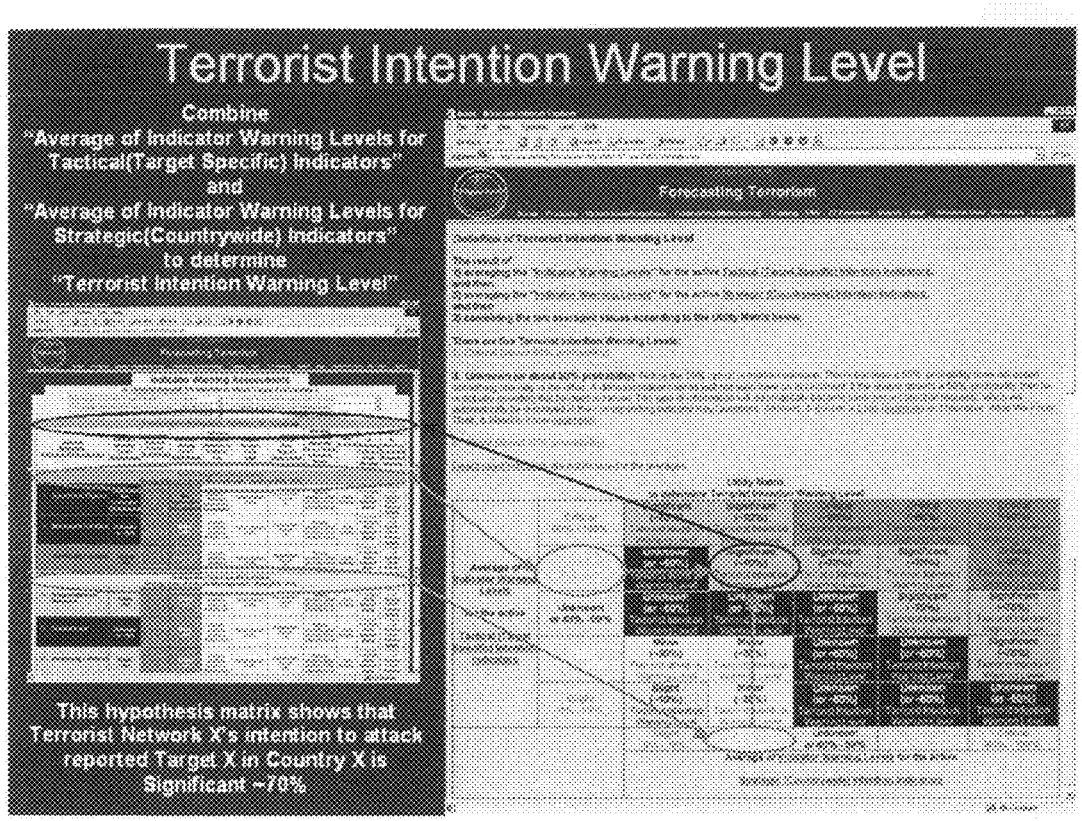
FIG. 7 shows a utility matrix that illustrates how the average of the Indicator Warning Levels for the Tactical (Target Specific) terrorist intention Indicators and the average of the Indicator Warning Levels for the Strategic (Countrywide/Non-Target Specific) terrorist intention Indicators can be combined to determine Terrorist Intention Warning Level.

The computer program combines the Indicator Activity Level and the Indicator Priority to determine an Indicator Warning Level (on a 5-level scale of: (1) Critical (~90%), about 90 percent probability, color coded red on the website; (2) Significant (~70%), color coded orange; (3) Unknown (or ~50%), color coded black; (4) Minor (~30%), color coded yellow; and (5) Slight (~10%), color coded gray) according to Utility Matrix 5 shown in FIG. 6. For example, if the designated Counterterrorism Community expert on weapons movement had assessed the Terrorist Training Indicator as "Significant (~70%)," then since that is a Priority 1 indicator, its Indicator Warning Level would be "Critical (~90%)." The resulting value is displayed in the hypothesis matrix under the column marked Indicator Warning Level.

If the information relates to a Priority 1 indicator, such as a high damage capacity nuclear capability indicator, then the utility matrix causes an indicator assessed at a "Minor (~30%)" Indicator Activity Level (which would not have been given much attention) to be raised to an Intelligence Gap ("Unknown (or ~50%)" Indicator Warning Level) and turned into a Collection Requirement. This is because, in matters of security, it is best to err on the side of caution; so when the information relates to such a significant threat, it is best to make the effort to make certain that the threat does not exist rather than accepting without question that the threat is a minor probability. When an indicator is "bumped up" to an Intelligence Gap, all the key questions on the indicator (shown in the Indicator Questions, Answers, & Evidence Log are displayed as Collection Requirements in the Intelligence Collection Plan (in Task 42).

Task 14:

In Task 14, the Computer Program assesses the Terrorist Intention Warning Level (preferably daily). Now that analysts have assessed Indicator Warning Levels for all the indicators of terrorist intention, terrorist capability, and target vulnerability (the 3 components of risk), the computer can calculate a warning level for each of those 3 components. The computer calculates the Terrorist Intention Warning Level for a target (on a 5-level scale of: (1) Critical (~90%), about 90 percent probability, color coded red on the website; (2) Significant (~70%), color coded orange; (3) Unknown (or ~50%), color coded black; (4) Minor (~30%), color coded yellow; and (5) Slight (~10%), color coded gray) by:

(1) Averaging all the Indicator Warning Levels for the active tactical (target-specific) Terrorist Intention Indicators;
(2) Averaging all the Indicator Warning Levels for the active strategic (countrywide) Terrorist Intention Indicators; and then
(3) Combining the 2 averaged values according to Utility Matrix 6 shown in FIG. 4.

For example, if the average of the tactical indicators was "Significant (~70%)," and the average of the strategic indicators was "Minor (~30%)," then the overall Terrorist Intention Warning Level would be "Significant (~70%)." Miscellaneous Indicators and deactivated indicators are not factored into the averages. Taking an average is rational because, if terrorists have not yet completed an activity that must take place before an attack, then their attack plan is probably not yet viable. Alternatively to taking an average, Bayesian Theorem and or other mathematical probability rules and theories, could be used to combine the Indicator Warning Levels into an overarching warning level. This would require past attack case study data that has not yet been completed.

Given the reality that intelligence information is never absolute, this methodology never allows a risk factor to be assessed as nonexistent. Therefore, "Slight (~10%)" is the smallest value a risk factor can be, and the smallest value risk can be. The resulting value is displayed at the top of the terrorist intentions indicator list webpage, under the heading marked "Terrorist Intention Warning Level." Thus, the hypothesis matrix shows the assessment that Terrorist Network X's intention to attack Target X in Country X is "Significant (~70%)." The Terrorist Intention Warning Level is also displayed on the target list webpage.

Task 15:

In Task 15, the Computer Program assesses the Terrorist Capability Warning Level (preferably daily). The computer determines the Terrorist Capability Warning Level for a given country (on a 5-level scale of: (1) Critical (~90%), about 90 percent probability, color coded red on the website, (2) Significant (~70%), color coded orange, (3) Unknown (or ~50%), color coded black, (4) Minor (~30%), color coded yellow, and (5) Slight (~10%), color coded gray) by taking the highest of all the Indicator Warning Levels for the active terrorist capability, lethal agent/technique indicators.

The delivery method Indicator Warning Levels are not used because it is primarily the lethal agent/technique, rather than the delivery method, that determines the level of damage that can be inflicted. The Miscellaneous Indicators and deactivated indicators are also excluded. Taking the highest value is more rational than taking an average value because a group's most dangerous capability (such as biological) is not reduced by other lower capabilities (such as conventional bombing). The resulting Terrorist Capability Warning Level value is displayed at the top of the terrorist capability indicator list webpage (like the terrorist intention indicator list webpage, under a heading marked "Terrorist Capability Warning Level." Thus, the terrorist capability indicator list webpage would show the assessment that a terrorist network's capability to attack in a given country is Critical (~90%) about 90 percent probability, Significant (~70%), Unknown (or ~50%), Minor (~30%), or Slight (~10%). The Terrorist Capability Warning Level is also displayed on the target list Webpage.

Task 16:

In Task 16, the Computer Program assesses the Target Vulnerability Warning Level (preferably daily). The computer program calculates a target's Vulnerability Warning Level (on a 5-level scale of: (1) Critical (~90%), about 90 percent probability, color coded red on the Website; (2) Significant (~70%), color coded orange; (3) Unknown (or ~50%), color coded black; (4) Minor (~30%), color coded yellow; and (5) Slight (~10%), color coded gray) the same way as was done for the Terrorist Intention Warning Level, by: averaging all the Indicator Warning Levels in the list of active tactical (target-specific) vulnerability indicators; averaging all the Indicator Warning Levels in the list of active strategic (countrywide) vulnerability indicators; and then combining the 2 averaged values according to a Utility Matrix like Utility Matrix 6.

Taking an average value is rational for the vulnerability indicators because none of the factors that affect vulnerability can negate the effects of the others. Again, the Miscellaneous Indicators and deactivated indicators are not factored into the averages. The resulting Target Vulnerability Warning Level value is displayed at the top of the vulnerability indicator list webpage (like the terrorist intention indicator list Webpage, under a heading marked "Target Vulnerability Warning Level." Thus, the vulnerability indicator list webpage might show the assessment that Target X's vulnerability to a terrorist attack is "Minor (~30%)." The Target Vulnerability Warning Level is also displayed on the target list Webpage.

Task 17:

In Task 17, the Computer Program assesses the Target Risk Warning Level (preferably daily). Now that analysts have a warning level for each of the 3 components of risk (terrorist intentions, terrorist capability, and target vulnerability), the computer can calculate a risk warning level for a given target. The computer program calculates the Target Risk Warning Level (on a 5-level scale of: (1) Critical (~90%), about 90 percent probability, color coded red on the website; (2) Significant (~70%), color coded orange; (3) Unknown (or ~50%), color coded black; (4) Minor (~30%), color coded yellow; and (5) Slight (~10%), color coded gray) by averaging the Terrorist Intention, Terrorist Capability, and Target Vulnerability Warning Levels.

Averaging is rational because it would not allow a single risk factor with a zero value to produce a zero risk value for a target. In an ideal world, if a risk factor does not exist, then risk does not exist. However, in the real world, intelligence information is never absolute, therefore, this methodology purposefully excludes the possibility of either a risk factor or risk being assessed as nonexistent.

The Target Risk Warning Level is displayed on the target list webpage above the Terrorist Intention, Terrorist Capability, and Target Vulnerability Warning Levels. The reasoning process for each Target Risk Warning Level is conveyed by the display of the color-coded values for terrorist intentions, terrorist capability, and target vulnerability.

In addition to the rationales conveyed by the website design, this system provides clearly explained definitions of the all warning levels, which reflect the reasoning process, exemplified by the definitions of the Target Risk Warning Levels. Moreover, the definitions reflect the reasoning process without revealing classified information, so they can be shared with the public.

It can cost millions of dollars and difficult political negotiations to raise a location's security posture in response to an intelligence warning, so a warning methodology must enable an analyst to justify his assessment to a decision maker who carefully considers a decision to raise a security posture.

Each of those risk level definitions also provides a corresponding security posture/or Force Protection Condition (FPCON) recommendation. The FPCON shown on the Target List View is the actual FPCON currently implemented at that potential target. An FPCON definition webpage also shows which FPCON is recommended for each Target Risk Warning Level and provides a hyperlink to a list of security measures that should be implemented at a minimum for each security posture. The list of security measures has been intentionally left blank.

Any change a decision maker implements to a security posture is immediately re-factored into the Target Vulnerability Warning Level (as one of the vulnerability indicators) and then the Risk Warning Level in near real time, so a decision maker can see almost immediately how his decision affects the risk situation.

Task 18:

In Task 18, the Computer Program assesses the Country Risk Warning Level (preferably daily). Now that analysts have a risk warning level for each reported target in a country, the computer can calculate an overall risk warning level for the country. The computer program determines the Country Risk Warning Level by taking the highest Target Risk Warning Level in the country. Taking the highest value is rational because, in matters of security, it is best to be aware of the worst possibilities. The Country Risk Warning Level is displayed on the country list webpage.

Task 19:

In Task 19, the Computer Program assesses the Terrorist Group Threat Warning Level (preferably daily). The discussion thus far shows how terrorist information is tracked by locations (targets and countries), but of course terrorists can operate across multiple countries, so the methodology enables users to see the worst case scenario of the highest possible threat a terrorist group could pose if it's highest Intention Warning Level among countries was combined with it's highest Capability Warning Level among countries. (Recall that threat consists of adversary intention and adversary capability.)

A terrorist group's intentions can cross countries' borders easily. Conversely a terrorist group's capabilities cannot necessarily cross borders easily and tend to be distinct among countries due to the different security environments among countries, but in matters of security, it is best to be aware of the worst possibilities, so the methodology shows the worst case scenario of a terrorist group's highest Capability Warning Level (among all countries) applied in a worldwide Terrorist Group Threat Warning Level. Users can narrow the scope of the Terrorist Group Threat Warning Level to just one country or set of countries by making selections on the website, but the default value from the web homepage is a worldwide value. Furthermore, this threat view also enables users to see a warning level that is independent of the perceived vulnerability. Many warning failures were due to the victims' refusal to believe that they were vulnerable to the attack, which has been said of the 9-11 terrorist attacks.

Figure 8:
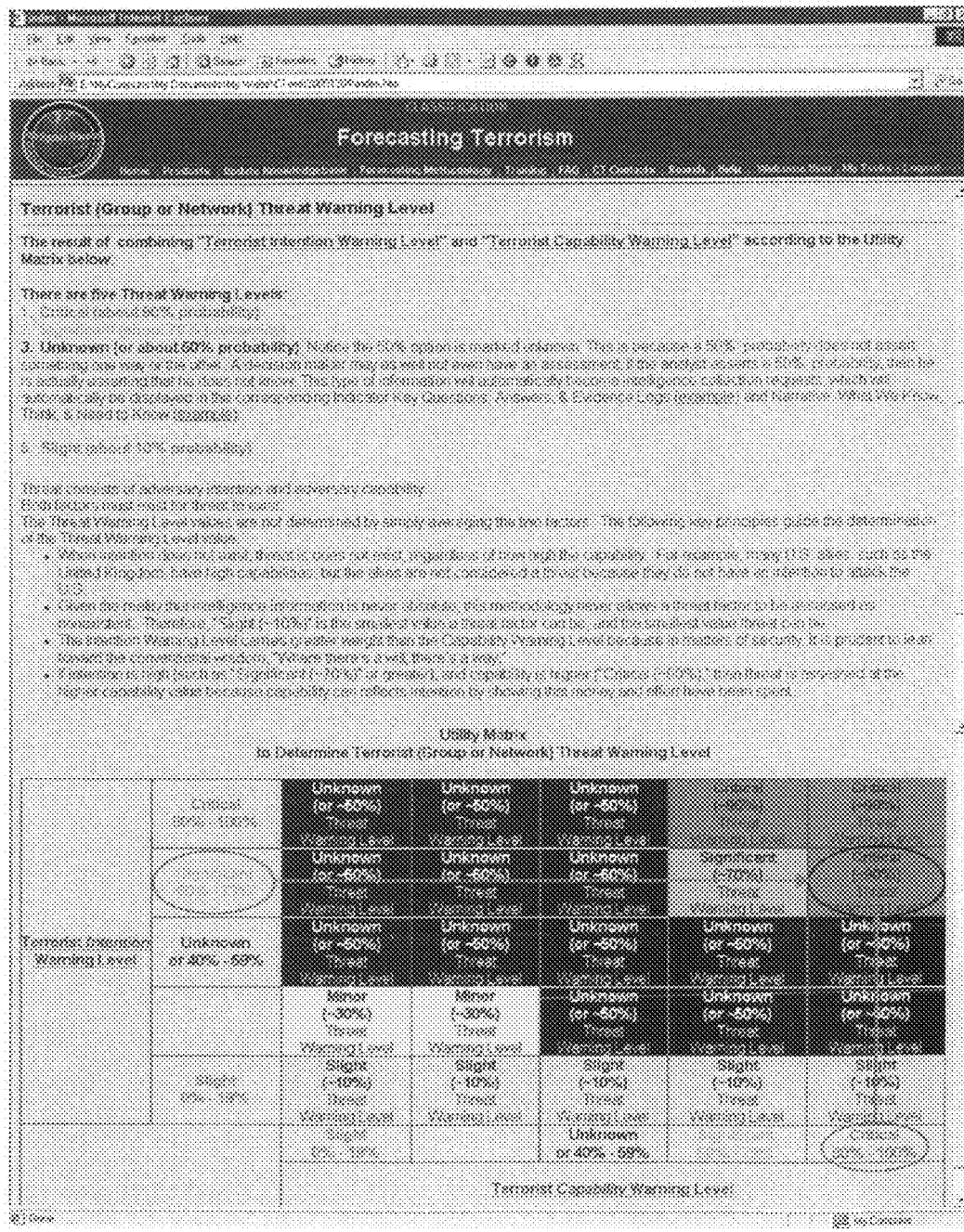
FIG. 8 shows a utility matrix that illustrates how Terrorist Intention Warning Level and Terrorist Capability Warning Level can be combined to determine Terrorist Threat Warning Level.

The computer program calculates the Terrorist Group Threat Warning Level (on a 5-level scale of: (1) Critical (~90%), about 90 percent probability, color coded red on the website; (2) Significant (~70%), color coded orange; (3) Unknown (or ~50%), color coded black; (4) Minor (~30%), color coded yellow; and (5) Slight (~10%), color coded gray) by combining a terrorist group's highest Intention Warning Level among all countries and the terrorist group's highest Capability Warning Level among countries according to Utility Matrix 7 (as shown in FIG. 8).

The Terrorist Threat Warning Level values are not determined by simply averaging the two factors. The following key principles guide the determination of the Terrorist Threat Warning Level value:

(1) When intention does not exist, threat is does not exist, regardless of how high the capability. For example, many U.S. allies, such as the United Kingdom, have high capabilities, but the allies are not considered a threat because they do not have an intention to attack the U.S.

(2) Given the reality that intelligence information is never absolute, this methodology never allows a threat factor to be assessed as nonexistent. Therefore, "Slight (~10%)" is the smallest value a threat factor can be, and the smallest value threat can be.

(3) The Intention Warning Level carries greater weight than the Capability Warning Level because in matters of security, it is prudent to lean toward the conventional wisdom, "Where there's a will; there's a way."

(4) If intention is high (such as "Significant (~70%)" or greater), and capability is higher ("Critical (~90%),") then threat is assessed at the higher capability value because capability can reflects intention by showing that money and effort have been spent.

Task 20:

In Task 20, Analysts and the Computer Program assess which terrorist groups form which terrorist networks (preferably daily). Terrorist groups have been known to cooperate against a common enemy. Two or more terrorist groups that cooperate or use each other's resources are termed Terrorist Networks in this methodology. By clicking on any "Terrorist Network" name hyperlink in the website, users can see which terrorist groups are included in that terrorist network.

If analysts don't consolidate reporting pertaining to all the groups in a terrorist network, then analysts might not be able to recognize when the combination of the terrorist groups' efforts has enabled the terrorists to accomplish all the necessary preparations for an attack, so it is important for analysts to figure out which terrorist groups are cooperating with each other.

Figure 9:
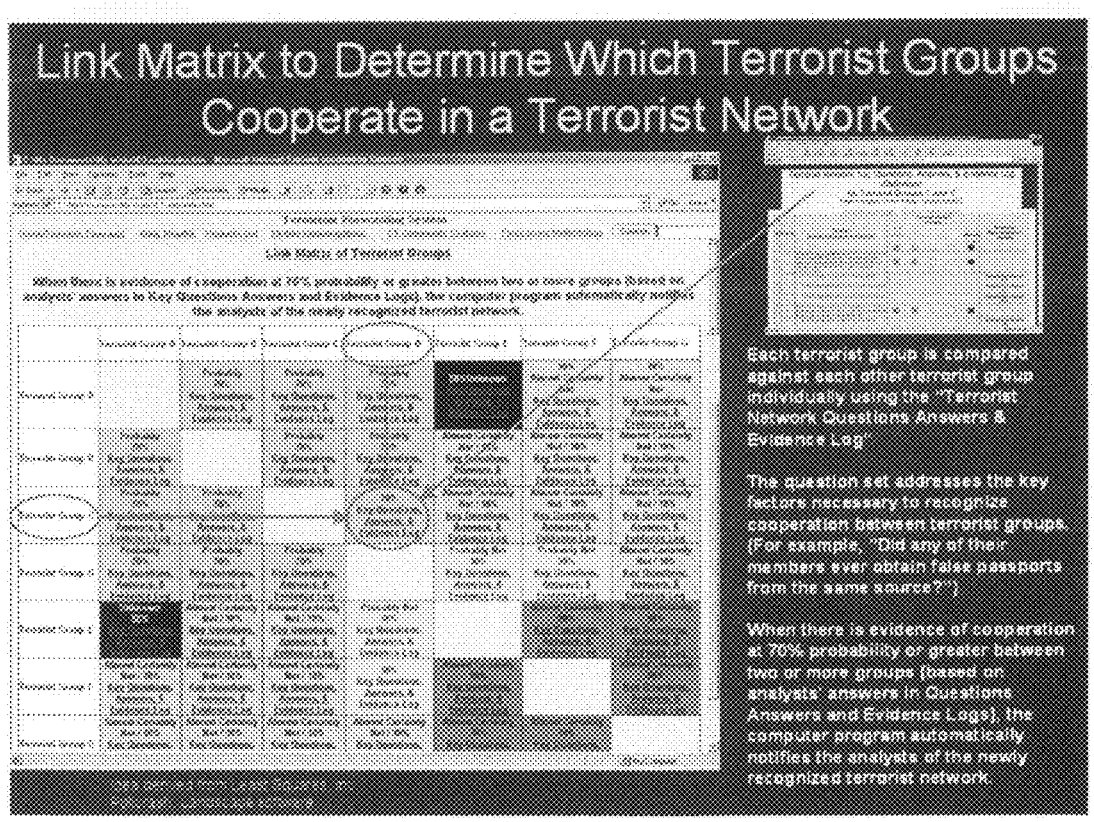
FIG. 9 depicts a link matrix to help determine which terrorist groups cooperate in a terrorist network.

To figure out which terrorist groups are cooperating with each other, analysts and the computer program use Terrorist Individual Profiles, Terrorist Network Questions, Answers, & Evidence Logs, and a Terrorist Network Link Matrix shown in FIG. 9.

Whenever a report includes two or more names, phone numbers, bank accounts, or other terrorist identifying data, analysts (the Terrorist Network Indicator Specialists described further in the staffing plan) create/update the profile of a named or unnamed terrorist (shown on the Terrorist Individual Profile webpage available from the website homepage), which causes the computer program to identify all the people who share any identifying data, but who are profiled as part of different terrorist groups.

The computer program consolidates those reports in the appropriate Terrorist Network Questions, Answers, & Evidence Logs, each of which pertains to two terrorist groups. Analysts use those reports and other reports profiled as relating to named terrorist group(s), to answer questions in the Terrorist Network Questions, Answers, & Evidence Logs within the Terrorist Network Link Matrix (shown in FIG. 9).

The Terrorist Network Link Matrix works as follows. Each box in the matrix represents a combination of two terrorist groups (that intersect from the x and y axis of the matrix). The matrix allows for representation of all possible combinations of terrorist groups. Each box has a hyperlink to a Terrorist Network Questions, Answers, & Evidence Log, which contains questions on the key factors that experts have determined are necessary to assess if terrorist groups are cooperating. The following questions are non-limiting examples:

"Have any of their members ever obtain false passports form the same source?"

"Have any of their members ever had the same visa sponsor?"

"Have any of their members ever called the same phone number or secondary or tertiary phone number, etc.?"

Each box also shows a color coded value that represents the average value of an analyst's answers to the questions on a 5-level scale of:

(1) Almost Certainly True (~90%), about 90 percent probability, color coded red on the website;

(2) Probably True (~70%), color coded orange;

(3) Unknown (or ~50%), color coded black;

(4) Probably Not True (~30%), color coded yellow; and (5) Almost Certainly Not True (~10%), color coded gray.

When the average value of an analyst's answers to the questions is "Probably ~70%" or greater (based on the corresponding evidence/raw intelligence reports in the Terrorist Network Questions, Answers, & Evidence Log), the computer program automatically notifies the analysts that a new terrorist network has been recognized, and marks the corresponding box orange and "Probably ~70%."

Once a new terrorist group is recognized, the computer program also revises any hypothesis matrix related to a member group by incorporating relevant reporting regarding all the other member groups.

Additionally, while answering the questions in the Terrorist Network Questions, Answers, & Evidence Log, the Terrorist-Network Indicator Specialists also create and maintain:

(1) Terrorist Individual Profiles by entering any available data from a raw intelligence report into the corresponding database input form fields.

(2) Personnel strength estimates for the countries for which they are responsible. Personnel strength shows a high and low estimate. The high estimate counts all information that could relate to multiple individuals separately, thereby counting the highest number of individuals possible. The low estimate counts all information that could be related to multiple individuals only one time, thereby counting the lowest number of individuals possible. The computer calculates the estimates from three types of analyst input: Terrorist Individual Profiles, reported personnel strength estimates that the analyst believes include the individuals identified in the profiles, and reported personnel strength estimates that the analyst does not believe include the individuals identified in the profiles.

(3) An organizational chart and accompanying narrative.

(4) A description of the group's primary goal and key objectives. (The Terrorist-Group Indicator Specialists provide inputs).

Note that multiple Terrorist-Network Indicator Specialists will update the same organizational charts, organizational chart narratives, Terrorist Individual Profiles, personnel strength estimates, and descriptions of groups' primary goals and key objectives. This saves duplication of effort. Also note that the Terrorist-Network Indicator Specialists update the above products instead of their Indicator Questions, Answers, & Evidence Logs and accompanying narrative because the computer program automatically determines the answers in the indicator log and updates the narrative from the above inputs.

Task 21:

In Task 21, the Computer Program assesses the Terrorist Network Threat Warning Level (preferably daily). Now that the computer program knows which Terrorist Groups form which Terrorist Networks, the computer program can calculate a Terrorist Network Threat Warning Level (which is important to do because if analysts don't consolidate reporting pertaining to all the groups in a terrorist network, then analysts might not be able to recognize when the combination of the terrorist groups' efforts has enabled the terrorists to accomplish all the necessary preparations for an attack).

The computer calculates at a Terrorist Network Threat Warning Level (on a 5-level scale of: (1) Critical (~90%), about 90 percent probability, color coded red on the website; (2) Significant (~70%), color coded orange; (3) Unknown (or ~50%), color coded black; (4) Minor (~30%), color coded yellow; and (5) Slight (~10%), color coded gray) by:

(1) Combining all the raw intelligence reports related to the terrorists groups (within the network) into a terrorist network hypothesis matrix;

(2) Assessing Indictor Warning Levels as described in Task 13;

(3) Assessing Terrorist Intention Warning Level as described in Task 13;

(4) Assessing Terrorist Capability Warning Level as described in Task 15; and then (5) Combining the Terrorist Intention Warning Level and the Terrorist Capability Warning Level according to Utility Matrix 7, as already shown in FIG. 8.

The Terrorist Network Threat Warning Level is displayed on the terrorist group and network list webpage. The terrorist groups and networks are combined in the same list for ease of use, but users can filter and sort the list by select terrorist groups or networks by making selections on drop down menus in the website. The combined list makes it easy for users to see which groups belong to a network because the name of a group that belongs to a network will be repeated in the list with a reference to it's terrorist network (exemplified by Terrorist Group X—Al Qaeda Network in the list below), whereas the name of a terrorist group that does not belong to a network will not be repeated in the list with a reference to a terrorist network (exemplified by Terrorist Group Y in the list below).

For that reason, the combined list also makes it easy to see which groups belong to which terrorist networks. Because terrorist groups who cooperate do not necessary give a name to their terrorist network, this methodology has established a naming convention for terrorist networks. A terrorist network is named after its largest terrorist group and includes the word network at the end. For example, if Al Qaeda was the largest terrorist group among the terrorist groups with which it cooperates, then the network would be named the Al Qaeda Network. (Al Qaeda would still appear in the list as an individual group called Al Qaeda Group.) To enable users to easily see the smaller groups that belong to a network, the terrorist network will also be listed with a reference to the name of the smaller group in front of the network name. For example, if Terrorist Group X was one of the smaller groups in the Al Qaeda Network, then the network would also be listed as Terrorist Group X—Al Qaeda Network. Therefore the name of a terrorist network will appear two ways: (1) "Largest Group Name Network"; and (2) "A Smaller Group Name-Largest Group Name Network." Thus, an alphabetized list of terrorist groups and networks would look as follows:

(a) Al Qaeda Group
(b) Al-Qaeda Network
(c) Terrorist Group X
(d) Terrorist Group X—Al Qaeda Network
(e) Terrorist Group Y
(f) Terrorist Group Z
(g) Terrorist Group Z—Terrorist Network C Task 22:

In Task 22, the Computer Program assesses the Terrorist Individual Threat Warning Level (preferably daily). The discussion thus far shows how groups and networks are assessed as whole, but of course it is individuals who intelligence and law enforcement must deal with to actually prevent a terrorist attack, so the methodology also provides warning assessments for individuals.

Analysts (the Terrorist Network Indicator Specialists described further in the staffing plan) and the computer program work together to assess Terrorist Individual Threat Warning Levels on a 5-level scale of:

(1) Critical (~90%), about 90 percent probability, color coded red on the website;

(2) Significant (~70%), color coded orange;

(3) Unknown (or ~50%), color coded black;

(4) Minor (~30%), color coded yellow; and (5) Slight (~10%), color coded gray.

The computer program calculates a Terrorist Individual Threat Warning Level Warning Level by combining the terrorist's Position Priority and his Threatening Activity Level.

Recall that analysts identified/validated an indicator list for various Terrorist Positions in Task 1 of the methodology and rated/validated the priority of each position in Task 2 (as shown in Table 5). Recall that Terrorist Position Priority is defined as: the level of influence a terrorist position could have on preventing fellow terrorists from executing a given attack. The positions are prioritized on a three level scale of:

Priority 1: Those terrorist positions that probably could prevent fellow terrorists from executing a given attack (~80% probability).

Priority 2: Those terrorist positions that possibly could prevent fellow terrorists from executing a given attack (~50% probability).

Priority 3: Those terrorist positions that probably could not prevent fellow terrorists from executing a given attack (~20% probability).

The priority assigned to each position is shown in Table 5.

For each reported possible terrorist, analysts assess each indicator (as already described in Task 13 to determine Indicator Warning Levels) for the terrorist's position(s). If the position of the suspected terrorist is unknown, then the analyst begins using the indicators from all the positions until one (or more) positions become apparent. Then, the computer program averages all the Indictor Warning Levels of the terrorist's position to determine the Terrorist Threatening Activity Level on a five level scale of:

(1) Critical (~90%), about 90 percent probability, color coded red on the website;
(2) Significant (~70%), color coded orange;
(3) Unknown (or ~50%), color coded black;
(4) Minor (~30%), color coded yellow; and
(5) Slight (~10%), color coded gray;

Note that the capability and intention indicators are all averaged together rather than assessed in two separate groups. They are averaged together because, at the level of an individual, the capability activities closely reflect intention and because the data will likely be limited.

Figure 10:
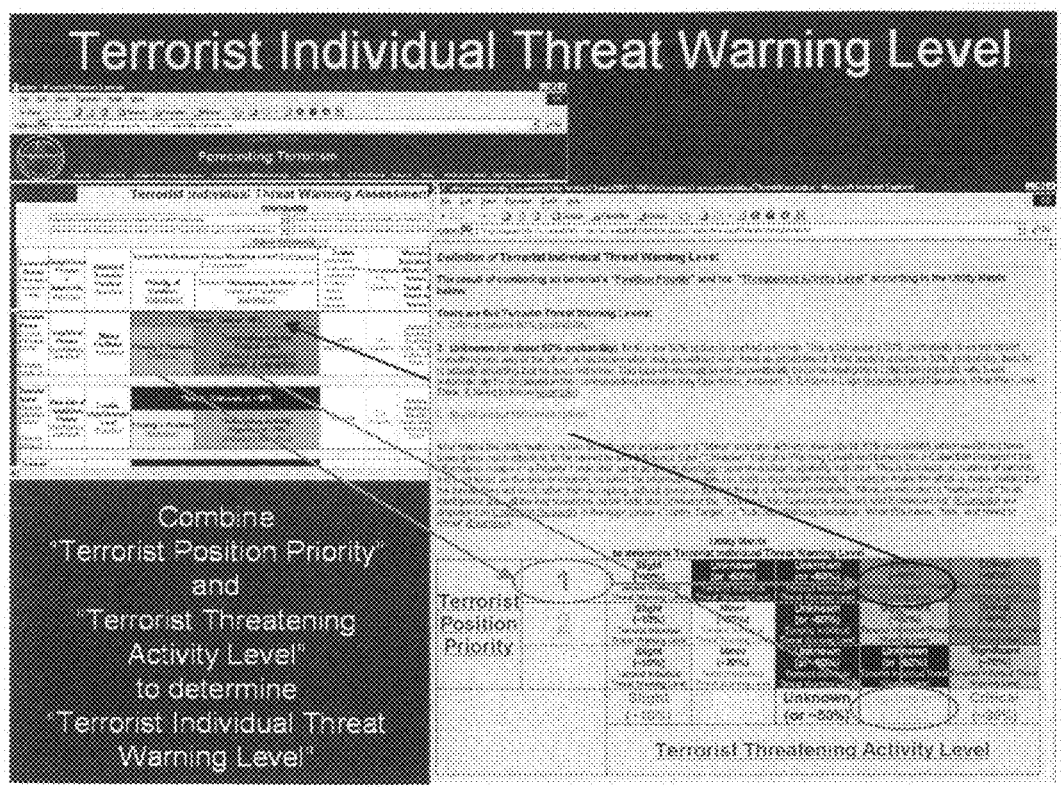
FIG. 10 shows a utility matrix that illustrates how Terrorist Position Priority and Terrorist Threatening Activity Level can be combined to determine Terrorist Individual Threat Warning Level.

In the rationale to rate the Terrorist Individual Threat Warning Level (Computer Program Determines Warning Level Via Utility Matrix 8, the computer program combines Terrorist Position Priority and the Terrorist Threatening Activity Level to determine a the Terrorist Individual Threat Warning Level (on a 5-level scale of: (1) Critical (~90%), about 90 percent probability, color coded red on the website; (2) Significant (~70%), color coded orange; (3) Unknown (or ~50%), color coded black; (4) Minor (~30%), color coded yellow; and (5) Slight (~10%), color coded gray) according to Utility Matrix 8 shown in FIG. 10. For example, if the Terrorist Threatening Activity Level for the "Attacker" position was assessed as "Significant (~70%)," then because that is a Priority 1 terrorist position, his terrorist Threat Warning Level would be "Critical (~90%)." The resulting value is displayed in the hypothesis matrix under the column marked Terrorist Individual Threat Warning Level.

Task 23:

In Task 23, Analysts write/update the Indicator Warning Narrative (What We Know, Think, & Need to Know) (preferably daily). Thus far, the discussion has shown how the methodology determines warning levels and that they are displayed in color-coded pictures for quick reference, but of course detailed narratives also are necessary.

These narratives are provided for indicators, targets, countries, terrorist groups, terrorist networks, and terrorist individuals. After an Indicator Specialist has updated his Indicator Questions, Answers, & Evidence Log with the new raw reporting of the day, he also updates his Indicator Warning Narrative: What We Know, Think, & Need to Know.

The Indicator Question Set provides an outline of all the major points that the narrative should address. The narrative begins with a description of what the analyst knows and thinks about the indicator, then is followed by a set of bullets on what he doesn't know—Intelligence Gaps, which are the questions to which the analyst answered "Unknown (or ~50%)" in the Indicator Questions, Answers, & Evidence Log. These questions to which the analyst answered "Unknown (or ~50%)" in the Indicator Questions, Answers, & Evidence Log automatically appear as Intelligence Gaps in the narrative (and are identified as higher priority Collection Requirements in the Intelligence Collection Plan in Task 42).

By including Intelligence Gaps in finished assessments, analysts guard against overstating their certainty on an assessment (high or low), and also enable intelligence collectors to find, in one place, the 2 primary types of information that they need before tapping a source: (1) all that the Intelligence Community knows on a given topic; and (2) all that the Intelligence Community needs to know on the topic.

Task 24:

In Task 24, the Computer Program and Analysts write/update the Target Risk Warning Narrative (What We Know, Think, & Need to Know) (preferably daily). The computer program combines all the indicator narratives related to a given target into a potential target narrative. Senior Warning Officers write and maintain executive summaries for each potential target narrative. While doing so, the Senior Warning Officers determine if they concur with the warning levels that their partly automated methodology produced. This is a reality check of the warning levels that will be published in the Webpages.

If the Senior Warning Officers do not concur with any of the warning levels that their partly automated methodology produced, they must write an explanation of why they have overridden the system. Senior Warning Officers can add Collection Requirements if the consolidated picture of indicator assessments on a specific target reveals any additional gaps in intelligence (as described in Task 43). The template for a Target Risk Warning Narrative: What We Know, Think, & Need to Know. The Indicator Warning Levels are also displayed in this narrative and include hyperlinks that bookmark to the paragraph on the corresponding indicator in the document. These narratives are ready to print with the latest daily updates at any time for decision makers.

Task 25:

In Task 25, the Computer Program and Analysts write/update the Country Risk Warning Narrative (What We Know, Think, & Need to Know) (preferably daily). The computer program also combines all the potential target executive summaries related to a given country into a country narrative. Again, Senior Warning Officers are responsible for maintaining executive summaries for the country narratives and justifying any overwrites they make to the warning levels that their partly automated methodology produced with the hypothesis and utility matrix logic. Again, Senior Warning Officers can add Collection Requirements if the consolidated picture of specific target assessments within a country reveals any additional intelligence gaps (as described in Task 43).

Task 26:

In Task 26, the Computer Program and Analysts write/update the Terrorist Group Threat Warning Narrative (What We Know, Think, & Need to Know) (preferably daily). The computer program also combines all the indicator narratives relating to a given terrorist group (which would only include the indicators of terrorist intention and terrorist capability) into a terrorist group narrative spanning all countries worldwide. (Analysts can make selections on the website products webpage to view just the terrorist group indicators for a given country or set of countries, but Senior Warning Officers are not responsible for maintaining executive summaries for them.)

Senior Warning Officers are responsible for maintaining executive summaries for the worldwide group narratives and justifying any overwrites they make to the warning levels that their partly automated methodology produced.

Additionally, the computer program inserts additional sections of the narrative, such as the following (as shown on the Webpage):

(1) Terrorist Network/Groups with which this Group Cooperates (computer program consolidates the list with hyperlinks to details);
(2) Countries of Operation (computer program consolidates list with hyperlinks to details);
(3) Potential Targets List of Group Acting Individually (computer program consolidates list a list with hyperlinks to details);
(4) Potential Targets List of Group Acting Jointly with its Terrorist Network (computer program consolidates a list with hyperlinks to details);
(5) History of Attacks (computer program consolidates a list with hyperlinks to detailed profiles);
(6) Primary Goal and Key Objectives (computer program pulls the description prepared by the Terrorist-Network Indicator Specialists in Task 20);
(7) Personnel Strength (computer program consolidates a list of worldwide and country estimates from the estimates given by the Terrorist-Network Indicator Specialists in Task 20);
(8) Profiles of Terrorist Individuals (computer program consolidates a list and creates hyperlinks to the descriptions prepared by the Terrorist-Network Indicator Specialists in Task 20); and
(9) Organizational Structure (computer program pulls the chart and narrative prepared by the Terrorist-Network Indicator Specialists in Task 20).

The computer program also automatically displays the data in the narrative on a Webpage with terrorist group profiles, which is an alternate format of displaying the information for quick reference. Again, Senior Warning Officers can add Collection Requirements if the consolidated picture of terrorist group indicator assessment worldwide reveals any additional intelligence gaps (as described in Task 43).

Task 27:

In Task 27, the Computer Program and Analysts write/update the Terrorist Network Threat Warning Narrative (What We Know, Think, & Need to Know) (preferably daily). The computer program also combines all the indicator narratives related to all the terrorist groups within a given terrorist network (which would again only include the indicators of terrorist intention and terrorist capability, not target vulnerability) into a terrorist network narrative.

Again, Senior Warning Officers are responsible for maintaining executive summaries for the terrorist network narratives and justifying any overwrites they make to the warning levels that their partly automated methodology produced. Additionally, the computer program inserts additional sections of the narrative such as the following (as shown on the Webpage):

(1) Member Groups of this Terrorist Network (computer program consolidates list with hyperlinks to details);
(2) Countries of Operation (computer program consolidates list with hyperlinks to details);
(3) Potential Targets List of Terrorist Network (computer program consolidates a list with hyperlinks to details);
(4) History of Attacks (which includes member groups acting individually) (computer program consolidates a list with hyperlinks to detailed profiles);
(5) Primary Goal and Key Objectives (computer program pulls the descriptions of the member groups prepared by the Terrorist-Network Indicator Specialists in Task 20);
(6) Personnel Strength (computer program consolidates a list of worldwide and country estimates from the estimates given by the Terrorist-Network Indicator Specialists in Task 20);
(7) Profiles of Terrorist Individuals (computer program consolidates a list and creates hyperlinks to the descriptions prepared by the Terrorist-Network Indicator Specialists in Task 20); and
(8) Organizational Structure (computer program pulls the charts and narratives of the member groups prepared by the Terrorist-Network Indicator Specialists in Task 20).

The computer program also automatically displays the data in the narrative on a webpage with the terrorist network profiles. Profiles of Terrorist Groups and Networks), which is an alternate format of displaying the information for quick reference. Again, Senior Warning Officers can add Collection Requirements if the consolidated picture of terrorist group assessments within a terrorist network reveals any additional intelligence gaps (as described in Task 43).

Task 28:

In Task 28, the Computer Program and Analysts write/update the Terrorist Individual Threat Warning Narrative (What We Know, Think, & Need to Know) (preferably daily). The computer program also combines all the indicator narratives relating to a given terrorist individual (which would only include the terrorist position indicators of intention and capability) into a terrorist individual narrative (which is shown on the Website).

The Terrorist Network Indicator Specialists are responsible for maintaining executive summaries for the terrorist individual narratives and justifying any overwrites they make to the warning levels that their partly automated methodology produced.

Additionally, the computer program inserts additional sections of the narrative (as shown on the Webpage). The computer program also automatically displays the data in the narrative on a webpage with terrorist individual profiles (as shown on the website), which is an alternate format of displaying the information for quick reference. Again, analysts can add Collection Requirements if the consolidated picture of terrorist individual information reveals any additional intelligence gaps (as described in Task 43).

Task 29:

In Task 29, the Computer Program and Analysts update/study the trend analysis of Indicator Warning Levels (preferably monthly). The discussion thus far has now shown how the methodology determines various warning levels, and that they are displayed in 4 primary views: indicator list, target list, country list, and terrorist group and network list. There is also trend analysis for each view.

The Indicator List View webpage shows what a given target looks like today, and the Indicator Trend Analysis Webpage shows what the target looked like each past month.

The computer automatically captures the Indicator Warning Level at the end of each month and plots it on the graph. The computer captures the level as it stood for the majority of the month. The computer also saves a copy of the current Indicator Warning Narrative: What We Know, Think, & Need to Know, and the Indicator Questions, Answers, & Evidence Log.

Indicator Specialists write analytic comments. The comment includes a discussion of successful and thwarted terrorist operations so analysts and decision makers can recognize successes and failures in the system. The database templates for trend analysis remind analysts that successful terrorist attacks are not the only source of useful reference events;

thwarted terrorist attacks also provide useful reference evidence because the terrorists still carried out their preparations for the attack despite the fact that it did not take place.

Trend analysis helps analysts recognize patterns and anomalies, which can in turn be used to adjust the scales for determining warning levels in the methodology.

Task 30:

In Task 30, the Computer Program and Analysts update/study the trend analysis of Target Risk Warning Levels (preferably monthly). A target-oriented trend analysis is maintained. The Target List View Webpage shows what a given target looks like today, and the Country Trend Analysis webpage shows what the target looked like each past month. Again; the computer automatically captures the warning level at the end of each month and plots it on the graph. Again, Senior Warning Officers write a comment discussing warning failures and successes and how the methodology will be adjusted, if necessary.

Task 31:

In Task 31, the Computer Program and Analysts update/study the trend analysis of Country Risk Warning Levels (preferably monthly). Thus, a country-oriented trend analysis is maintained. Again, the computer automatically captures the warning level at the end of each month and plots it on the graph. Again, Senior Warning Officers write a comment discussing warning failures and successes and how the methodology will be adjusted, if necessary.

Although this trend analysis may appear to involve an unusually high amount of low-level work for a senior-level analyst, it is necessary in order to truly develop his understanding of the big picture.

Task 32:

In Task 32, the Computer Program and Analysts update/study the trend analysis of Terrorist Group & Network Threat Warning Levels (preferably monthly). Trend analysis is maintained for the terrorist groups and networks listed in the terrorist group and network product view. Again, the computer automatically captures the warning level at the end of each month and plots it on the graph. Again, Senior Warning Officers write a comment discussing warning failures and successes and how the methodology will be adjusted, if necessary.

Task 33:

In Task 33, the Computer Program and Analysts update/study the trend analysis of Terrorist Individual Threat Warning Levels (preferably monthly). Trend is maintained for the terrorist individuals listed in the terrorist individual list product view. Again, the computer automatically captures the warning level at the end of each month and plots it on the graph. Again, Senior Warning Officers write a comment discussing warning failures and successes and how the methodology will be adjusted, if necessary.

Task 34:

In Task 34, the Analysts and the Computer Program update/study the Warning Failure (past attack) Comparison Case-Study Data on Indicators (as required). Trend analysis is not the only comparison available to help put current warning levels in perspective. Past terrorist attack data also provides useful points of comparison for the warning levels of indictors, targets, and terrorist groups and networks. Warning Failure (past attack) (comparison overview). This target oriented comparison is not available for countries because the scopes of comparison are not parallel.

Senior Warning Officers enter the past attack data and analytic commentary in the database according to the data profile elements on the input form for past attacks. Then, the computer program automatically displays the data in views for indictor comparison, target comparison, and terrorist group and network comparison. For the indicators, the computer shows which ones were observed and reported prior to all (researched) past attacks. The computer also shows which terrorist attack is the closest match regarding that indicator.

Task 35:

In Task 35, Analysts and the Computer Program update/study the Warning Failure (past attack) Comparison Case-Study Data on Targets (as required). Past attack comparison is available for targets. Senior Warning Officers enter the past attack data and analytic commentary in the database according to the data profile elements on the input form for past attacks. Then, the computer program automatically displays the data in views for indictor comparison, target comparison, terrorist group and network comparison, and terrorist individual comparison. The computer also shows which terrorist attack data is the closest match to the data in the potential target hypothesis matrix. If two past attacks match a current potential target on the Target Risk, Terrorist Intention, Terrorist Capability, and Target Vulnerability Warning Levels, then the computer compares the individual indicators to determine the closest match.

Task 36:

In Task 36, Analysts and the Computer Program update/study the Warning Failure (past attack) Comparison Case-Study Data on Terrorist Groups and Networks (as required). Past attack comparison is available for terrorist groups and networks. Senior Warning Officers enter the past attack data and analytic commentary in the database according to the data profile elements on the input form for past attacks. Then, the computer program automatically displays the data in views for the terrorist group and network comparison.

The computer also shows which terrorist attack perpetrator/group/network data is the closest match to the data in the terrorist group or terrorist network threat hypothesis matrix. To identify the closest match for a terrorist group or network, the computer will select from both terrorist group and terrorist network attacks in each case because the purpose is simply to compare the perpetrator's intention and capability levels, not to distinguish between the types of perpetrators (groups and networks). However, users can chose to limit a comparison search to just select terrorist groups or networks if they choose.

Task 37:

In Task 37, Analysts and the Computer Program update/study the Warning Failure (past attack) Comparison Case-Study Data on Terrorist Individuals (as required). Past attack comparison is available for terrorist individuals (which is shown on the Website). Senior Warning Officers enter the past attack data and analytic commentary in the database according to the data profile elements on the input form for past attacks. Then, the computer program automatically displays the data in views for the terrorist individual comparison.

The computer also shows which terrorist attack perpetrator/individual data is the closest match to the data in the terrorist individual threat hypothesis matrix. To identify the closest match for a terrorist individual, the computer will select from all terrorist group attacks because the purpose is simply to compare the individual's intention and capability levels, not to distinguish between the types groups. However, users can chose to limit a comparison search to just select terrorist groups or networks if they choose.

Task 38:

In Task 38, Analysts and the Computer Program update/study the Warning Success (thwarted attack) Comparison Case-Study Data on Indicators (as required). Past terrorist attacks are not the only source of useful terrorism reference events; thwarted terrorist attacks also provide useful reference evidence because the terrorists still carried out their preparations for the attack despite the fact that it did not take place.

Furthermore, showing decision makers warning success helps to counter the warning pitfall of the Warning Paradox that erodes decision makers' confidence in analysts (as described in the evaluation of the methodology against the 42 common warning pitfalls).

Moreover, study of warning success can help analysts see what they are doing right so they can continue to do so. Warning success data is displayed in views for indictor comparison, target comparison, and terrorist group and network comparison. This target oriented comparison is not available for countries because the scopes of comparison are not parallel.

Senior Warning Officers enter the thwarted attack data and analytic commentary in the database according to the data profile elements on the input form for thwarted attacks. Then, the computer program automatically displays the data in views for indictor comparison, target comparison, and terrorist group and network comparison. For the indicators, the computer shows which ones were observed and reported prior to all (researched) thwarted attacks. The computer also shows which thwarted attack is the closest match regarding that indicator.

Task 39:

In Task 39, Analysts and the Computer Program update/study the Warning Success (thwarted attack) Comparison Case-Study Data on Targets (as required). Thwarted attack comparison is available for targets.

Senior Warning Officers enter the thwarted attack data and analytic commentary in the database according to the data profile elements on the input form for thwarted attacks. Then, the computer program automatically displays the data in views for indictor comparison, target comparison, and terrorist group and network comparison. The computer also shows which thwarted attack data is the closest match to the data in the potential target hypothesis matrix. If two thwarted attacks match a current potential target on the Target Risk, Terrorist Intention, Terrorist Capability, and Target Vulnerability Warning Levels, then the computer compares the individual indicators to determine the closest match.

Task 40:

In Task 40, Analysts and the Computer Program update/study the Warning Success (thwarted attack) Comparison Case-Study Data on Terrorist Groups & Networks (as required). Thwarted attack comparison is available for terrorist groups and networks.

Senior Warning Officers enter the thwarted attack data and analytic commentary in the database according to the data profile elements on the input form for thwarted attacks. Then, the computer program automatically displays the data in views for indictor comparison, target comparison, and terrorist group and network comparison.

The computer also shows which thwarted perpetrator data is the closest match to the data in the terrorist group or terrorist network threat hypothesis matrix. To identify the closest match for a terrorist group or network, the computer will select from both terrorist group and terrorist network attacks in each case because the purpose is simply to compare the perpetrator's intention and capability levels, not to distinguish between the types of perpetrators (groups and networks). However, users can chose to limit a comparison search to just select terrorist groups or networks if they choose.

Task 41:

In Task 41, Analysts and the Computer Program update/study the Warning Success (thwarted attack) Comparison Case-Study Data on Terrorist Individuals (as required). Thwarted attack comparison is available for terrorist individuals (which is shown on the Website).

Senior Warning Officers enter the past attack data and analytic commentary in the database according to the data profile elements on the input form for past attacks. Then, the computer program automatically displays the data in views for the terrorist individual comparison.

The computer also shows which terrorist attack perpetrator/individual data is the closest match to the data in the terrorist individual threat hypothesis matrix. To identify the closest match for a terrorist individual, the computer will select from all terrorist group attacks because the purpose is simply to compare the individual's intention and capability levels, not to distinguish between the types groups. However, users can chose to limit a comparison search to just select terrorist groups or networks if they choose.

Phase VI

In Phase VI, collectors are focused on Intelligence Gaps to refine/update conclusions (by re-prioritizing collection requirements).

Task 42:

In Task 42, the Computer Program re-prioritizes Indicator Questions so that the Questions Answered Unknown become the Higher Priority Collection Requirements in the Intelligence Collection Plan (as required). Now that analysts have developed assessments using the raw intelligence reports that intelligence collectors provided in response to the intelligence Collection Requirements identified in the Intelligence Collection Plan Webpage, analysts should focus intelligence collectors on the unanswered questions (Collection Requirements), which are intelligence gaps, in order to improve their assessments. The questions to which the analysts answered "Unknown (or ~50%)" in the Indicator Questions, Answers, & Evidence Logs are the intelligence gaps, and these questions are automatically highlighted as the higher priority Collection Requirements in the Intelligence Collection Plan webpage—because the answered questions are reduced in priority.

Figure 11:
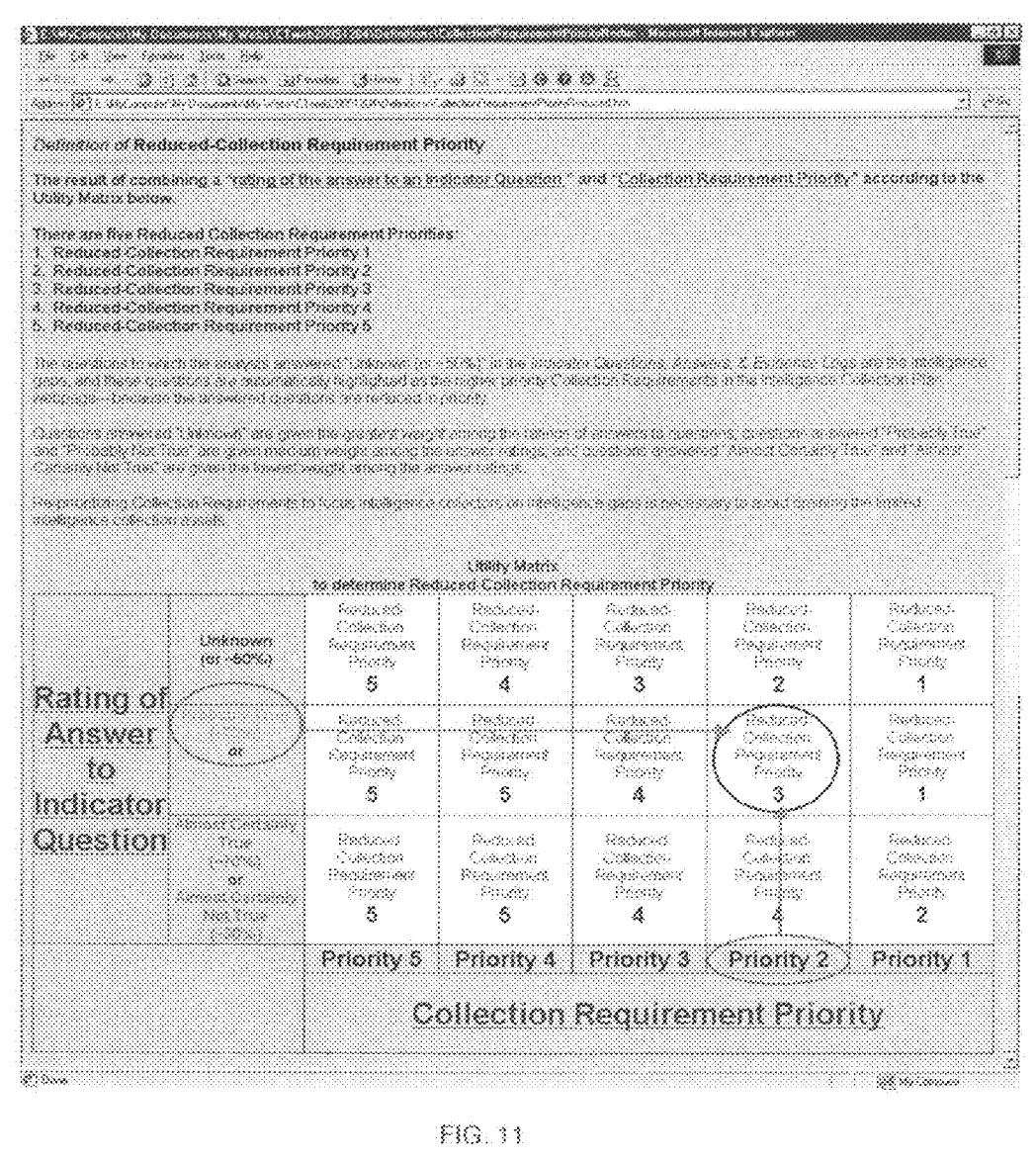

Answered questions are reduced in priority according to Utility Matrix 9 (shown in FIG. 11). The computer program combines the rating of the answer to a question and a Collection Requirement Priority according to Utility Matrix 9 (shown in FIG. 11) to determine a Reduced-Collection Requirement Priority on a 5-level scale of:

(1) Reduced-Collection Requirement Priority 1 (the most significant);
(2) Reduced-Collection Requirement Priority 2;
(3) Reduced-Collection Requirement Priority 3;
(4) Reduced-Collection Requirement Priority 4; and
(5) Reduced-Collection Requirement Priority 5.

The Utility Matrix 9 works as follows. The computer program combines the rating of the answer to a question (shown in one of the boxes on the y-axis of FIG. 11) and a Collection Requirement Priority (shown in one of the boxes on the x-axis of FIG. 11) according to Utility Matrix 9 to determine a Reduced-Collection Requirement Priority shown in one of the inside boxes of the utility matrix.

For example, if the answer to a question was rated "Probably True" and the Collection Requirement Priority was "Priority 2" then the Reduced-Collection Requirement Priority would be "Priority 3." Questions answered "Unknown" are given the greatest weight among the ratings of answers to questions; questions answered "Probably True" and "Probably Not True" are given medium weight among the answer ratings; and questions answered "Almost Certainly True" and "Almost Certainly Not True" are given the lowest weight among the answer ratings.

Focusing collectors on intelligence gaps is necessary to avoid draining the limited intelligence collection assets. Generic Collection Requirements (even if answered) and some non-perishable terrorist group/network-specific, country-specific, and target-specific Collection Requirements should not be removed from an Intelligence Collection Plan because changes can occur in existing intelligence collection targets, and analysts must continue to receive new raw reports to update their assessments to reflect those changes.

This method of re-prioritizing Collection Requirements near-real-time to highlight analyst's intelligence gaps in the Intelligence Collection Plan webpage helps focus intelligence collection in an efficient and timely way that supports warning.

As mentioned in Task 5, there is no single place that intelligence collectors with a need to know can access all the Intelligence Community's latest intelligence Collection Requirements on a given topic, so consequently an intelligence collector must spend valuable time researching requirements that could be better spent researching sources.

This automatically updated Intelligence Collection Plan Webpage would improve the timeliness of communication between intelligence analysts and intelligence collectors and therefore improve the timeliness of intelligence warning products. Furthermore, by enabling collectors to see not only the questions, but also the assessed answers (in the Indicator Questions, Answers, & Evidence Logs and corresponding Warning Narratives: What We Know, Think, & Need to Know) provides intelligence collectors with the two primary types of information they need before tapping a source: (1) all the Intelligence Community knows on a given topic; and (2) all the Intelligence Community needs to know on the topic.

With this task, collection not only feeds analysis, but analysis also feeds collection, which is the way the intelligence cycle is supposed to work. Moreover, with collectors and analysts working off the same near-real-time waning picture, the intelligence cycle of collection feeding analysis and analysis feeding collection is timelier.

Task 43:

In Task 43, Analysts add Indicator Questions that are target-specific, country-specific, Terrorist Group/Network-specific, or Terrorist Individual-specific to the Intelligence Collection Plan (as required). While developing assessments, analysts may discover intelligence gaps that apply only to a specific terrorist group/network, country, or target. For example, an analyst may need to know information about a specific terrorist in a particular terrorist group.

Additionally, the consolidated picture of a warning assessment may reveal additional intelligence gaps (as described in Task 43). Analysts can add these terrorist group/network-specific, country-specific, or target-specific Collection Requirements to the Intelligence Collection Plan as necessary. Analysts follow three key principles when generating additional Collection Requirements:

(1) Collection Requirements must be stated as questions.
(2) The questions can be as specific as necessary—such as, "Where is the man in the attached photograph?"
(3) Collection Requirements should be geared toward disproving (rather than proving) a hypothesis.

Phase VII

In Phase VII, conclusions are communicated and warning is given (using Website Templates).

Task 44:

In Task 44, Analysts provide verbal briefing and/or written reports to a Decision Maker using the Website templates (as required). The final task of a warning system is to convey the warning. This is where the warning process fails most often. The primary cause of warning failure is decision makers ignoring intelligence, which may also be characterized as analysts failing to persuade decision makers. It is known that decision makers ignore intelligence for 12 primary reasons, nine of which involve weaknesses in analytic product.

Therefore, Senior Warning Officers brief the warning levels to decision makers using the website templates because the website templates have been designed to guard against nine of the 12 reasons decision makers ignore intelligence.

Moreover, in the Intelligence Community, it is common for a junior analyst to brief a decision maker who has many more years of experience on the subject. Thus, an analyst who attempts to rely on his intuitive experience as grounds for persuasion rather than demonstrating a reasoning process is unlikely to fare well against the decision maker's more experienced intuition (justified or not). Analysts must do everything within their power to make a warning assessment/picture persuasive. With the intuitive technique alone, analysts cannot demonstrate the reasoning process that led to their assessment.

The Website templates are designed to convey the structured reasoning process behind each warning level. Leading graphic interface experts have found that the most effective way to capitalize on "human perceptual skills (which) are remarkable, but largely underutilized by current graphical interfaces," is to show overview first, (then) zoom and filter, and then details-on-demand. The warning assessment templates in this website follow that design principle via 4 primary types of color-coded warning picture views: (1) terrorist group and network list view; (2) country list view; (3) target list view; and (4) indicator list view (of terrorist intentions, terrorist capability, or target vulnerability). With the click of a button, analysts can further take decision makers all the way down to the detailed indications contained in individual raw intelligence reports shown as supporting evidence in the Indicator Questions, Answers, & Evidence Logs. Decision makers sometimes want to know these details because it can cost millions of dollars and involve difficult political negotiations with a host country to increase a security posture/Force Protection Condition (FPCON). This layout also allows decision makers, who do not have the time or need to see details, a quick overview, while still providing details-on-demand.

At times, decision makers trust the opinion of foreign leaders over their own warning system. Therefore the question arises: What more can analysts do to gain decision makers' trust in their warning assessments? Heeding a warning requires an acceptance of change in the status quo. People frequently resist and fear change, but marketing researchers have made it their business to persuade people to trust and change to a new product, in the same way that analysts try to persuade decision makers to trust and accept a new assessment.

Lack of trust despite clear evidence is not an uncommon phenomenon according to marketing research, which shows that the process by which people develop trust for a product follows these steps: Frequency [leads] to awareness, awareness to familiarity, and familiarity to trust. Intelligence analysts, like marketers, can make that human bias (familiarity) work for them. By establishing a consistent method for displaying information and rationales in intelligence products, analysts would help breed familiarity and therefore trust in intelligence products to counter the familiarity of the status quo. An analyst must "sell" his assessment to decision makers. If the Intelligence Community agrees on a universal, website display format for intelligence warning products, and uses it for all presentations to decision makers, then that that repetition can lead to awareness, familiarity, and consequently trust. Furthermore, the fact that the decision maker learns that the information is available to him at any time on a website further promotes frequency of use and familiarity in the product. Furthermore, the systematic analytic process is repetitive so it can also breed familiarity and trust in the rationales of the analytic products.

Therefore, in this warning methodology, in order to make the presentation of analysis more persuasive to decision makers, analysts are responsible for using the methodology's consistent website displays for presenting intelligence information and rationales to decision makers.

The Website template products are ready to print any time with the latest updates for decision makers. The nature of warning demands timely assessment and response. Before the Sep. 11, 2001 terrorist attacks, there was just 1 month between the Priority 1 indication of terrorist travel and the attack. Today, assessments can take a month to get published and disseminated, and they are outdated soon thereafter, but these website templates are updated daily and available daily.

If a decision maker heeds an analyst's warning and consequently alters a security posture/FPCON, the analyst enters the new corresponding value for the Security Posture/FPCON Indicator, amongst all the other vulnerability indicators. Then, the computer program automatically recalculates the vulnerability and risk levels according to the new Security Posture/FPCON, and displays them. This enables decision makers to immediately see how their decisions affect the risk level to a given threat.

Task 45:

In Task 45, if a warning is rejected, Analysts elicit and document the reason(s) provided by the Decision Makers (as required). If a decision maker chooses not alter an FPCON/Security Posture after receiving the Senior Warning Officer's assessment, then the Senior Warning Officer must elicit the reason(s) that the decision maker rejected the assessment and document those reason(s).

If any of the reasons is a belief that the assessment is inaccurate, then the Senior Warning Officer ensures that the next assessment identifies the decision maker's objections and gives specific responses to the those objections, thereby showing the decision maker that the revised assessment has accounted for the decision maker's arguments and/or corresponding additional evidence.

This task exists because marketing researchers, whose business it is to persuade people to accept new things, have shown that a critical step in persuading a person is to enable him to know that his opinion and information have been heard and accounted for.

An analyst must "sell" his assessment to decision makers. Therefore, in this methodology, analysts must document and respond to a decision maker's objections to assessments whenever possible to show the decision maker that his concerns have been heard and that the revised assessment has accounted for the decision makers' arguments and/or corresponding additional evidence. In cases when the decision maker rejects the assessment for a reason(s) other than the belief that the assessment is inaccurate, the analyst may not be able to do anything.

Task 46:

In Task 46, Analysts re-brief the Decision Makers with Responses to Questions/Objections and show new evidence using Website templates (as required). Once that analyst has updated his assessment with the decision maker's objections and the analyst's responses to those objections, the analyst returns to the decision maker with new evidence to press the assessment until the decision maker heeds the warning.

Some intelligence experts dispute that it is an analyst's responsibility to persuade decision makers in the warning process. They argue that if an analyst informs decision makers of a potential event, but decision makers reject that assessment, then that is a case of policy failure, not intelligence failure. However, former intelligence experts and decision makers explained the importance of persuasiveness well.

A critical point to emphasize about the present system is that for it to succeed, it must have a trained, coordinated staff to operate it. This staffing plan (shown in Table 6) provides:

(1) A job description for each type of analyst position and clearly identifies corresponding relationships between analysts in the workflow; and (2) An explanation of how many of each type of analyst is required for worldwide coverage.

These staffing numbers are a starting point, which can be adjusted as necessary, base on assumptions about the estimated number of raw reports received daily and the estimated time it would take an analyst to perform his tasks.

Thus, assuming 7500 raw intelligence reports a day and the use of Raw Reporting Profilers (which could be replaced with computer program taxonomies to pre-categorize the reports based on key words), 579 analysts are required—208 Raw Reporting Profilers, 366 Indicator Specialists, and 5 Senior Warning Officers. Assuming 7500 raw intelligence reports a day and the use of computer program taxonomies to replace Raw Reporting Profilers, 457 analysts are required—452 Indicator Specialists and 5 Senior Warning Officers. Assuming 2500 raw intelligence reports a day and the use of Raw Reporting Profilers (which could be replaced with computer program taxonomies to pre-categorize the reports based on key words), 191 analysts are required—70 Raw Reporting Profilers, 116 Indicator Specialists, and 5 Senior Warning Officers. Assuming 2500 raw intelligence reports a day and the use of computer program taxonomies (to replace the Raw Reporting Profilers), 149 analysts are required—144 Indicator Specialists and 5 Senior Warning Officers.

Even the largest staff, 579 analysts, is considerably less than the Intelligence Community currently has working to provide worldwide terrorism assessments. This staff could contribute to the forecasting system from multiple locations because the website interface provides that capability. This would allow the designated experts/analysts for the indicators to work from the location that enables them to maximize their expertise.

Figure 12:
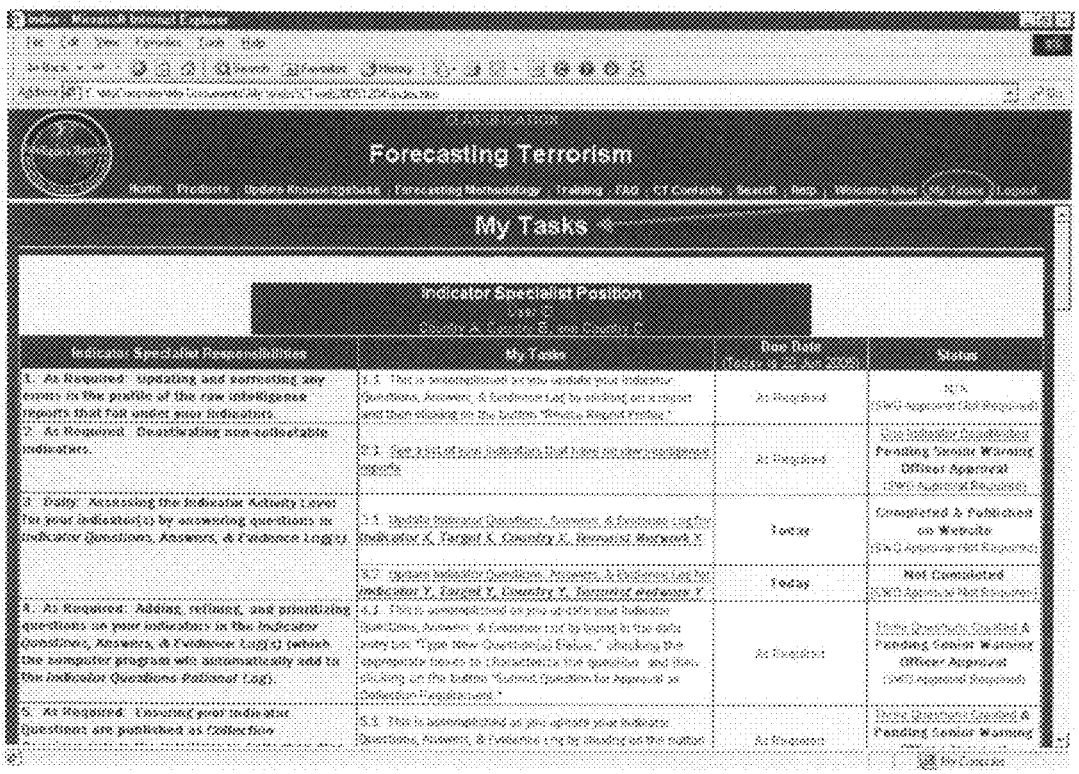
FIG. 12 depicts a Webpage, designated "My Tasks", which tracks and displays each analyst's tasks based on their assigned responsibilities in the system.

This system is a highly efficient use of personnel resources because recurring, analytic tasks are automated wherever possible, and because the analysts are working in a coordinated, systematic effort. The computer system helps to manage each analyst's tasks in the workflow by automatically notifying the analyst on his "My Tasks" Webpage (shown in FIG. 12) that he has a new task. For example, an Indicator Specialist may be notified that new reports are in one of his indicators and therefore show that the corresponding Indicator Questions Answers, Evidence Log and Indicator Warning Narrative: What We Know, Think, and Need to Know need to be updated. Additionally hyperlinks are provided to the Webpages he needs to update. Also, a Senior Warning Officer may be notified that a Target Risk Warning Level has increased from "Unknown or ~50%" to "Significant~70%" and that the change requires his approval before it can be published on the website. Additionally a hyperlink is provided to the webpage showing the warning level data he needs to approve.

In the training progression of analysts, Raw Reporting Profilers can become Indicator Specialists, and Indicator Specialists can become Senior Warning Officers. Alternatively, a single person could function in all three roles, but for the simplicity of this explanation and determination of manpower requirements, this staffing plan shows each analyst working in a single role.

in the Terrorism Forecasting Master Database according to indicators, indicator questions, targets, countries, terrorist groups, and other data profile elements, so that Indicator Specialists have all the reports they require in their Indicator Questions Answers and Evidence Logs. Approximately 208 Raw Reporting Profilers are required, assuming approximately 7500 raw reports are received daily. If one analyst can profile one report in an average of 10 minutes, and he profiles reports for six hours in an eight-hour working day, then he can profile 36 reports in a day. Thus, 208 Raw Reporting Profilers would be required to profile 7500 raw reports daily.

The requirement for the Raw Reporting Profilers could be eliminated entirely by:

(1) Relying on an artificial intelligence computer program (taxonomies) to presort the reports based on key words (after a period of observation evaluation); by using the help of humans in combination with the program, analysts can increase accuracy and save time and manpower.

(2) Tasking the Indicator Specialists to validate and complete the profiles of reports when they read the reports to update their Indicator Questions, Answers, and Evidence Logs.

(3) Increasing the number of Indicator Specialists by 19% because they would require an additional 3.5 minutes (19% increase in time) to validate the profile of a report

TABLE 6

Staffing Plan: Analyst Positions by Region
Staffing Plan: Analyst Positions and Numbers by Region
Assuming 7500 Raw Intelligence Reports Daily

| | Number of Analysts | North America | Europe | South Asia-Middle East | East Asia-Pacific | Africa | Latin America-Caribbean |
|---|---|---|---|---|---|---|---|
| Total Number of Analysts | 591 | | | | | | |
| Raw Reporting Profiler (RRP) | 208 | 208 Raw Reporting Profilers (RRPs) to profile ~7500 raw intelligence reports daily | | | | | |
| Nuclear & Radiological Indicator Specialist (NRIS) | 3 | NRIS-3 Assuming <30 reports daily related to nuclear and radiological terrorism | | | | | |
| Biological Indicator Specialist (BIS) | 3 | BIS-3 Assuming <30 reports daily related to biological agent terrorism | | | | | |
| Chemical Indicator Specialist (CIS) | 3 | CIS-3 Assuming <30 reports daily related to chemical agent terrorism | | | | | |
| Terrorist-Network Indicator Specialist (NIS) Terrorist-Group Indicator Specialist (GIS) | 135 | NIS-30 Assuming <600 reports daily | NIS-30 Assuming <600 reports daily | NIS-30 Assuming <600 reports daily | NIS-15 Assuming <300 reports daily | NIS-15 Assuming <300 reports daily | NIS-15 Assuming <300 reports daily |
| Muslim Terrorist Groups | 140 | GIS-31 Assuming <620 reports daily | GIS-31 Assuming <620 reports daily | GIS-31 Assuming <620 reports daily | GIS-15 Assuming <300 reports daily | GIS-16 Assuming <320 reports daily | GIS-16 Assuming <320 reports daily |
| Non-Muslim Terrorist Groups | 3 | GIS-1 Assuming <30 reports daily | GIS-1 Assuming <30 reports daily | | Assuming <30 reports daily (related to U.S. interests) | GIS-1 | |
| Terrorists' Targets Indicator Specialist (TIS) | 91 | TIS-20 Assuming <400 reports daily | TIS-21 Assuming <420 reports daily | TIS-20 Assuming <400 reports daily | TIS-10 Assuming <200 reports daily | TIS-10 Assuming <200 reports daily | TIS-10 Assuming <200 reports daily |
| Senior Warning Officer (SWO) | 5 | SWO-1 | SWO-1 | SWO-1 | | SWO-1 | SWO-1 |

The staff preferably involved in carrying out the present invention comprise, but are not limited to, the following.

Raw Reporting Profilers are a large group of junior analysts who are responsible for validating and adjusting the categorization of the thousands of incoming terrorism related-raw intelligence reports that a computer program pre-categorized (excluding 1.5 minutes to profile the indicator questions, since they already do that), making a total 18.5 minutes per report.

Indicator Specialists are the Counterterrorism Community's designated experts in determining the status or "Indicator Activity Level" for a given indicator or set of indicators for a given country(s) and maybe a corresponding terrorist groups(s). These specialized analysts are responsible for:

For all Indicator Specialists:
(1) As Required: Updating and correcting any errors in the profile of the raw intelligence reports that fall under their indicators.
(2) As Required: Deactivating any of their indicator(s) that are non-collectable.

For all Indicator Specialist Except the Terrorist-Network Indicator Specialists (NIS):
(3) Daily: Assessing the Indicator Activity Level for their indicator(s) by answering questions in Indicator Questions, Answers, & Evidence Log(s) (on a 5-level scale of (1) Almost Certainly True (~90%), about 90 percent probability, color coded red on the website; (2) Probably True (~70%), color coded orange; (3) Unknown (or ~50%), color coded black; (4) Probably Not True (~30%), color coded yellow; and (5) Almost Certainly Not True (~10%), color coded gray).
(4) As Required: Adding, refining, and prioritizing questions on their indicators in the Indicator Questions, Answers, & Evidence Log(s) (which the computer program will automatically add to the Indicator Questions-Rational Log).
(5) As Required: Ensuring their Indicator Questions are published as Collection Requirements in the Intelligence Collection Plan.
(6) Daily: Writing and maintaining an Indicator Warning Narrative: What We Know, Think, & Need to Know for each of their indicators.

For Terrorist-Network Indicator Specialists (NIS) Only:
(3) Daily: Helping to assess if the terrorist group(s) for which they are responsible cooperate with other terrorist groups (and form terrorist networks) by answering questions in Network Questions, Answers, & Evidence Logs (on a 5-level scale of (1) Almost Certainly True (~90%), about 90 percent probability, color coded red on the website; (2) Probably True (~70%), color coded orange; (3) Unknown (or ~50%), color coded black; (4) Probably Not True (~30%), color coded yellow; and (5) Almost Certainly Not True (~10%), color coded gray).
(4) As Required: Adding, refining, and prioritizing questions on the terrorist groups for which they are responsible in the Terrorist Network Questions, Answers, & Evidence Logs (which the computer program will automatically add to the Terrorist Network Questions-Rational Log).
(5) As Required: Ensuring their Terrorist Group and Network Questions are published as Collection Requirements in the Intelligence Collection Plan.
(6) As Required: Creating and maintaining (for the terrorist group(s) and network(s) for which they are responsible):
(a) Terrorist Individual Profiles by entering any available data from a raw intelligence report into the corresponding database input form fields.
(b) Personnel strength estimates for the countries for which they are responsible. Personnel strength shows a high and low estimate. The high estimate counts all information that could relate to multiple individuals separately, thereby counting the highest number of individuals possible. The low estimate counts all information that could be related to multiple individuals only one time, thereby counting the lowest number of individuals possible. The computer calculates the estimates from three types of analyst input: Terrorist Individual Profiles, reported personnel strength estimates that the analyst believes include the individuals already identified in the profiles, and reported personnel strength estimates that the analyst does not believe include the individuals already identified in the profiles.
(c) An organizational chart and accompanying narrative.
(d) A description of the group's primary goal and key objectives. (Note that multiple Terrorist-Network Indicator Specialists will update the same organizational charts, organizational chart narratives, Terrorist Individual Profiles, personnel strength estimates, and descriptions of groups' primary goals and key objectives. This saves duplication of effort.) (Note that the Terrorist-Network Indicator Specialists update the above products instead of their Indicator Questions, Answers, & Evidence Logs and accompanying narrative because the computer program automatically determines the answers to those questions and updates the corresponding narrative from the above inputs.)

For all Indicator Specialists:
(7) Monthly: Writing analytic comments for the computer-generated trend-analysis pictures of their indicators.
(8) Annually: Determining, with Senior Warning Officers, if the list of indicators should be altered and reprioritized by:
(a) Reviewing the raw intelligence reports filed under the Miscellaneous Indicators to determine if any kinds of significant terrorist activity have been overlooked.
(b) Reviewing U.S. collection capabilities to determine if the U.S. has gained or lost the capability to collect on any terrorist activities.
(c) Reviewing case studies of terrorist operations to identify changes in terrorist modus operandi and determine if terrorists are conducting any new activities against which U.S. intelligence can collect.

Some combination of approximately 366 Indicator Specialists are required assuming 7500 raw intelligence reports are received per day, because if one analyst can read a report, answer a corresponding indicator question(s) in an Indicator Questions, Answers, & Evidence Log, and update the corresponding Indicator Warning Narrative: What We Know Think & Need to Know in an average of 15 minutes, and he does so for five hours in an eight-hour working day, then he can read and answer questions for 20 reports in a day. The Terrorist Personnel Indicator Specialists would require approximately the same amount of time (15 minutes) to read a report, answer a corresponding question(s) in the Terrorist Network Questions, Answers, & Evidence Log, and possibly update a Terrorist Individual Profile(s), a personnel strength estimate, an organizational chart and accompanying narrative, or a description of the group's primary goal and key objectives.

Thus, 366 Indicator Specialists would be necessary to perform their primary daily tasks on 7500 raw reports daily. Five hours rather than 6 hours (in an 8-hour working day) are assumed for the Indicator Specialists' primary daily tasks on a raw report because Indicator Specialists require time for their other responsibilities. Some reports may need to be read more than once by different Indicator Specialists if the report relates to more than one indicator. The Indicator Specialists are each responsible for an indicator or set of indicators for a given country(s)/region(s) of the world and maybe a corresponding terrorist group(s).

The indicators are grouped under the analysts in a way that optimizes the analysts' efficiency and ability to assess them. For instance, the analyst who tracks suspicious incident reporting would be in the best position to know how well a host nation cooperates with the U.S. on counter terrorism efforts because he will have become very familiar with things like how willing to the host nation is to provide name checks against vehicle license plates involved in suspicious incidents.

Based on those kinds of principles, the indicators are grouped under the following six types of Indicator Specialists (as already shown in Table 1. Indicators of Terrorism):
  (1) Nuclear & Radiological Indicator Specialist (NRIS).
  (2) Biological Indicator Specialist (BIS).
  (3) Chemical Indicator Specialist (CIS).
  (4) Terrorist-Network Indicator Specialist (NIS).
  (5) Terrorist-Group Indicator Specialist (GIS).
  (6) Terrorists' Targets Indicator Specialist (TIS).

If an analyst is responsible for assessing an indicator or indicators that relate to a large number of daily raw reports, then he does so for only a small group of countries (and maybe corresponding terrorist groups). If an analyst is responsible for assessing an indicator or indicators that relate to a small number of daily raw reports, then he does so for a large group of countries (and maybe corresponding terrorist groups). Thus, the assignment of these analysts' responsibilities is based primarily on logical groupings of indicators and the amount of related daily raw intelligence reporting rather than groups of countries. The number of indicator specialists required per region is a starting point based on estimating which regions have the most threat reporting. Europe, North America, and the Middle East are estimated to have double the amount of threat reporting (related to U.S. interests) in comparison to East Asia-Pacific, Africa, and Latin America-Caribbean; so Europe, North America, and the Middle East have double the number of analysts.

Table 4 (Staffing Plan: Analyst Positions by Region) depicts how many of each type of Indicator Specialist are required for worldwide coverage. Although one Nuclear & Radiological Indicator Specialist (NRIS) could probably read and answer question sets on all the daily nuclear and radiological related terrorism reporting worldwide, three people are assigned to do so because redundancy and extra expertise and are prudent for such perilous threats. The reporting is not divided between the three Nuclear & Radiological Indicator Specialists (NRIS) by countries because that would defeat the purpose of the redundancy.

For the same reasons, three Biological Indicator Specialist (BIS) are assigned to the biological capability indicator worldwide and three Chemical Indicator Specialist (CIS) are assigned to the chemical capability indicator worldwide.

Although the Terrorist-Network Indicator Specialists (NIS) are only responsible for two indicators ("Personnel Strength and/or Identifying-Data on Terrorist Network Personnel" and "Noteworthy Changes to Terrorist Groups Goals and Objectives"), these analysts are assigned only a limited number of countries within a region because many of the 7500 reports (an estimated 50 percent) will mention information about a terrorist individual and thus require attention from Terrorist-Network Indicator Specialists.

Because each Terrorists' Targets Indicator Specialist (TIS) is responsible for many indicators that relate to an estimated one quarter of the reporting, this type of Indicator Specialist is only assigned a limited of countries within a given region. More analysts are assigned to North America, Europe, South Asia-Middle East (than East Asia-Pacific, Africa, or Latin America-Caribbean) because those regions probably have more threat reporting. Europe, North America, and the Middle East are estimated to have double the amount of threat reporting (related to U.S. interests) in comparison to East Asia-Pacific, Africa, and Latin America-Caribbean; so Europe, North America, and the Middle East have double the number of Terrorists' Targets Indicator Specialists.

For the same reason, the Terrorist-Group Indicator Specialist (GIS) positions are also divided out by those regions of the world. Additionally, the number of Terrorist-Group Indicator Specialist (GIS) positions varies for each region of the world depending on the number of terrorist groups active in a given region (and the number of corresponding raw reports).

Once the computer determines the typical number of daily raw reports received in each category, the computer can also adjust the recommended number of each type of analyst (based on the assumption, or variation of the assumption, that one Indicator Specialist can perform his primary daily tasks on approximately 20 reports per day at a rate 15 minutes per report for 5 hours a day.)

Senior Warning Officers are a small group of senior analysts who are responsible for ensuring the warning levels are consistent with the available evidence/raw intelligence reports. Senior Warning Officers' duties are:
  (1) Daily: Monitoring and approving all the warning level changes (primarily "Significant ~70%" or greater) that the computer program automatically produces and updates on the Webpages. Whenever a Senior Warning Officer rejects a warning level that the system produces, he is required to write a justification in the appropriate Indicator, Target, Country, Terrorist Group or Terrorist Network Warning Narrative: What We Know, Think, & Need to Know.
  (2) Daily: Writing and maintaining executive summaries for the Target, Country, Terrorist Group or Terrorist Network Warning Narrative: What We Know, Think, & Need to Know Webpages for the targets, countries, groups, and networks within their area of responsibility.
  (3) As Required: Generating and publishing additional Collection Requirements (in the Intelligence Collection Plan) that become apparent when all the intelligence related to a target, country, terrorist group, or terrorist network is drawn together in a Indicator, Target, Country, Terrorist Group or Terrorist Network Warning Narrative: What We Know, Think, & Need to Know.
  (4) As Required: Approving all the new terrorist networks that are identified.
  (5) Monthly: Writing the analytic comments for the computer-generated trend-analysis pictures of the targets, countries, terrorist groups, and terrorist networks for which they are responsible.
  (6) As Required: Entering data on Warning Failures (terrorist attacks) in the database, and writing analytic comments for the computer generated warning failure comparison views on the indicators, targets, terrorist groups/networks, and terrorist individuals.
  (7) As Required: Entering data on Warning Successes (thwarted terrorist attacks) in the database, and writing analytic comments for the computer generated warning success comparison views on the indicators, targets, terrorist groups/networks, terrorist individual.
  (8) As Required: Briefing decision makers on the warning levels as necessary using the website templates, which convey the reasoning process.
  (9) As Required: Eliciting and documenting the reasons that decision makers provide for rejecting warning assessments and ensuring that follow up assessments respond to any reasons involving the analysis and evidence.
  (10) Annually: Determining, with Indicator Specialists, if the list of indicators should be altered and reprioritized by: reviewing the raw intelligence reports filed under the Miscellaneous Indicators to determine if any kinds of significant terrorist activity have been overlooked; reviewing U.S. collection capabilities to determine if the U.S. has gained or lost the capability to collect on any terrorist activities; and/or reviewing case studies of terrorist operations to identify changes in terrorist modus operandi and determine if terrorists are conducting any new activities against which U.S. intelligence can collect.

Five Senior Warning Officers are required. Because Senior Warning Officers function to fuse intelligence from multiple targets, countries, and terrorist groups/networks, their responsibilities divided out by five designated major world regions (as shown in Table 4 Staffing Plan: Analyst Positions by Region) to keep their workload manageable.

Even the largest staff estimate of 579 analysts (208 Raw Reporting Profilers, 366 Indicator Specialists, and 5 Senior Warning Officers), which is based on 7500 raw reports a day and the use of Raw Reporting Profilers, may seem like a steep requirement, that staff is considerably less than the Intelligence Community currently has working to provide worldwide terrorism assessments. Furthermore, the analysts would guard against nearly 81 percent of 42 common warning pitfalls by operating this methodology, which leads to the evaluation of this methodology against the 42 common warning pitfalls.

The preceding examples can be repeated with similar success by substituting the generically or specifically described compositions, biomaterials, devices and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A computer implemented methodology augmented with the Internet to provide a terrorism and warning indicator report comprising:
   a. establishing a set of features associated with terrorist acts for a given environment in a given geographic area;
   b. establishing a community network, relating each feature to another feature in the set of features and weighting relationships between the features;
   c. establishing baseline values related to each feature in the set of features associated with a no threat condition;
   d. calculating conditional assessments of concerned pathways through the community network;
   e. assembling the conditional assessments into a hierarchy of potential threats;
   f. collecting current specific features values, assigning such values to the community network, assessing relationships and establishing revised weightings, assessing the established concerned pathways related to the baseline values, establishing concerned alternative pathways, establishing concerned assessment and assigning such concerned assessment into a hierarchy of potential threats;
   g. establishing a warning level based on the hierarchy of potential threats;
   h. identifying features of the feature set that are drivers in the concerned assessment;
   i. searching the Internet using the features of the set of features and assigning values to each feature as a function of the Internet response;
   j. calculating an Internet conditional assessment of concerned features and weighted relationships through the community network using the feature values from the Internet;
   k. assembling the Internet conditional assessments into a second hierarchy of potential threats;
   l. validating such warning levels using an alternative methodology selecting at least one from the group of Hypothesis Testing, Matrix Logic, Chronological Sorting and Questions that Guide;
   m. identifying variance among steps g, k, and l;
   n. providing a composite warning level to a decision maker in the form of an indicator report wherein the report cites the composite threat level related to the no threat condition with reasons for the variances of step m;
   o. reassessing the set of features for effective coverage of the given environment in a given geographic area related to step a; and
   p. using a period of time related to the composite warning level of step n, repeating steps b through n after such period has elapsed; adjusting such period with each iteration to achieve real time relevance between the composite warning level and the given environmental activities; and creating a new indicator report based on the iterations.

2. The method of claim 1 wherein the feature set is established using key words.

3. The method of claim 1 wherein the terrorism and warnings indicator report is categorized by targets.

4. The method of claim 1 wherein the terrorism and warnings indicator report is categorized by countries.

5. The method of claim 1 wherein the terrorism and warnings indicator report is categorized by terrorist groups.

6. The method of claim 1 further comprising using key questions and answers to assess the established concerned assessment.

7. The method of claim 1 further comprising using evidence logs to assess the established concerned assessment.

8. The method of claim 1 further comprising assigning colors to the warning levels.

9. The method of claim 8 wherein the colors are assigned based on target intelligence.

10. The method of claim 8 wherein the colors are assigned based on intelligence provided on a country.

11. The method of claim 8 wherein the colors are assigned based on terrorist group intelligence, 12. The method of claim 1 wherein the features comprise terrorist intent, capability and a potential terrorist target's vulnerability.

13. The method of claim 2 wherein the computer program creates potential terrorist individual hypothesis matrix Webpages.

14. The method of claim 2 wherein indicator warning level numbers are combined using mathematical probability rules and theories to determine overarching warning level numbers.

15. The method of claim 2 wherein a terrorist group threat warning level is determined by combining the terrorist groups intention warning level an the terrorist group's capability warning level.

16. The method of claim 2 wherein terrorist individuals are assigned warning levels based on terrorist position indicator warning levels and by combining the terrorists position priority and threatening activity level.

17. The method of claim 2 wherein a terrorist group threat warning narrative is created by combining all indicator narratives related to a given terrorist group, by combining all indicator narratives related to a given terrorist network, and by combining all the indicator narratives related to a given terrorist individual.

18. The method of claim 2 wherein terrorism intelligence indications and warning methodology is applied to warning failure data and to warning success data to create indicator-based warning failure profiles.

* * * * *